US012283240B2

(12) United States Patent
Yuan et al.

(10) Patent No.: US 12,283,240 B2
(45) Date of Patent: Apr. 22, 2025

(54) LIGHT-EMITTING CONTROL CIRCUIT AND CONTROL METHOD THEREOF, AND GATE DRIVING CIRCUIT AND CONTROL METHOD THEREOF

(71) Applicants: Hefei BOE Joint Technology Co., Ltd., Anhui (CN); BOE TECHNOLOGY GROUP CO., LTD., Beijing (CN)

(72) Inventors: Zhidong Yuan, Beijing (CN); Yongqian Li, Beijing (CN); Can Yuan, Beijing (CN)

(73) Assignees: HEFEI BOE JOINT TECHNOLOGY CO. , LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/250,175

(22) PCT Filed: Apr. 20, 2022

(86) PCT No.: PCT/CN2022/088009

§ 371 (c)(1),
(2) Date: Apr. 21, 2023

(87) PCT Pub. No.: WO2023/201589

PCT Pub. Date: Oct. 26, 2023

(65) Prior Publication Data

US 2025/0078744 A1 Mar. 6, 2025

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0842* (2013.01); *G09G 2310/0286* (2013.01); *G09G 2310/08* (2013.01); *G09G 2320/045* (2013.01)

(58) Field of Classification Search
CPC ............... G09G 3/3233; G09G 3/3266; G09G 2300/0842; G09G 2310/0286; G09G 2310/08; G09G 2320/045
See application file for complete search history.

(56) References Cited

U.S. PATENT DOCUMENTS

2018/0233090 A1 * 8/2018 Zhang .................... G11C 19/28

* cited by examiner

*Primary Examiner* — Stacy Khoo
(74) *Attorney, Agent, or Firm* — XSENSUS LLP

(57) ABSTRACT

A light-emitting control circuit includes: a first detection control unit configured to transmit a first voltage signal to the first node under control of a detection control signal and a first clock signal; a first light-emitting output unit configured to transmit the first voltage signal to a first output signal terminal under control of a voltage of the first node; a second detection control unit configured to transmit the first voltage signal to a second node under control of the detection control signal and a second clock signal; and a second light-emitting output unit configured to transmit the first voltage signal to a second output signal terminal under control of a voltage of the second node.

20 Claims, 17 Drawing Sheets

LIGHT-EMITTING CONTROL CIRCUIT AND CONTROL METHOD THEREOF, AND GATE DRIVING CIRCUIT AND CONTROL METHOD THEREOF

CROSS-REFERENCE TO RELATED APPLICATION

This application is a national phase entry under 35 USC 371 of International Patent Application No. PCT/CN2022/088009, filed on Apr. 20, 2022, which is incorporated herein by reference in its entirety.

TECHNICAL FIELD

The present disclosure relates to the field of display technologies, and in particular, to a light-emitting control circuit and a control method thereof, and a gate driving circuit and a control method thereof.

BACKGROUND

Organic light-emitting diode (OLED) display panels have attracted much attention due to their advantages of active light-emitting, wide viewing angle, high contrast, fast response speed, low power consumption, ultra-small weight and thickness, etc. The display panel includes a plurality of sub-pixels, and the sub-pixels each including a pixel driving circuit and a light-emitting device. Long time continuous light-emitting of the sub-pixels will cause the light-emitting devices to be deteriorated, so that the sub-pixels need to be compensated.

SUMMARY

In an aspect, a light-emitting control circuit is provided. The light-emitting control circuit includes a first light-emitting control sub-circuit and a second light-emitting control sub-circuit. The first light-emitting control sub-circuit includes a first detection control unit and a first light-emitting output unit. The second light-emitting control sub-circuit includes a second detection control unit and a second light-emitting output unit. The first detection control unit is electrically connected to a detection control terminal, a first clock signal terminal, a first voltage signal terminal, and a first node, and is configured to transmit a first voltage signal from the first voltage signal terminal to the first node under control of a detection control signal from the detection control terminal and a first clock signal from the first clock signal terminal. The first light-emitting output unit is electrically connected to the first node, the first voltage signal terminal and a first output signal terminal, and is configured to transmit the first voltage signal to the first output signal terminal under control of a voltage of the first node. The second detection control unit is electrically connected to the detection control terminal, a second clock signal terminal, the first voltage signal terminal, and a second node, and is configured to transmit the first voltage signal to the second node under control of the detection control signal and a second clock signal from the second clock signal terminal. The second light-emitting output unit is electrically connected to the second node, the first voltage signal terminal, and a second output signal terminal, and is configured to transmit the first voltage signal to the second output signal terminal under control of a voltage of the second node.

In some embodiments, the detection control unit includes a first detection input sub-unit and a first detection output sub-unit. The first detection input sub-unit is electrically connected to the detection control terminal, the first clock signal terminal and a third node, and is configured to transmit the first clock signal to the third node under control of the detection control signal. The first detection output sub-unit is electrically connected to the third node, the first voltage signal terminal and the first node, and is configured to transmit the first voltage signal to the first node under control of a voltage of the third node.

The second detection control unit includes a second detection input sub-unit and a second detection output sub-unit. The second detection input sub-unit is electrically connected to the detection control terminal, the second clock signal terminal and a fourth node, and is configured to transmit the second clock signal to the fourth node under control of the detection control signal. The second detection output sub-unit is electrically connected to the fourth node, the first voltage signal terminal and the second node, and is configured to transmit the first voltage signal to the second node under control of a voltage of the fourth node.

In some embodiments, the first detection control unit further includes a first storage sub-unit. The first storage sub-unit is electrically connected to the first node and the third node, and is configured to maintain the voltage of the third node. The second detection control unit further includes a second storage sub-unit. The second storage sub-unit is electrically connected to the second node and the fourth node, and is configured to maintain the voltage of the fourth node.

In some embodiments, the first detection input sub-unit includes a first transistor, a control electrode of the first transistor is electrically connected to the detection control terminal, a first electrode of the first transistor is electrically connected to the second clock signal terminal, and a second electrode of the first transistor is electrically connected to the third node. The first detection output sub-unit includes a second transistor, a control electrode of the second transistor is electrically connected to the third node, a first electrode of the second transistor is electrically connected to the first voltage signal terminal, and a second electrode of the second transistor is electrically connected to the first node. The first storage sub-unit includes a first capacitor, a first electrode plate of the first capacitor is electrically connected to the third node, and a second electrode plate of the first capacitor is electrically connected to the first node.

The second detection input sub-unit includes a third transistor, a control electrode of the third transistor is electrically connected to the detection control terminal, a first electrode of the third transistor is electrically connected to a fourth clock signal terminal, and a second electrode of the third transistor is electrically connected to the fourth node. The second detection output sub-unit includes a fourth transistor, a control electrode of the fourth transistor is electrically connected to the fourth node, a first electrode of the fourth transistor is electrically connected to the first voltage signal terminal, and a second electrode of the fourth transistor is electrically connected to the second node. The second storage sub-unit includes a second capacitor, a first electrode plate of the second capacitor is electrically connected to the fourth node, and a second electrode plate of the second capacitor is electrically connected to the second node.

In some embodiments, the first light-emitting control sub-circuit further includes a first pulse width modulation unit. The first pulse width modulation unit is electrically connected to a first input signal terminal, a third clock signal terminal and the first node, and is configured to transmit a first input signal from the first input signal terminal to the first node under control of a third clock signal from the third clock signal terminal.

The second light-emitting control sub-circuit further includes a second pulse width modulation unit. The second pulse width modulation unit is electrically connected to a second input signal terminal, a fourth clock signal terminal and the second node, and is configured to transmit a second input signal from the second input signal terminal to the second node under control of a fourth clock signal from the fourth clock signal terminal.

In some embodiments, the first pulse width modulation unit includes a fifth transistor, a sixth transistor, a seventh transistor, an eighth transistor, a ninth transistor, a tenth transistor and a third capacitor. A control electrode of the fifth transistor is electrically connected to the third clock signal terminal, a first electrode of the fifth transistor is electrically connected to the first input signal terminal, and a second electrode of the fifth transistor is electrically connected to the first node. A control electrode of the sixth transistor is electrically connected to the first node, a first electrode of the sixth transistor is electrically connected to a second voltage signal terminal, and a second electrode of the sixth transistor is electrically connected to a fifth node. A control electrode of the seventh transistor is electrically connected to the fifth node, a first electrode of the seventh transistor is electrically connected to a third voltage signal terminal, and a second electrode of the seventh transistor is electrically connected to the first output signal terminal. A control electrode of the eighth transistor is electrically connected to a fifth clock signal terminal, a first electrode of the eighth transistor is electrically connected to the first voltage signal terminal, and a second electrode of the eighth transistor is electrically connected to a sixth node. A control electrode of the ninth transistor is electrically connected to the sixth node, a first electrode of the ninth transistor is electrically connected to the third clock signal terminal, and a second electrode of the ninth transistor is electrically connected to a seventh node. A control electrode of the tenth transistor is electrically connected to the first input signal terminal, a first electrode of the tenth transistor is electrically connected to the seventh node, and a second electrode of the tenth transistor is electrically connected to the fifth node. A first electrode plate of the third capacitor is electrically connected to the sixth node, and a second electrode plate of the third capacitor is electrically connected to the seventh node.

The second pulse width modulation unit includes an eleventh transistor, a twelfth transistor, a thirteenth transistor, a fourteenth transistor, a fifteenth transistor, a sixteenth transistor and a fourth capacitor. A control electrode of the eleventh transistor is electrically connected to the fourth clock signal terminal, a first electrode of the eleventh transistor is electrically connected to the second input signal terminal, and a second electrode of the eleventh transistor is electrically connected to the second node. A control electrode of the twelfth transistor is electrically connected to the second node, a first electrode of the twelfth transistor is electrically connected to the second voltage signal terminal, and a second electrode of the twelfth transistor is electrically connected to an eighth node. A control electrode of the thirteenth transistor is electrically connected to the eighth node, a first electrode of the thirteenth transistor is electrically connected to the third voltage signal terminal, and a second electrode of the thirteenth transistor is electrically connected to the second output signal terminal. A control electrode of the fourteenth transistor is electrically connected to a sixth clock signal terminal, a first electrode of the fourteenth transistor is electrically connected to the first voltage signal terminal, and a second electrode of the fourteenth transistor is electrically connected to a ninth node. A control electrode of the fifteenth transistor is electrically connected to the ninth node, a first electrode of the fifteenth transistor is electrically connected to the fourth clock signal terminal, and a second electrode of the fifteenth transistor is electrically connected to a tenth node. A control electrode of the sixteenth transistor is electrically connected to the second input signal terminal, a first electrode of the sixteenth transistor is electrically connected to the tenth node, and a second electrode of the sixteenth transistor is electrically connected to the eighth node. A first electrode plate of the fourth capacitor is electrically connected to the ninth node, and a second electrode plate of the fourth capacitor is electrically connected to the tenth node.

The first light-emitting output unit includes a seventeenth transistor, a control electrode of the seventeenth transistor is electrically connected to the first node, a first electrode of the seventeenth transistor is electrically connected to the first voltage signal terminal, and a second electrode of the seventeenth transistor is electrically connected to the first output signal terminal. The second light-emitting output unit includes an eighteenth transistor, a control electrode of the eighteenth transistor is electrically connected to the second node, a first electrode of the eighteenth transistor is electrically connected to the first voltage signal terminal, and a second electrode of the eighteenth transistor is electrically connected to the second output signal terminal.

In another aspect, a gate driving circuit is provided. The gate driving circuit includes a random detection circuit, shift register circuits, and the light-emitting control circuit as described in any of the above embodiments. The random detection circuit is electrically connected to a random detection signal terminal, a third input signal terminal, a seventh clock signal terminal and an eleventh node, and is configured to transmit a seventh clock signal from the seventh clock signal terminal to the eleventh node under control of a random detection signal from the random detection signal terminal and a third input signal from the third input signal terminal, so as to select a row of sub-pixels for compensation of light-emitting devices. The shift register circuits are electrically connected to the eleventh node, and are each configured to output a scan signal to a corresponding row of sub-pixels, so as to turn on the corresponding row of sub-pixels under control of a voltage of the eleventh node. The detection control terminal of the light-emitting control circuit is electrically connected to a circuit node of the random detection circuit or a circuit node of the shift register circuit.

In some embodiments, the random detection circuit includes a random detection control sub-circuit and a detection output sub-circuit. The random detection control sub-circuit is electrically connected to the random detection signal terminal, the third input signal terminal and a twelfth node, and is configured to transmit the third input signal to the twelfth node under control of the random detection signal. The detection output sub-circuit is electrically connected to the twelfth node, the seventh clock signal terminal and the eleventh node, and is configured to transmit the seventh clock signal to the eleventh node under control of a voltage of the twelfth node. The detection control terminal is electrically connected to the twelfth node.

In some embodiments, the random detection circuit further includes a first storage sub-circuit and a first anti-leakage sub-circuit. The first storage sub-circuit is electrically connected to a fourth voltage signal terminal and the twelfth node, and is configured to maintain the voltage of the twelfth node. The first anti-leakage sub-circuit is electrically connected to the random detection control sub-circuit, the random detection signal terminal, the twelfth node and the fourth voltage signal terminal, and is configured to transmit a fourth voltage signal to the eleventh node under control of the random detection signal and the voltage of the twelfth node. The random detection control sub-circuit is electrically connected to the twelfth node through the first anti-leakage sub-circuit.

In some embodiments, the random detection control sub-circuit includes a nineteenth transistor, a control electrode of the nineteenth transistor is electrically connected to the random detection signal terminal, a first electrode of the nineteenth transistor is electrically connected to the third input signal terminal, and a second electrode of the nineteenth transistor is electrically connected to a thirteenth node. The detection output sub-circuit includes a twentieth transistor, a control electrode of the twentieth transistor is electrically connected to the twelfth node, a first electrode of the twentieth transistor is electrically connected to the seventh clock signal terminal, and a second electrode of the twentieth transistor is electrically connected to the eleventh node. The first storage sub-circuit includes a fifth capacitor, a first electrode plate of the fifth capacitor is electrically connected to the fourth voltage signal terminal, and a second electrode plate of the fifth capacitor is electrically connected to the twelfth node. The first anti-leakage sub-circuit includes a twenty-first transistor and a twenty-second transistor; a control electrode of the twenty-first transistor is electrically connected to the random detection signal terminal, a first electrode of the twenty-first transistor is electrically connected to the thirteenth node, and a second electrode of the twenty-first transistor is electrically connected to the twelfth node; and a control electrode of the twenty-second transistor is electrically connected to the twelfth node, a first electrode of the twenty-second transistor is electrically connected to the fourth voltage signal terminal, and a second electrode of the twenty-second transistor is electrically connected to the thirteenth node.

In some embodiments, the shift register circuit includes a first shift register sub-circuit and a second shift register sub-circuit. The first shift register sub-circuit includes a first compensation input unit and a first scan output unit. The second shift register sub-circuit includes a second compensation input unit and a second scan output unit. The first compensation input unit is electrically connected to the eleventh node, the seventh clock signal terminal and a fourteenth node, and the first compensation input unit is configured to transmit a voltage of the eleventh node to the fourteenth node under control of the seventh clock signal. The first scan output unit is electrically connected to the fourteenth node, an eighth clock signal terminal and a third output signal terminal; the third output signal terminal is configured to be electrically connected to an odd-numbered row of sub-pixels; and the first scan output unit is configured to transmit an eighth clock signal from the eighth clock signal terminal to the third output signal terminal under control of a voltage of the fourteenth node, so as to turn on the corresponding odd-numbered row of sub-pixels. The second compensation input unit is electrically connected to the eleventh node, the seventh clock signal terminal and a fifteenth node, and the second compensation input unit is configured to transmit the voltage of the eleventh node to the fifteenth node under control of the seventh clock signal. The second scan output unit is electrically connected to the fifteenth node, a ninth clock signal terminal and a fourth output signal terminal; the fourth output signal terminal is configured to be electrically connected to an even-numbered row of sub-pixels; and the second scan output unit is configured to transmit a ninth clock signal from the ninth clock signal terminal to the fourth output signal terminal under control of a voltage of the fifteenth node, so as to turn on the corresponding even-numbered row of sub-pixels. The detection control terminal is electrically connected to the fourteenth node or the fifteenth node.

In some embodiments, the first compensation input unit includes a twenty-third transistor, a control electrode of the twenty-third transistor is electrically connected to the seventh clock signal terminal, a first electrode of the twenty-third transistor is electrically connected to the eleventh node, and a second electrode of the twenty-third transistor is electrically connected to the fourteenth node. The first scan output unit includes a twenty-fourth transistor, a control electrode of the twenty-fourth transistor is electrically connected to the fourteenth node, a first electrode of the twenty-fourth transistor is electrically connected to the eighth clock signal terminal, and a second electrode of the twenty-fourth transistor is electrically connected to the third output signal terminal. The second compensation input unit includes a twenty-fifth transistor, a control electrode of the twenty-fifth transistor is electrically connected to the seventh clock signal terminal, a first electrode of the twenty-fifth transistor is electrically connected to the eleventh node, and a second electrode of the twenty-fifth transistor is electrically connected to the fifteenth node. The second scan output unit includes a twenty-sixth transistor, a control electrode of the twenty-sixth transistor is electrically connected to the fifteenth node, a first electrode of the twenty-sixth transistor is electrically connected to the ninth clock signal terminal, and a second electrode of the twenty-sixth transistor is electrically connected to the fourth output signal terminal.

In some embodiments, the first shift register sub-circuit further includes a first scan input unit, a first inverter and a first reset unit. The first scan input unit is electrically connected to the third input signal terminal, a fourth voltage signal terminal and the fourteenth node, and the first scan input unit is configured to transmit a fourth voltage signal from the fourth voltage signal terminal to the fourteenth node under control of the third input signal. A terminal of the first inverter is electrically connected to the fourteenth node, and another terminal of the first inverter is electrically connected to a sixteenth node. The first reset unit is electrically connected to a first reset signal terminal, the sixteenth node, a fifth voltage signal terminal, the fourteenth node and the third output signal terminal, and the first reset unit is configured to transmit a fifth voltage signal of the fifth voltage signal terminal to the fourteenth node and the third output signal terminal under control of a first reset signal from the first reset signal terminal and a voltage of the sixteenth node.

The second shift register sub-circuit further includes a second scan input unit, a second inverter and a second reset unit. The second scan input unit is electrically connected to the third input signal terminal, the fourth voltage signal terminal and the fifteenth node, and the second scan input unit is configured to transmit the third voltage signal to the fifteenth node under control of the third input signal. A terminal of the second inverter is electrically connected to the fifteenth node, and another terminal of the second inverter is electrically connected to a seventeenth node. The second reset unit is electrically connected to a second reset signal terminal, the fifth voltage signal terminal, the fifteenth node, the seventeenth node, and the fourth output signal terminal, and the second reset unit is configured to transmit the fifth voltage signal to the fifteenth node and the fourth output signal terminal under control of a second reset signal from the second reset signal terminal and a voltage of the seventeenth node.

In some embodiments, the first scan input unit includes a twenty-seventh transistor, a control electrode of the twenty-seventh transistor is electrically connected to the third input signal terminal, a first electrode of the twenty-seventh transistor is electrically connected to the fourth voltage signal terminal, and a second electrode of the twenty-seventh transistor is electrically connected to the fourteenth node.

The first reset unit includes a twenty-eighth transistor, a twenty-ninth transistor and a thirtieth transistor; a control electrode of the twenty-eighth transistor is electrically connected to the first reset signal terminal, a first electrode of the twenty-eighth transistor is electrically connected to the fifth voltage signal terminal, and a second electrode of the twenty-eighth transistor is electrically connected to the fourteenth node; a control electrode of the twenty-ninth transistor is electrically connected to the sixteenth node, a first electrode of the twenty-ninth transistor is electrically connected to the fifth voltage signal terminal, and a second electrode of the twenty-ninth transistor is electrically connected to the third output signal terminal; a control electrode of the thirtieth transistor is electrically connected to the sixteenth node, a first electrode of the thirtieth transistor is electrically connected to the fifth voltage signal terminal, and a second electrode of the thirtieth transistor is electrically connected to the fourteenth node.

The second scan input unit includes a thirty-first transistor, a control electrode of the thirty-first transistor is electrically connected to the third input signal terminal, a first electrode of the thirty-first transistor is electrically connected to the fourth voltage signal terminal, and a second electrode of the thirty-first transistor is electrically connected to the fourteenth node.

The second reset unit includes a thirty-second transistor, a thirty-third transistor and a thirty-fourth transistor; a control electrode of the thirty-second transistor is electrically connected to the second reset signal terminal, a first electrode of the thirty-second transistor is electrically connected to the fifth voltage signal terminal, and a second electrode of the thirty-fourth transistor is electrically connected to the fifteenth node; a control electrode of the thirty-third transistor is electrically connected to the seventeenth node, a first electrode of the thirty-third transistor is electrically connected to the fifth voltage signal terminal, and a second electrode of the thirty-third transistor is electrically connected to the fourth output signal terminal; and a control electrode of the thirty-fourth transistor is electrically connected to the seventeenth node, a first electrode of the thirty-fourth transistor is electrically connected to the fifth voltage signal terminal, and a second electrode of the thirty-fourth transistor is electrically connected to the fifteenth node.

In yet another aspect, a control method of a light-emitting control circuit is provided. The control method is used for driving the light-emitting control circuit as described in any of the above embodiments. The first output signal terminal of the light-emitting control circuit is electrically connected to an odd-numbered row of sub-pixels, and the second output signal terminal of the light-emitting control circuit is electrically connected to an even-numbered row of sub-pixels. A frame cycle includes a display phase and a blank phase.

In a case where one of the odd-numbered row of sub-pixels and the even-numbered row of sub-pixels that are adjacent in a group is selected for compensation of light-emitting devices, the control method includes: in the blank phase, the first detection control unit of the first light-emitting control sub-circuit of the light-emitting control circuit transmitting the first voltage signal to the first node, and the first light-emitting output unit of the first light-emitting control sub-circuit transmitting the first voltage signal to the first output signal terminal under control of the voltage of the first node, so that operating currents respectively flow through light-emitting devices of the odd-numbered row of sub-pixels or the even-numbered row of sub-pixels; or the second detection control unit of the second light-emitting control sub-circuit of the light-emitting control circuit transmitting the first voltage signal to the second node, and the second output unit of the second light-emitting control sub-circuit transmitting the first voltage signal to the second output signal terminal under control of the voltage of the second node, so that the operating currents respectively flow through the light-emitting devices of the odd-numbered row of sub-pixels or the even-numbered row of sub-pixels.

In some embodiments, the first light-emitting control sub-circuit includes a first pulse width modulation unit, and the second light-emitting control sub-circuit includes a second pulse width modulation unit.

The control method includes: in the display phase, the first pulse width modulation unit transmits a first input signal to the first node under control of a third clock signal; the first light-emitting output unit transmits the first voltage signal to the first output signal terminal under control of the voltage of the first node, so as to modulate light-emitting time of the odd-numbered row of sub-pixels and the even-numbered row of sub-pixels; in a case where one of the odd-numbered row of sub-pixels and the even-numbered row of sub-pixels that are adjacent in the group is selected for compensation of light-emitting devices, in the blank phase, the second detection control unit transmits the first voltage signal to the second node, and the second light-emitting output unit transmits the first voltage signal to the second output signal terminal under control of the voltage of the second node, so that the operating currents respectively flow through the light-emitting devices of the odd-numbered row of sub-pixels or the even-numbered row of sub-pixels.

Or, the control method includes: in the display phase, the second pulse width modulation unit transmits a second input signal to the second node under control of a fourth clock signal; the second light-emitting output unit transmits the first voltage signal to the second output signal terminal under control of the voltage of the second node, so as to modulate the light-emitting time of the odd-numbered row of sub-pixels and the even-numbered row of sub-pixels; in a case where one of the odd-numbered row of sub-pixels and the even-numbered row of sub-pixels that are adjacent in the group is selected for compensation of light-emitting devices, in the blank phase, the first detection control unit transmits the first voltage signal to the first node, and the first light-emitting output unit transmits the first voltage signal to the second output signal terminal under control of the voltage of the first node, so that the operating currents respectively flow through the light-emitting devices of the odd-numbered row of sub-pixels or the even-numbered row of sub-pixels.

In some embodiments, the control method includes: in the same frame cycle, the first clock signal terminal, a second input signal terminal and a fourth clock signal terminal output pulse signals, and the second clock signal terminal, a first input signal terminal and a third clock signal terminal output no voltage signal; or in the same frame cycle, the second clock signal terminal, the first input signal terminal, and the third clock signal terminal output pulse signals, and the first clock signal terminal, the second input signal terminal, and the fourth clock signal terminal output no voltage signal.

In yet another aspect, a control method of a gate driving circuit is provided. The control method is configured to drive the gate drive circuit as described in any of the above embodiments. The first output signal terminal of the light-emitting control circuit of the gate driving circuit is electrically connected to an odd-numbered row of sub-pixels, and the second output signal terminal of the light-emitting control circuit is electrically connected to an even-numbered row of sub-pixels. A frame cycle includes a display phase and a blank phase. In a case where one of the odd-numbered row of sub-pixels and the even-numbered row of sub-pixels that are adjacent in a group is selected for compensation of light-emitting devices, the control method includes:

in the display phase, the random detection circuit of the gate driving circuit transmitting the third input signal to the circuit node of the random detection circuit under control of the random detection signal, and maintaining a voltage of a corresponding circuit node until the blank phase; and in the blank phase, the random detection circuit transmitting the seventh clock signal to the shift register circuit of the gate driving circuit under control of the voltage of the corresponding circuit node; the shift register circuit outputting a scan signal to the corresponding row of sub-pixels, so as to turn on the corresponding row of sub-pixels; the light-emitting control circuit of the gate driving circuit transmitting the first voltage signal to the first output signal terminal or the second output signal terminal under control of a voltage of the circuit node of the random detection circuit or a voltage of the circuit node of the shift register circuit, so that operating currents respectively flow through light-emitting devices of the odd-numbered row of sub-pixels or the even-numbered row of sub-pixels.

In some embodiments, the shift register circuit includes a first shift register sub-circuit and a second shift register sub-circuit, the first shift register sub-circuit includes a first scan input unit and a first scan output unit, the second shift register sub-circuit includes a second scan input unit and a second scan output unit, the first light-emitting control sub-circuit of the light-emitting control circuit includes a first pulse width modulation unit, and the second light-emitting control sub-circuit includes a second pulse width modulation unit. In the display phase, the control method includes:

the first scan input unit inputting a fourth voltage signal to a fourteenth node under control of the third input signal; the first scan output unit transmitting an eighth clock signal to a third output signal terminal under control of a voltage of the fourteenth node, so as to turn on the corresponding odd-numbered row of sub-pixels; the second scan input unit inputting the fourth voltage signal to a fifteenth node under control of the third input signal; the second scan output unit transmitting a ninth clock signal to a fourth output signal terminal under control of a voltage of the fifteenth node, so as to turn on the corresponding even-numbered row of sub-pixels; and the first pulse width modulation unit transmitting a first input signal to the first node under control of a third clock signal, or the second pulse width modulation unit transmitting a second input signal to the second node under control of a fourth clock signal, so as to modulate light-emitting time of the odd-numbered row of sub-pixels and the even-numbered row of sub-pixels.

In yet another aspect, a control method of a display panel is provided. The display panel includes gate driving circuits as described in any of the above embodiments, a data driving circuit, odd-numbered rows of sub-pixels, and even-numbered rows of sub-pixels. The first light-emitting control sub-circuit of the gate driving circuit is electrically connected to an odd-numbered row of sub-pixels, and the second light-emitting control sub-circuit of the gate driving circuit is electrically connected to an even-numbered row of sub-pixels. A frame cycle includes a display phase and a blank phase, and the blank phase includes a first data writing phase, a second data writing phase and a sensing phase. In a case where one of the odd-numbered row of sub-pixels and the even-numbered row of sub-pixels that are adjacent in a group is selected for compensation of light-emitting devices, the control method includes:

in the first data writing phase, the data driving circuit writing zero grayscale data into one of the odd-numbered row of sub-pixels and the even-numbered row of sub-pixels that is not selected for external compensation; in the second data writing phase, the data driving circuit writing sensing grayscale data into one of the odd-numbered row of sub-pixels and the even-numbered row of sub-pixels that is selected for compensation of light-emitting devices; and in the sensing phase, the first light-emitting control sub-circuit or the second light-emitting control sub-circuit outputting the first voltage signal, so that operating currents respectively flow through light-emitting devices of the odd-numbered row of sub-pixels or the even-numbered row of sub-pixels; and pixel driving circuits of the odd-numbered row of sub-pixels or the even-numbered row of sub-pixels detecting voltages of light-emitting devices electrically connected thereto.

In some embodiments, the blank phase further includes a first data write-back phase and a second data write-back phase. The control method further includes: in the first data write-back phase, writing first initial grayscale data into one of the odd-numbered row of sub-pixels and the even-numbered row of sub-pixels that is not selected for compensation of light-emitting devices, the first initial grayscale data being grayscale data written into a corresponding row of sub-pixels before the first data writing phase; and in the second data write-back phase, writing second initial grayscale data into one of the odd-numbered row of sub-pixels and the even-numbered row of sub-pixels that is selected for compensation of light-emitting devices, the second initial grayscale data being grayscale data written into a corresponding row of sub-pixels before the second data writing phase.

In yet another aspect, a display device is provided. The display device includes the gate driving circuit as described in any of the above embodiments.

BRIEF DESCRIPTION OF THE DRAWINGS

In order to describe technical solutions in some embodiments of the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, actual processes of methods, and actual timings of signals involved in the embodiments of the present disclosure.

DETAILED DESCRIPTION

Figure 1:
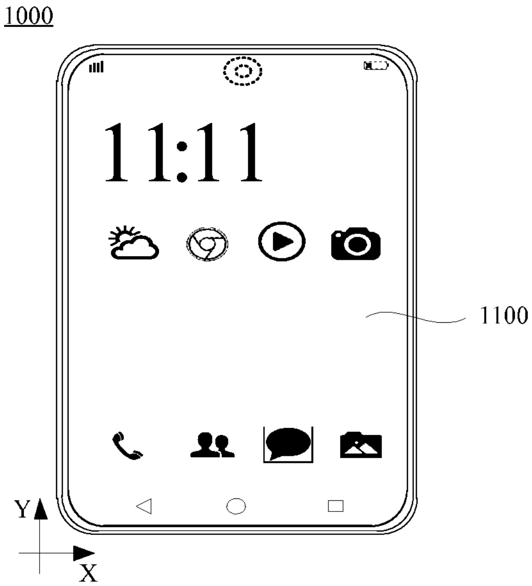
FIG. 1 is a structural diagram of a display device, in accordance with embodiments of the present disclosure.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "configured to" as used herein indicates an open and inclusive expression, which does not exclude devices that are applicable to or configured to perform additional tasks or steps.

The transistors used in all embodiments of the present disclosure may be thin film transistor (TFTs), or metal oxide semiconductors (MOSs), or other devices with like characteristics. The embodiments of the present disclosure do not limit thereto.

For example, the transistors may be TFTs. The TFTs may be formed by using an a-Si process, an oxide semiconductor process, a low temperature poly-silicon (LTPS) process, or a high temperature poly-silicon (HTPS) process. The embodiments of the present disclosure do not limit thereto.

The embodiments of the present disclosure do not limit the type of transistors. The transistors may be N-type transistors, P-type transistors, enhancement-type transistors, or depletion-type transistors. The present disclosure is described by taking an example in which all the transistors in the embodiments of the present disclosure are N-type transistors. The N-type transistors are turned on due to a high-level voltage signal, and are turned off due to a low-level voltage signal; that is, an operating voltage of the N-type transistors is a high-level voltage, and a turn-off voltage of the N-type transistors is a low-level voltage.

In the embodiments of the present disclosure, a gate of the transistor is a control electrode of the transistor, and in order to distinguish two electrodes of the transistor except the gate, one of the two electrodes is described as a first electrode, and the other electrode is a second electrode. Therefore, the first electrode of the transistor may be one of a source and a drain of the transistor, and the second electrode of the transistor may be the other of the source and the drain of the transistor. Since the source and the drain of the transistor may be symmetrical in structure, there may be no difference in structure between the source and the drain of the transistor.

In the embodiments of the present disclosure, the capacitors may be capacitor devices separately manufactured through a process. For example, the capacitor devices are each realized by manufacturing special capacitor electrodes, and each capacitor electrode of the capacitor may be realized through a metal layer, a semiconductor layer (e.g., doped with polysilicon), or the like. The capacitor may further be realized through a parasitic capacitance between transistors, or through a transistor itself and another device or wire, or through a parasitic capacitance between wires of a circuit itself.

Each transistor may further include at least one switching transistor connected in parallel with each transistor. The embodiments of the present disclosure are merely examples of the pixel driving circuit and the gate driving circuit, and other structures with the same functions as the pixel driving circuit and the gate driving circuit are not described in details, but all shall be included in the protection scope of the present disclosure.

In the embodiments of the present disclosure, nodes such as "first node" and "second node" do not represent actual components, but represent junction points of relevant electrical connections in a circuit diagram. That is, these nodes are nodes equivalent to junction points of relevant electrical connections in the circuit diagram.

Some embodiments of the present disclosure provide a display device 1000. Referring to FIG. 1, FIG. 1 is a structure diagram of the display device, and the display device 1000 may be any device that displays an image whether in motion (e.g., a video) or stationary (e.g., a still image), and whether textual or graphical.

For example, the display device 1000 may be any product or component with a display function, such as a television, a notebook computer, a tablet computer, a mobile phone, a personal digital assistant (PDA), a navigator, a wearable device, an augmented reality (AR) device, a virtual reality (VR) device, and the like.

Figure 2:
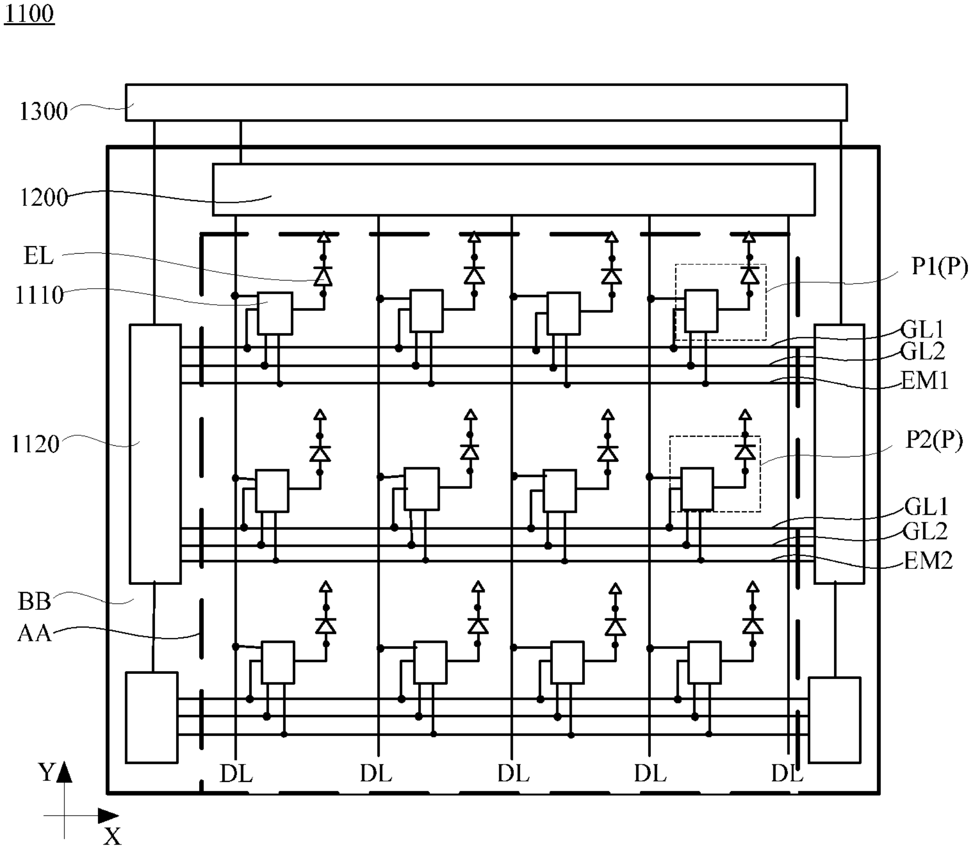
FIG. 2 is a structural diagram of a display panel, in accordance with embodiments of the present disclosure.

Referring to FIG. 2, the display device 1000 includes a display panel 1100, a data driving circuit 1200 disposed on the display panel 1100, and a circuit board 1300 (e.g., a source printed circuit board (PCB)) electrically connected to the display panel 1100 and the data driving circuit 1200. For example, the data driving circuit 1200 may be a source driver IC, and the circuit board 1300 may be a source PCB.

The display panel 1100 has a display region AA and a peripheral region BB located on at least one side of the display region AA. For example, referring to FIG. 2, the display panel 1100 has the display region AA and the peripheral region BB around the display region AA. The data driving circuit 1200 is disposed in the peripheral region BB of the display panel 1100.

The display panel 1100 includes a plurality of sub-pixels P, a plurality of data lines DL, a plurality of first gate lines GL1, a plurality of second gate lines GL2, a plurality of sensing signal lines SL (not shown in FIG. 2), and a plurality of gate driving circuits 1120.

Each sub-pixel P includes a pixel driving circuit 1110 and a light-emitting device EL. A plurality of light-emitting devices EL of the plurality of sub-pixels P may emit light of at least three primary colors, such as red (R) light, green (G) light and blue (B) light.

The plurality of sub-pixels P are arranged into a plurality of columns along a first direction X (the plurality of columns of sub-pixels P are arranged along the first direction X), and are arranged into a plurality of rows along a second direction Y (the plurality of rows of sub-pixels P are arranged along the second direction Y). Each row of sub-pixels P includes sub-pixels P arranged along the first direction X, and each column of sub-pixels P includes sub-pixels P arranged along the second direction Y. The first direction X and the second direction Y intersect; for example, the second direction Y is perpendicular to the first direction X.

In the second direction Y, the plurality of rows of sub-pixels P include odd-numbered rows of sub-pixels P1 and even-numbered rows of sub-pixels P2 that are alternately arranged. For example, in the first direction X and a direction away from the data driving circuit 1200, a first row of sub-pixels, a third row of sub-pixels, a fifth row of sub-pixels, . . . , and an (N−1)th row of sub-pixels are all odd-numbered rows of sub-pixels P1, and a second row of sub-pixels, a fourth row of sub-pixels, a sixth row of sub-pixels, . . . , and an Nth row of sub-pixels are all even-numbered rows of sub-pixels P2. Here, N is a positive integer and an even number.

Referring to FIG. 2, the gate driving circuits 1120 are disposed in the peripheral region BB. For each group of an odd-numbered row of sub-pixels P1 and an even-numbered row of sub-pixels P2 that are adjacent, the odd-numbered row of sub-pixels P1 is electrically connected to a gate driving circuit 1120 through a first gate line GL1 and a second gate line GL2, and the even-numbered row of sub-pixels P2 is electrically connected to the gate driving circuit 1120 through a first gate line GL1 and a second gate line GL2. The plurality of gate driving circuits 1120 are connected in cascade. Each column of sub-pixels P is electrically connected to the data driving circuit 1200 through a data line DL, and each column of sub-pixels P is electrically connected to a sensing signal line SL (the sensing signal line SL is not shown in FIG. 2).

It will be understood that, in the embodiment of the present disclosure, "an odd-numbered row of sub-pixels and an even-numbered row of sub-pixels that are adjacent in a group" refer to one odd-numbered row of sub-pixels P1 and one even-numbered row of sub-pixels P2 that are electrically connected to a same gate driving circuit 1120 (and electrically connected to a same light-emitting control circuit 100).

Figure 3:
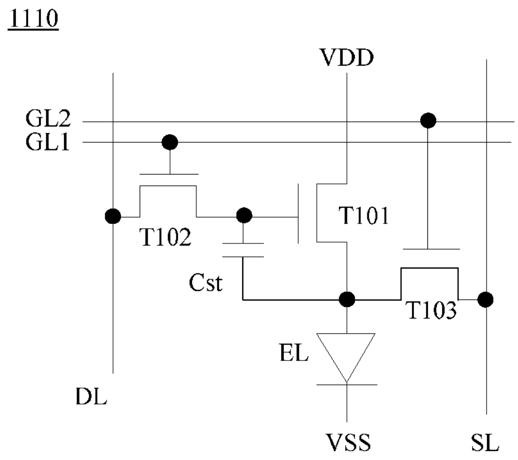
FIG. 3 is an equivalent circuit diagram of a pixel driving circuit, in accordance with embodiments of the present disclosure.

Referring to FIG. 3, FIG. 3 is an equivalent circuit diagram of a pixel driving circuit 1110 provided in the embodiment of the present disclosure. The pixel driving circuit 1110 may include a driving transistor T101, a data writing transistor T102, a sensing transistor T103, and a storage capacitor Cst.

A control electrode of the data writing transistor T102 is electrically connected to a first gate line GL1, a first electrode of the data writing transistor T102 is electrically connected to a data line DL, and a second electrode of the data writing transistor T102 is electrically connected to a control electrode of the driving transistor T101. A first electrode of the driving transistor T101 is electrically connected to a power supply voltage signal terminal VDD, and a second electrode of the driving transistor T101 is electrically connected to an anode of the light-emitting device EL. A control electrode of the sensing transistor T103 is electrically connected to a second gate line GL2, a first electrode of the sensing transistor T103 is electrically connected to the anode of the light-emitting device EL, and a second electrode of the sensing transistor T103 is electrically connected to a sensing signal line SL. A first electrode plate of the storage capacitor Cst is electrically connected to the control electrode of the driving transistor T101, and a second electrode plate of the storage capacitor Cst is electrically connected to the anode of the light-emitting device EL.

The light-emitting device EL is deteriorated due to long time operation (light-emitting). Therefore, the light-emitting device EL needs to be compensated to make the light-emitting device EL display grayscale data required to be displayed.

Figure 4:
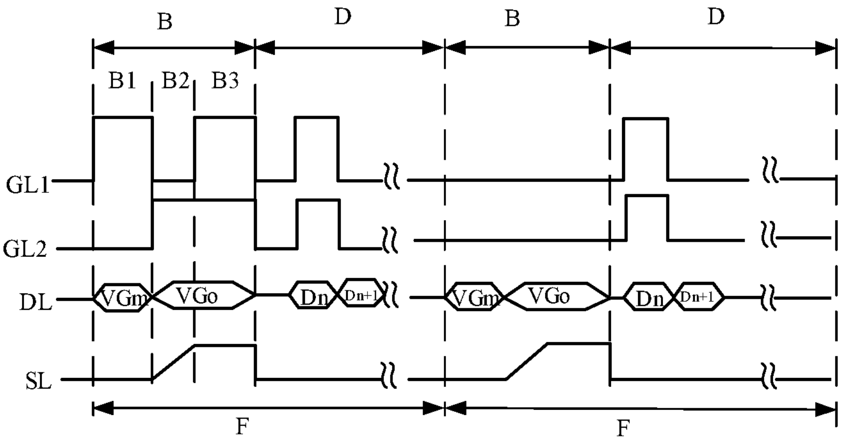
FIG. 4 is a timing control diagram of a pixel driving circuit, in accordance with embodiments of the present disclosure.

Referring to FIG. 4, FIG. 4 is a timing control diagram of the pixel driving circuit 1110 shown in FIG. 3. A frame cycle F includes a blank phase B and a display phase D. The blank phase B includes a sensing data writing phase B1, a sensing phase B2, and a display data write-back phase B3.

In the sensing data writing phase B1, the gate driving circuit 1120 controls the data writing transistor T102 to be turned on through the first gate line GL1, and the data driving circuit 1200 writes sensing grayscale data VGm into the control electrode of the driving transistor T101 through the data line DL. The sensing grayscale data VGm causes the driving transistor T101 to be turned on, and the power supply voltage signal terminal VDD charges the anode of the light-emitting device EL through the driving transistor T101.

In the sensing phase B2, the data writing transistor T102 is turned off, the second gate line GL2 controls the sensing transistor T103 to be turned on, and the sensing signal line SL senses a voltage of the anode of the light emitting-device EL.

It will be understood that the process of compensating the light-emitting device EL is conventional in the art, and details of other processes of compensating the light-emitting device EL will not be described in the embodiments of the present disclosure.

In the display phase, the gate driving circuit 1120 may control the data writing transistor T102 to be turned on through the first gate line GL1, and the data driving circuit 1200 writes display grayscale data Dn into the control electrode of the driving transistor T101 through the data line DL; the display grayscale data Dn controls the driving transistor T101 to be turned on, so that the power supply voltage signal terminal VDD communicates with the anode of the light-emitting device EL; and a driving current flows through the light-emitting device EL, and the light-emitting device EL operates.

In some embodiments, the light-emitting device EL may be an organic light-emitting diode (OLED). Therefore, the luminous efficiency of the light-emitting device EL is positively correlated with a magnitude (or density) of the current flowing through the light-emitting device EL. That is, when the magnitude of the current flowing through the light-emitting device EL is small, the luminous efficiency of the light-emitting device EL is low; and when the magnitude of the current flowing through the light-emitting device EL is large, the luminous efficiency of the light-emitting device EL is high.

Figure 5:
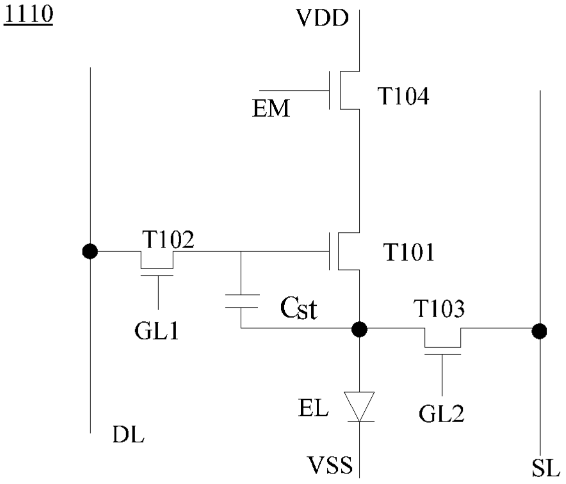
FIG. 5 is an equivalent circuit diagram of another pixel driving circuit, in accordance with embodiments of the present disclosure.

In order to improve the luminous efficiency of the light-emitting device EL when displaying low gray scales, some embodiments of the present disclosure further provide a pixel driving circuit 1110. Referring to FIG. 5, FIG. 5 is an equivalent circuit diagram of the pixel driving circuit 1110 obtained after adding a light-emitting control transistor T104 to the pixel driving circuit shown in FIG. 3. The light-emitting control transistor T104 is used to perform modulation (i.e., pulse width modulation (PWM)) on a light-emitting time of the light-emitting device EL, so as to change a light-emitting duty ratio of the light-emitting device EL in a frame, and to shorten the light-emitting time of the light-emitting device EL.

Referring to FIG. 5, a control electrode of the light-emitting control transistor T104 is electrically connected to the gate driving circuit 1120 through a light-emitting control scan line EM, a first electrode of the light-emitting control transistor T104 is electrically connected to the power supply voltage signal terminal VDD, and a second electrode of the light-emitting control transistor T104 is electrically connected to the first electrode of the driving transistor T101.

In some embodiments, the light-emitting control transistor T104 may be an oxide thin film transistor (oxide TFT). The oxide TFT has high electron mobility and good turn-off characteristics. Therefore, it is advantageous to completely turn on or completely turn off the light-emitting control transistor T104 during the modulation process of the light-emitting time of the light-emitting device EL.

Figure 6:
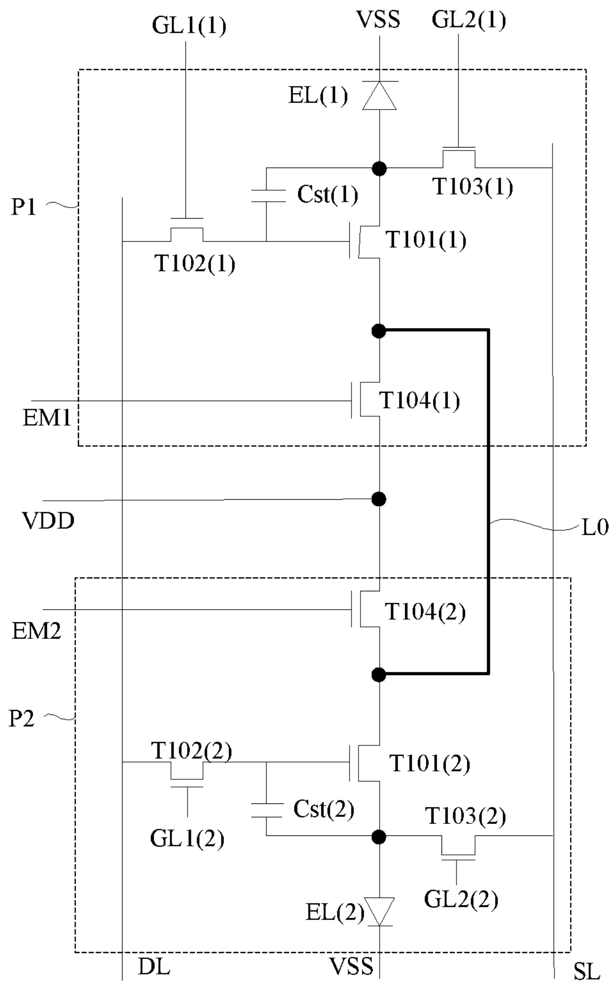
FIG. 6 is an equivalent circuit diagram of pixel driving circuits in two rows, in accordance with embodiments of the present disclosure.

In some embodiments, referring to FIG. 6, FIG. 6 is an equivalent circuit diagram of an odd-numbered row of sub-pixels P1 and an even-numbered row of sub-pixels P2 that are adjacent a group, where only one sub-pixel P in each row is exemplarily shown. The second electrode of the light-emitting control transistor T104(1) of the sub-pixel P1 in the odd-numbered row and the second electrode of the light-emitting control transistor T104(2) of the sub-pixel P2 in the even-numbered row are electrically connected through a connection line L0. In this way, a sub-pixel P1 in an odd-numbered row and a sub-pixel P2 in an even-numbered row that are adjacent in a group share a light-emitting control transistor T104.

In the same frame cycle F, one of the light-emitting control transistor T104(1) of the sub-pixel P1 in the odd-numbered row and the light-emitting control transistor T104(2) of the sub-pixel P2 in the even-numbered row performs modulation on light-emitting time of two light-emitting devices EL of the two corresponding sub-pixels P in the two rows, and the other one rests (which means that the other one remains in an off state in the corresponding frame cycle). In this way, the risk of damage or threshold voltage shift of the light-emitting control transistor T104 due to a long time operation may be reduced, and the reliability of the light-emitting control transistor T104 is improved.

In different frame cycles F, the light-emitting control transistor T104(1) of the sub-pixel P1 in the odd-numbered row and the light-emitting control transistor T104(2) of the sub-pixel P2 in the even-numbered row alternately perform modulation on the light-emitting time of the two light-emitting devices EL of the corresponding sub-pixels P in the two rows, and alternately rest.

In the related art, if the above-described pixel driving circuit is adopted (an odd-numbered row of sub-pixels P1 and an even-numbered row of sub-pixels P2 that are adjacent in a group share light-emitting control transistors T104), in a frame cycle, one of two light-emitting control scan lines EM electrically connected to a group of an odd-numbered row of sub-pixels P1 and an even-numbered row of sub-pixels P2 that are adjacent continues to output a turn-off voltage (a low-level voltage signal), and light-emitting control transistors T104 of one row of sub-pixels P electrically connected to the one light-emitting control scan line EM are in an off state; the other light-emitting control scan line EM outputs a pulse signal, and the pulse signal may also be a turn-off voltage in the sensing data writing phase B1, so that light-emitting control transistors T104 of one row of sub-pixels P electrically connected to the other light-emitting control scan line EM may also be in an off state. However, in the sensing data writing phase B1, when light-emitting control transistors T104 of a group of an odd-numbered row of sub-pixels P1 and an even-numbered row of sub-pixels P2 that are adjacent are all in an off state, and one of the odd-numbered row of sub-pixels P1 and the even-numbered row of sub-pixels P2 that are adjacent in the group is selected for compensation of light-emitting devices EL, light-emitting control transistors T104 of the selected row of sub-pixels P cannot be turned on, the anodes of the light-emitting devices EL are electrically insulated from the power supply voltage terminal VDD. As a result, the charging of the light emitting-devices EL cannot be accomplished, and the light emitting-devices EL cannot be compensated.

Figure 7:
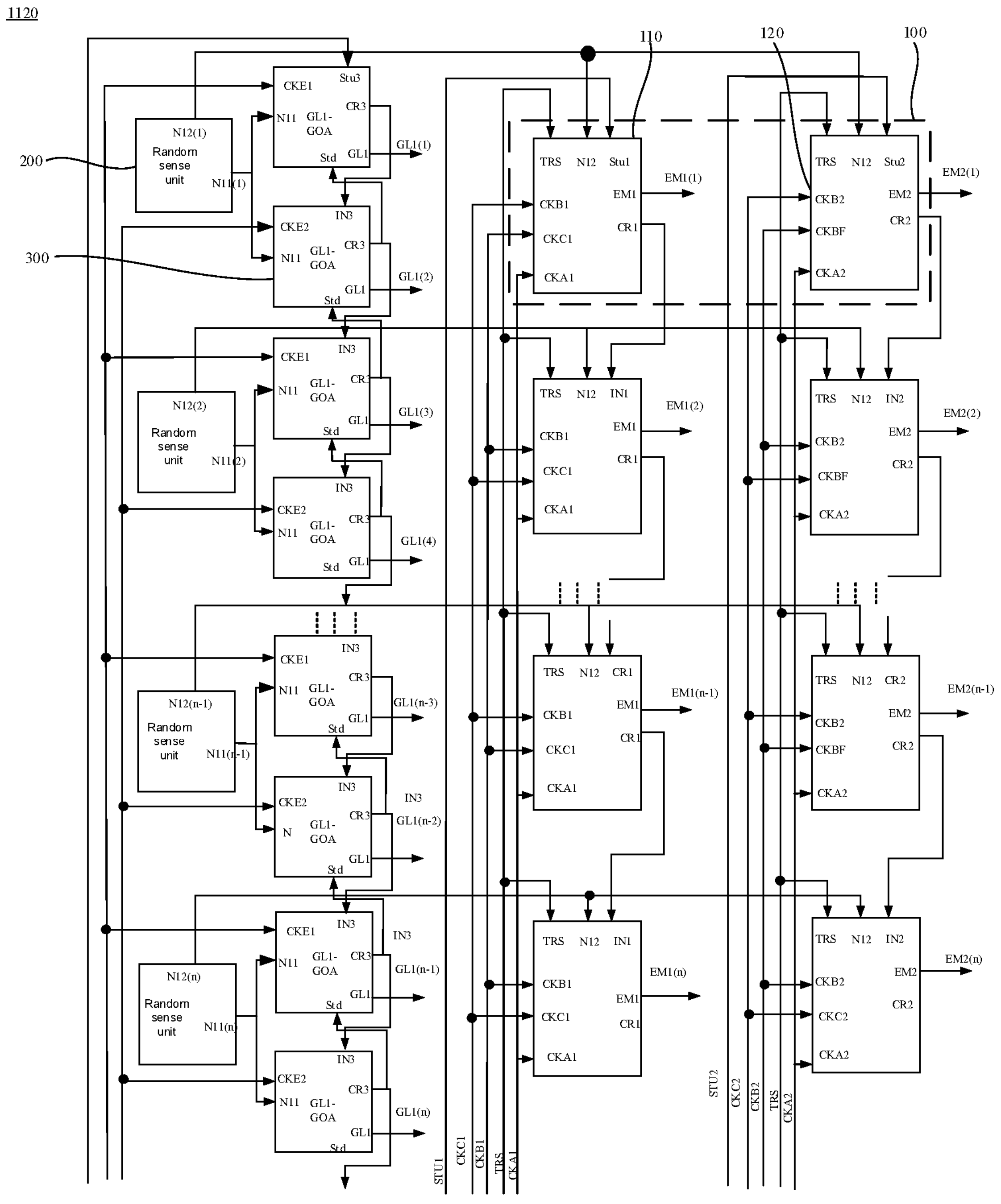
FIG. 7 is a diagram showing a cascade relationship of gate driving circuits, in accordance with embodiments of the present disclosure.

In order to solve the above problems, some embodiments of the present disclosure further provide a gate driving circuit 1120. Referring to FIG. 7, the gate driving circuit 1120 includes a light-emitting control circuit 100, a random detection circuit 200, and shift register circuits 300.

The random detection circuit 200 may also be referred to as a random sense unit. The random detection circuit 200 is configured to, in each frame cycle F, randomly select a row of sub-pixels P, and compensate for light-emitting devices EL of the selected row of sub-pixels P.

A plurality of shift register circuits 300 are sequentially connected in cascade. Each shift register circuit 300 is electrically connected to a first gate line GL1 and a second gate line GL2, and is configured to output a first scan signal to the first gate line GL1 and a second scan signal to the second gate line GL2. One random detection circuit 200 is electrically connected to two shift register circuits 300 (as shown in FIG. 8).

Figure 8:
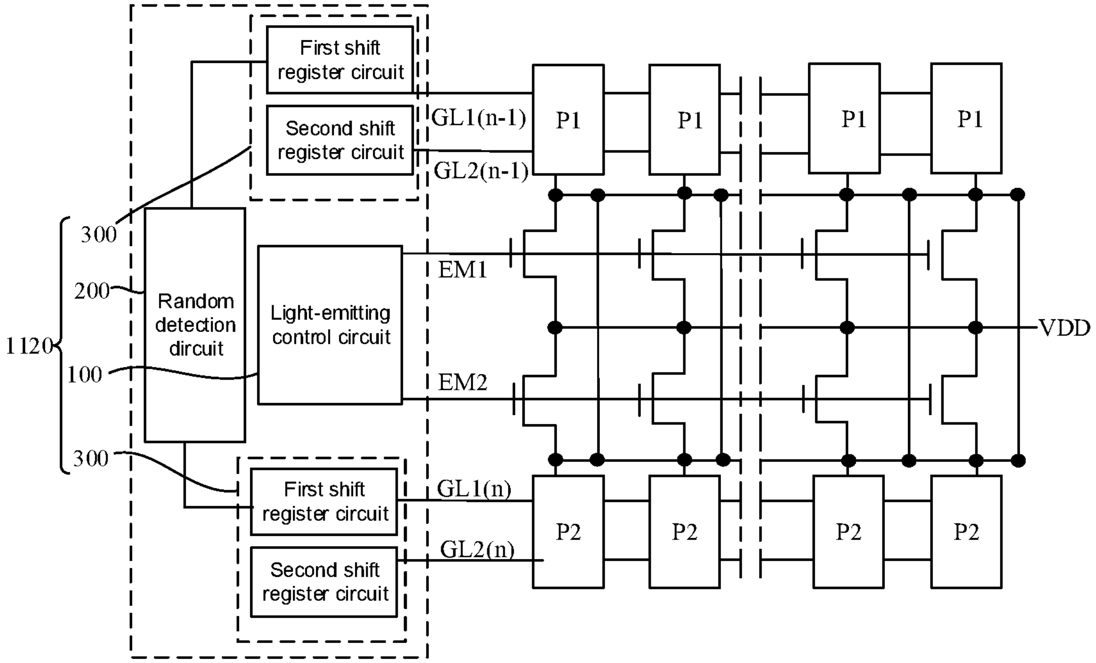
FIG. 8 is a diagram showing a connection relationship between a gate driving circuit and pixel driving circuits, in accordance with embodiments of the present disclosure.

For example, referring to FIG. 8, the shift register circuit 300 includes a first shift register sub-circuit GL1-GOA and a second shift register sub-circuit GL2-GOA. A plurality of first shift register sub-circuits GL1-GOA of the plurality of shift register circuits 300 are sequentially connected in cascade, and a plurality of second shift register sub-circuits GL2-GOA of the plurality of shift register circuits 300 are sequentially connected in cascade. It should be noted that only first shift register sub-circuits GL1-GOA are illustrated in FIG. 7.

Figure 9:
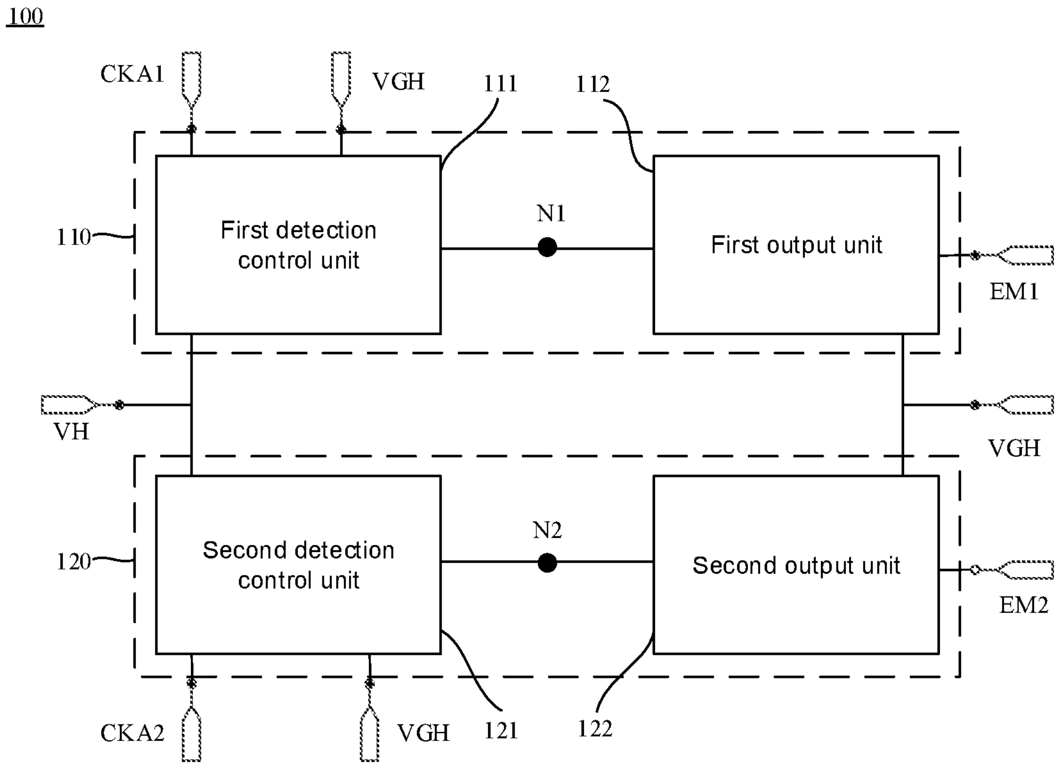
FIG. 9 is a structure diagram of a light-emitting control circuit, in accordance with embodiments of the present disclosure.

Referring to FIG. 9, FIG. 9 is a structure diagram of the light-emitting control circuit 100. The light-emitting control circuit 100 includes a first light-emitting control sub-circuit 110 and a second light-emitting control sub-circuit 120.

Referring to FIGS. 7 and 8, a plurality of light-emitting control circuits 100 of the plurality of gate driving circuits 1120 are sequentially connected in cascade. For example, first light-emitting control sub-circuits 110 of each gate driving circuit 1120 are connected in cascade, and a first cascade output signal terminal CR1 of a first light-emitting control sub-circuit 110 in a previous stage is electrically connected to a first input signal terminal IN1 of a first light-emitting control sub-circuit 110 in a current stage. Second light-emitting control sub-circuits 120 of each gate driving circuit 1120 are sequentially connected in cascade, and a second cascade output signal terminal CR2 of a second light-emitting control sub-circuit 120 in the previous stage is electrically connected to a second input signal terminal IN2 of a second light-emitting control sub-circuit 120 in the current stage.

Each light-emitting control circuit 100 is electrically connected to a first light-emitting control scan line EM1 and a second light-emitting control scan line EM2, and is configured to output light-emitting control signals through the first light-emitting control scan line EM1 and the second light-emitting control scan line EM2, so as to modulate light-emitting time of a group of adjacent odd-numbered row of sub-pixels P1 and even-numbered row of sub-pixels P2 electrically connected thereto.

For example, referring to FIGS. 8 and 9, each light-emitting control circuit 100 is electrically connected to a single group of an odd-numbered row of sub-pixels P1 and an even-numbered row of sub-pixels P2 that are adjacent. The first light-emitting control sub-circuit 110 of the light-emitting control circuit 100 is electrically connected to the odd-numbered row of sub-pixels P1, and the second light-emitting control sub-circuit 120 of the light-emitting control circuit 100 is electrically connected to the even-numbered row of sub-pixels P2. In this way, the first output signal terminal EM1 is electrically connected to the control electrodes of the light-emitting control transistors T104 of the odd-numbered row of sub-pixels P1, and the second output signal terminal EM2 is electrically connected to the control electrodes of the light-emitting control transistors T104 of the even-numbered row of sub-pixels P2.

In the embodiments of the present disclosure, in order to simplify the description, the first output signal terminal and the first light-emitting control signal line adopt the same sign EM1 to indicate that the first output signal terminal and the first light-emitting control signal line are electrically connected, and the second output signal terminal and the second light-emitting control signal line adopt the same sign EM2 to indicate that the second output signal terminal is electrically connected to the second light-emitting control signal line are electrically connected.

The first light-emitting control sub-circuit 110 includes a first detection control unit 111 and a first light-emitting output unit 112. The second light-emitting control sub-circuit 120 includes a second detection control unit 121 and a second light-emitting output unit 122.

The first detection control unit 111 is electrically connected to a detection control terminal VH, a first clock signal terminal CKA1, a first voltage signal terminal VGH and a first node N1, and is configured to transmit a first voltage signal from the first voltage signal terminal VGH to the first node N1 under control of a detection control signal from the detection control terminal VH and a first clock signal from the first clock signal terminal CKA1.

The first light-emitting output unit 112 is electrically connected to the first node N1, the first voltage signal terminal VGH and the first output signal terminal EM1, and is configured to transmit the first voltage signal to the first output signal terminal EM1 under control of a voltage of the first node N1.

The second detection control unit 121 is electrically connected to the detection control terminal VH, a second clock signal terminal CKA2, the first voltage signal terminal VGH and a second node N2, and is configured to transmit the first voltage signal to the second node N2 under control of the detection control signal and a second clock signal from the second clock signal terminal CKA2.

The second light-emitting output unit 122 is electrically connected to the second node N2, the first voltage signal terminal VGH and the second output signal terminal EM2, and is configured to transmit the first voltage signal to the second output signal terminal EM2 under control of a voltage of the second node N2.

In some embodiments, in a case where a row of sub-pixels P is selected and light-emitting devices EL of the row of sub-pixels P are compensated, the detection control terminal VH may output an operating voltage (a high-level voltage signal) to a light-emitting control circuit 100 electrically connected to the row of sub-pixels P.

For example, in a case where the Nth row of sub-pixels P (N is an even number) is selected and light-emitting devices EL of the Nth row of sub-pixels P are compensated, a detection control terminal VH of a second light-emitting control sub-circuit 120 electrically connected to the Nth row of sub-pixels and a detection control terminal VH of a first light-emitting control sub-circuit 110 electrically connected to the (N−1)th row of sub-pixels generate operating voltages (high-level voltage signals) simultaneously.

The first voltage signal terminal VGH may be a voltage signal terminal that continuously outputs a high level. Thus, the first voltage signal is a high-level voltage signal.

Figure 18:
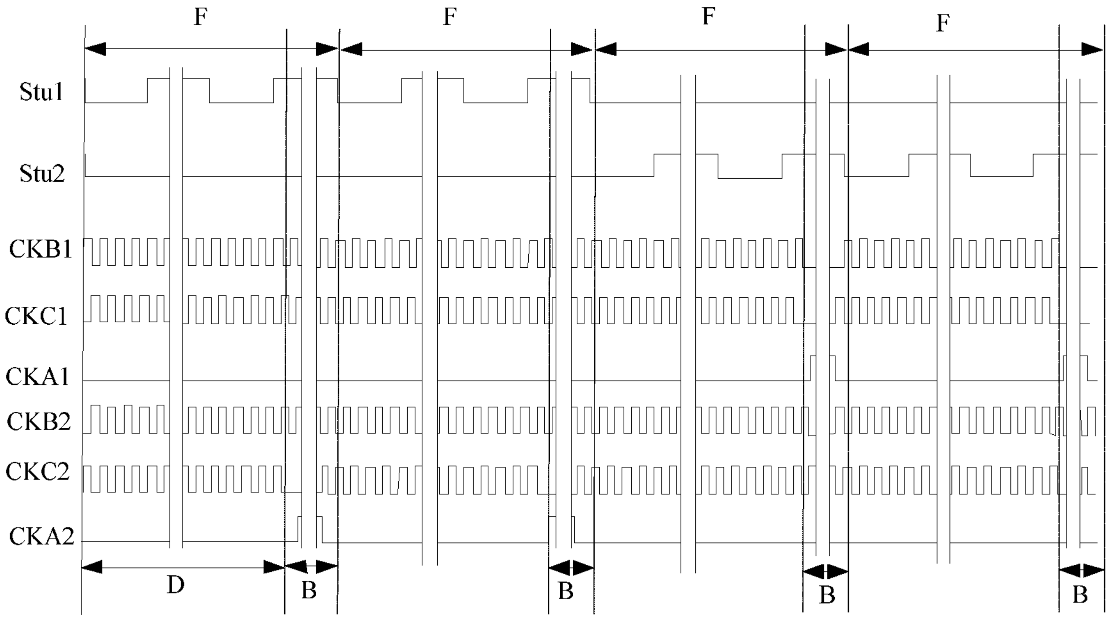
FIG. 18 is a timing control diagram of a light-emitting control circuit, in accordance with embodiments of the present disclosure.

In the same frame cycle F, one of the first clock signal terminal CKA1 and the second clock signal terminal CKA2 outputs a pulse signal in the blank phase B, and the other outputs a continuous low-level voltage signal. In different frame cycles, the first clock signal terminal CKA1 and the second clock signal terminal CKA2 alternately output pulse signals in the blank phases B (as shown in FIG. 18). In this way, only one of the first clock signal terminal CKA1 and the second clock signal terminal CKA2 outputs a pulse signal in the blank phase B of the same frame cycle F. Therefore, when one of an odd-numbered row of sub-pixels P1 and an even-numbered row of sub-pixels P2 that are adjacent in a group is selected for compensation of light-emitting devices, light-emitting control transistors T104 of one of the odd-numbered row of sub-pixels P1 and an even-numbered row of sub-pixels P2 are turned on, and light-emitting control transistors T104 of the other one of the odd-numbered row of sub-pixels P1 and an even-numbered row of sub-pixels P2 rest.

For example, the first clock signal terminal CKA1 and the second clock signal terminal CKA2 switch to output the pulse signal every one frame cycle F. That is, in a blank phase B of an odd-numbered (e.g., 1st, 3rd, 5th, etc.) frame cycle, one of the first clock signal terminal CKA1 and the second clock signal terminal CKA2 outputs the pulse signal; in a blank phase B of an even-numbered (e.g., 2nd, 4th, 6th, etc.) frame cycle, the other one of the first clock signal terminal CKA1 and the second clock signal terminal CKA2 outputs the pulse signal.

For example, the first clock signal terminal CKA1 and the second clock signal terminal CKA2 switch to output the pulse signal every two frame cycles (as shown in FIG. 18). That is, one of the first clock signal terminal CKA1 and the second clock signal terminal CKA2 outputs the pulse signal in a blank phase B of a first, third, fifth, . . . , and (N−1)th "two frame cycles"; the other one of the first clock signal terminal CKA1 and the second clock signal terminal CKA2 outputs the pulse signal in a blank phase B of a second, fourth, sixth, . . . , and Nth "two frame cycles". Here, N is an even number.

In a case where a row of sub-pixels P is selected for compensation, light-emitting control transistors T104 of one of an odd-numbered row of sub-pixels P1 and an even-numbered row of sub-pixels P2 that are adjacent in one group are turned on. The power supply voltage signal may be transmitted to first electrodes of two driving transistors T101 through a turned-on light-emitting control transistor T104 and a connection line L0, and anodes of light-emitting devices EL of sub-pixels P in the selected row are charged according to on states of the two driving transistors T101 (a driving transistor T101 of a sub-pixel P in the selected row is turned on under the sensing grayscale data VGm, and a driving transistor T101 of a sub-pixel P in another row is turned off during the sensing data writing phase B1).

In summary, the light-emitting control circuit 100 provided in the embodiments of the present disclosure includes the first detection control unit 111 and the second detection control unit 122. In a case where the light-emitting devices EL of the selected row of sub-pixels P are compensated, the driving transistors T101 of the selected row of sub-pixels P may be electrically connected to the power supply voltage signal terminal VDD through the first detection control unit 111 and the second detection control unit 122, and the anodes of the light-emitting devices EL of the selected row of sub-pixels P are charged when the driving transistors T101 are turned on, thereby realizing the compensation of the light-emitting devices EL of the selected row of-sub-pixels P. The selected row of sub-pixels P is a row of sub-pixels P where the light-emitting devices EL are compensated.

Some embodiments of the present disclosure further provide a control method of a light-emitting control circuit 100, which is used for driving the light-emitting control circuit 100 in any of the above embodiments. A frame cycle F includes a display phase D and a blank phase B. The control method includes the followings.

One of an odd-numbered row of sub-pixels P1 and an even-numbered row of sub-pixels P2 that are adjacent in a group is selected for compensation of light-emitting devices EL.

In the blank phase B, the first detection control unit 111 of the first light-emitting control sub-circuit 110 of the light-emitting control circuit 100 transmits the first voltage signal to the first node N1, and the first light-emitting output unit 112 of the first light-emitting control sub-circuit 110 transmits the first voltage signal to the first output signal terminal EM1 under control of the voltage of the first node N1, so that operating currents respectively flow through light-emitting devices EL of the odd-numbered row of sub-pixels P1 or the even-numbered row of sub-pixels P2.

Alternatively, the second detection control unit 121 of the second light-emitting control sub-circuit 120 of the light-emitting control circuit 100 transmits the first voltage signal to the second node N2, and the second light-emitting output unit 122 of the second light-emitting control sub-circuit 120 transmits the first voltage signal to the second output signal terminal EM2 under control of the voltage of the second node N2, so that the operating currents respectively flow through the light-emitting devices EL of the odd-numbered row of sub-pixels P1 or the even-numbered row of sub-pixels P2.

For example, in a case where the light-emitting devices EL of the selected row of sub-pixels P are compensated, the detection control terminal VH outputs the operating voltage signal to the light-emitting control circuit 100 electrically connected to the selected row of sub-pixels P.

Then, the first detection control unit 111 transmits the first voltage signal from the first voltage signal terminal VGH to the first node N1 under control of a detection signal (an operating voltage signal) from the detection control terminal VH and the first clock signal from the first clock signal terminal CKA1.

Next, the first light-emitting output unit 112 transmits the first voltage signal from the first voltage signal terminal VGH to the first output signal terminal EM1 under control of the voltage of the first node N1 (the first voltage signal).

Alternatively, for example, the second detection control unit 121 transmits the first voltage signal from the first voltage signal terminal VGH to the second node N2 under control of the detection signal from the detection control terminal VH and the second clock signal from the second clock signal terminal CKA2.

Next, the second light-emitting output unit 122 transmits the first voltage signal from the first voltage signal terminal VGH to the second output signal terminal EM2 under control of the voltage of the second node N2 (the first voltage signal).

That is, in a case where one of the odd-numbered row of sub-pixels P1 and the even-numbered row of sub-pixels P2 that are adjacent in the group is selected for compensation of light-emitting devices EL, one of the first output signal terminal EM1 and the second output signal terminal EM2 of the light-emitting control circuit 100 outputs the first voltage signal, so that light-emitting control transistors T104 corresponding to the row of sub-pixels P may be turned on.

For example, the first output signal terminal EM1 of the light-emitting control circuit 100 outputs the first voltage signal, and the first voltage signal is transmitted from the first output signal terminal EM1 through the light-emitting control scan line EM1 to the gates of the light-emitting control transistors T104(1) of the odd-numbered row of sub-pixels P1, the light-emitting control transistors T104(1) are turned on, and the power supply voltage signal from the power supply voltage signal terminal VDD is transmitted through the light-emitting control transistors T104(1) of the odd-numbered row of sub-pixels P1 and connection lines L0 to the first electrodes of the driving transistors T101(1) of the odd-numbered row of sub-pixels P1 and the first electrodes of the driving transistors T101(2) of the even-numbered row of sub-pixels P2. Then, the driving transistors T101 of the selected row of sub-pixels P are turned on, and the anodes of the light-emitting devices 120 of the selected row of sub-pixels P are charged. Therefore, the row of sub-pixels P realizes the compensation of the light-emitting devices EL.

Figure 10:
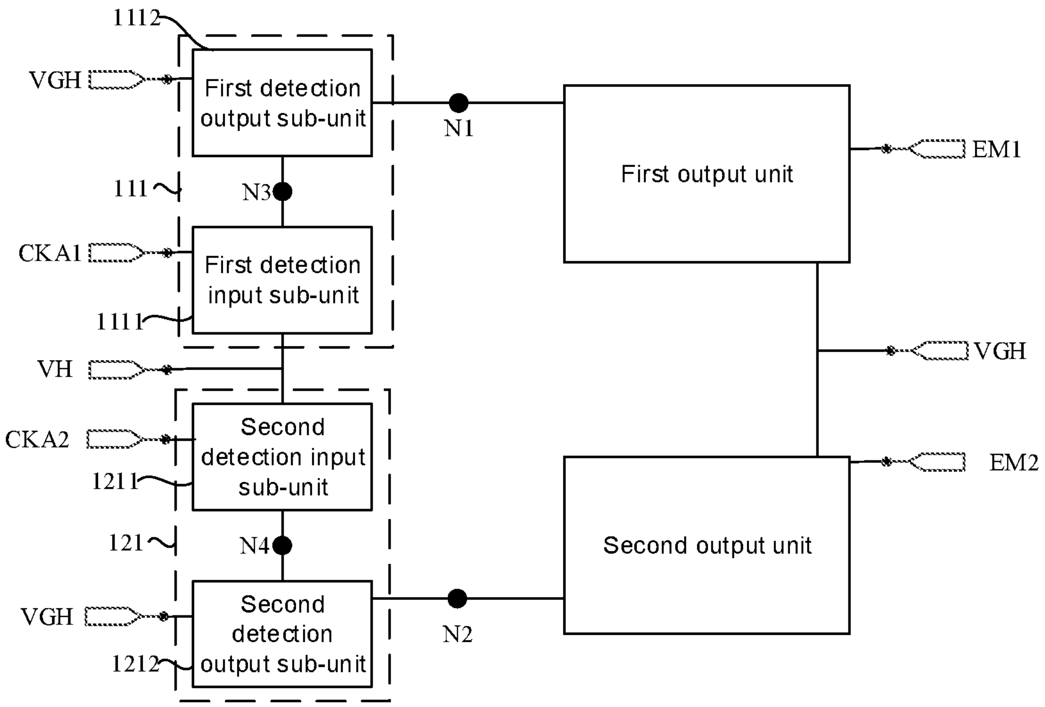
FIG. 10 is a structure diagram of another light-emitting control circuit, in accordance with embodiments of the present disclosure.

In some embodiments, referring to FIG. 10, the first detection control unit 111 includes a first detection input sub-unit 1111 and a first detection output sub-unit 1112.

The first detection input sub-unit 1111 is electrically connected to the detection control terminal VH, the first clock signal terminal CKA1 and a third node N3, and is configured to transmit the first clock signal to the third node N3 under control of the detection control signal.

The first detection output sub-unit 1112 is electrically connected to the third node N3, the first voltage signal terminal VGH and the first node N1, and is configured to transmit the first voltage signal to the first node N1 under control of a voltage of the third node N3 (the first clock signal).

Figure 12:
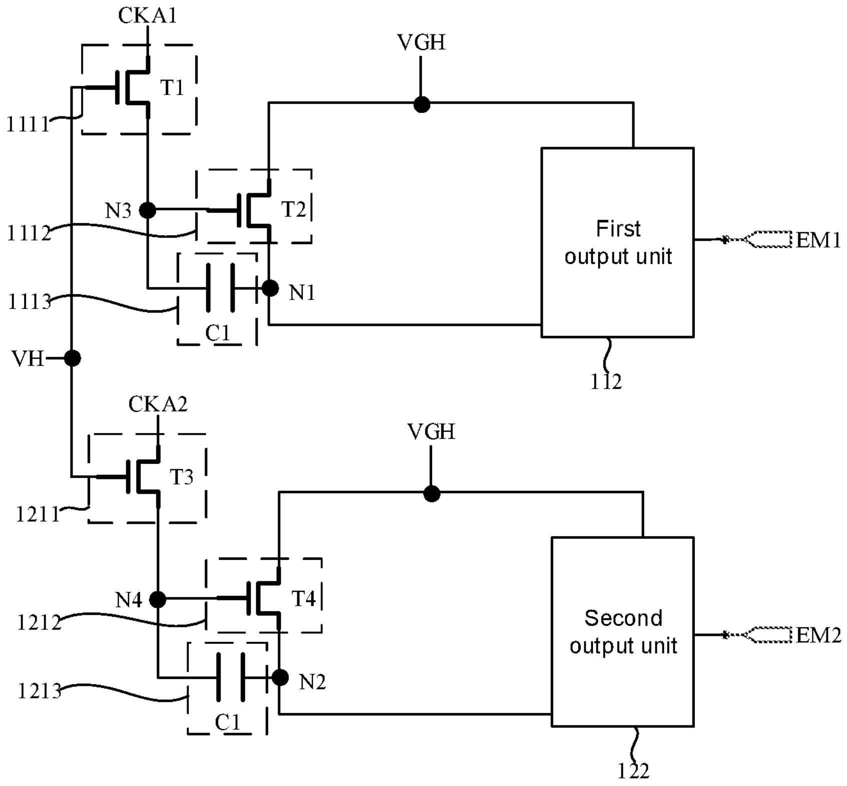
FIG. 12 is an equivalent circuit diagram of a first detection control unit and a second detection control unit, in accordance with embodiments of the present disclosure.

For example, referring to FIG. 12, the first detection input sub-unit 1111 includes a first transistor T1. A control electrode of the first transistor T1 is electrically connected to the detection control terminal VH, a first electrode of the first transistor T1 is electrically connected to the first clock signal terminal CKA1, and a second electrode of the first transistor T1 is electrically connected to the third node N3.

For example, referring to FIG. 12, the first detection output sub-unit 1112 includes a second transistor T2. A control electrode of the second transistor T2 is electrically connected to the third node N3, a first electrode of the second transistor T2 is electrically connected to the first voltage signal terminal VGH, and a second electrode of the second transistor T2 is electrically connected to the first node N1.

In some embodiments, referring to FIG. 10, the second detection control unit 121 includes a second detection input sub-unit 1211 and a second detection output sub-unit 1212.

The second detection input sub-unit 1211 is electrically connected to the detection control terminal VH, the second clock signal terminal CKA2 and a fourth node N4, and is configured to transmit the second clock signal to the fourth node N4 under control of the detection control signal.

The second detection output sub-unit 1212 is electrically connected to the fourth node N4, the first voltage signal terminal VGH and the second node N2, and is configured to transmit the first voltage signal to the second node N2 under control of a voltage of the fourth node N4 (the second clock signal).

For example, referring to FIG. 12, the second detection input sub-unit 1211 includes a third transistor T3. A control electrode of the third transistor T3 is electrically connected to the detection control terminal VH, a first electrode of the third transistor T3 is electrically connected to the second clock signal terminal CKA2, and a second electrode of the third transistor T3 is electrically connected to the fourth node N4.

For example, referring to FIG. 12, the second detection output sub-unit 1212 includes a fourth transistor T4. A control electrode of the fourth transistor T4 is electrically connected to the fourth node N4, a first electrode of the fourth transistor T4 is electrically connected to the first voltage signal terminal VGH, and a second electrode of the fourth transistor T4 is electrically connected to the second node N2.

Figure 11:
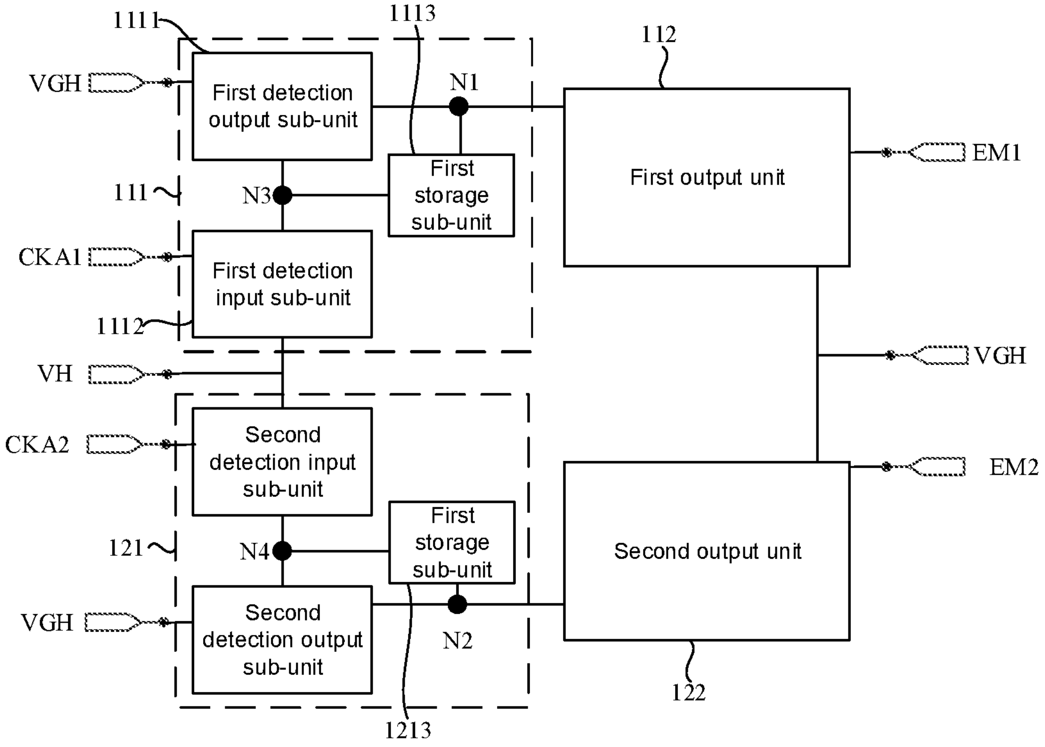
FIG. 11 is a structure diagram of yet another light-emitting control circuit, in accordance with embodiments of the present disclosure.

In some embodiments, referring to FIG. 11, the first detection control unit 111 further includes a first storage sub-unit 1113. The first storage sub-unit 1113 is electrically connected to the first node N1 and the third node N3, and is configured to maintain the voltage of the third node N3. The first clock signal input from the first clock signal terminal CKA1 to the third node N3 may be a pulse signal. The first storage sub-unit 1113 can make the voltage of the third node N3 be kept at a voltage of the first clock signal for a certain time; and when the voltage of the first node N1 jumps (increases or decreases), the voltage of the third node N3 jumps accordingly.

For example, referring to FIG. 12, the first storage sub-unit 1113 includes a first capacitor C1, a first electrode plate of the first capacitor C1 is electrically connected to the third node N3, and a second electrode plate of the first capacitor C1 is electrically connected to the first node N1.

In a case where a pulse width of the first clock signal CKA1 transmitted to the third node N3 is small, after the detection control signal controls the first transistor T1 to be turned off, the first storage sub-unit 1113 may make the third transistor T3 continuously input the first voltage signal to the first node N1 within a certain time, so that the first output signal terminal EM1 outputs a continuous operating voltage signal, which is beneficial for the power supply voltage signal terminal VDD to charge the anodes of the light-emitting devices EL.

In some embodiments, referring to FIG. 11, the second detection control unit 121 further includes a second storage sub-unit 1213. The second storage sub-unit 1213 is electrically connected to the second node N2 and the fourth node N4, and is configured to maintain the voltage of the fourth node N4. The second clock signal input from the second clock signal terminal CKA2 to the fourth node N4 may be a pulse signal, and the second storage sub-unit 1213 can make the voltage of the fourth node N4 be kept at the voltage of the first clock signal for a certain time; and when the voltage of the second node N2 jumps (increases or decreases), the voltage of the fourth node N4 jumps accordingly.

For example, referring to FIG. 12, the second storage sub-unit 1213 includes a second capacitor C2, a first electrode plate of the second capacitor C2 is electrically connected to the fourth node N4, and a second electrode plate of the second capacitor C2 is electrically connected to the second node N2.

The second storage sub-unit 1213 can achieve the same effects as the first storage sub-unit 1113, and details will not be repeated here.

In some embodiments, referring to FIG. 12, the first detection input sub-unit 1111 includes a first transistor T1; the first detection output sub-unit 1112 includes a second transistor T2; the first storage sub-unit 1113 includes a first capacitor C1; the second detection input sub-unit 1211 includes a third transistor T3; the second detection output sub-unit 1212 includes a fourth transistor T4; and the second storage sub-unit 1213 includes a second capacitor C2.

A control electrode of the first transistor T1 is electrically connected to the detection control terminal VH, a first electrode of the first transistor T1 is electrically connected to the first clock signal terminal CKA1, and a second electrode of the first transistor T1 is electrically connected to the third node N3. A control electrode of the second transistor T2 is electrically connected to the third node N3, a first electrode of the second transistor T2 is electrically connected to the first voltage signal terminal VGH, and a second electrode of the second transistor T2 is electrically connected to the first node N1. A first electrode plate of the first capacitor C1 is coupled to the third node N3, and a second electrode plate of the first capacitor C1 is coupled to the first node N1. A control electrode of the third transistor T3 is electrically connected to the detection control terminal VH, a first electrode of the third transistor T3 is electrically connected to the second clock signal terminal CKA2, and a second electrode of the third transistor T3 is electrically connected to the fourth node N4. A control electrode of the fourth transistor T4 is electrically connected to the fourth node N4, a first electrode of the fourth transistor T4 is electrically connected to the first voltage signal terminal VGH, and a second electrode of the fourth transistor T4 is electrically connected to the second node N2. A first electrode plate of the second capacitor C2 is electrically connected to the fourth node N4, and a second electrode plate of the second capacitor C2 is electrically connected to the second node N2.

Figure 13:
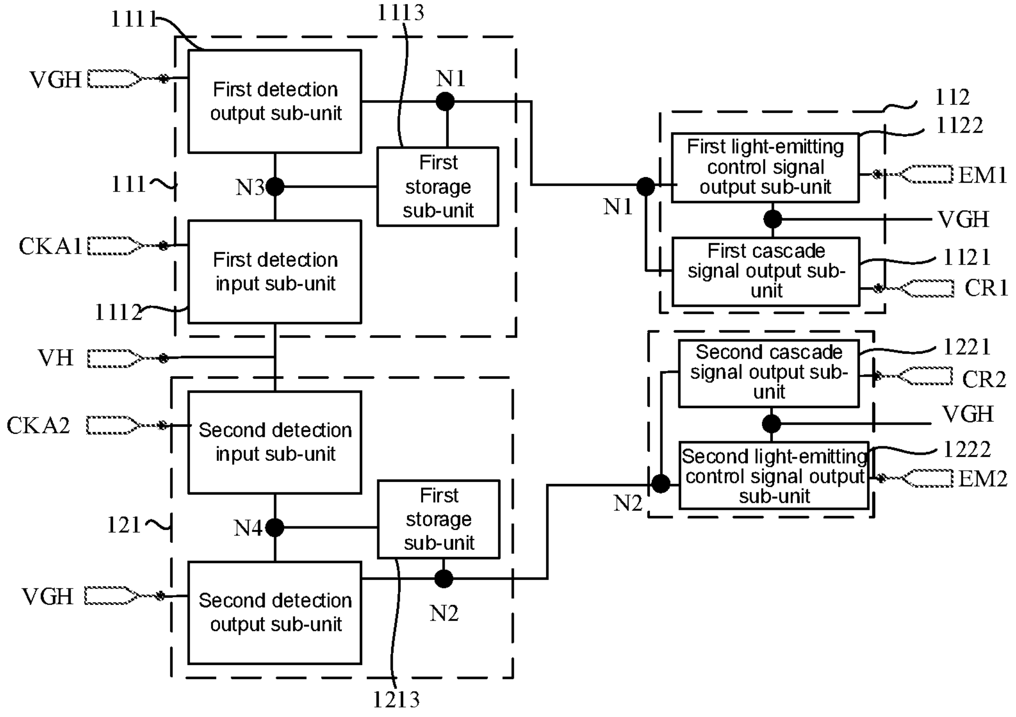
FIG. 13 is a structure diagram of yet another light-emitting control circuit, in accordance with embodiments of the present disclosure.

In some embodiments, referring to FIG. 13, the first light-emitting output unit 112 may include a first cascade signal output sub-unit 1121 and a first light-emitting control signal output sub-unit 1122.

The first cascade signal output sub-unit 1121 is electrically connected to the first node N1, the first voltage signal terminal VGH and the first cascade output signal terminal CR1, and is configured to transmit the first voltage signal from the first voltage signal terminal VGH to the first cascade output signal terminal CR1 under control of the voltage of the first node N1, so as to output a first cascade signal to a first input signal terminal IN1 of a first light-emitting control sub-circuit 110 of a next light-emitting control circuit 100.

Figure 14A:
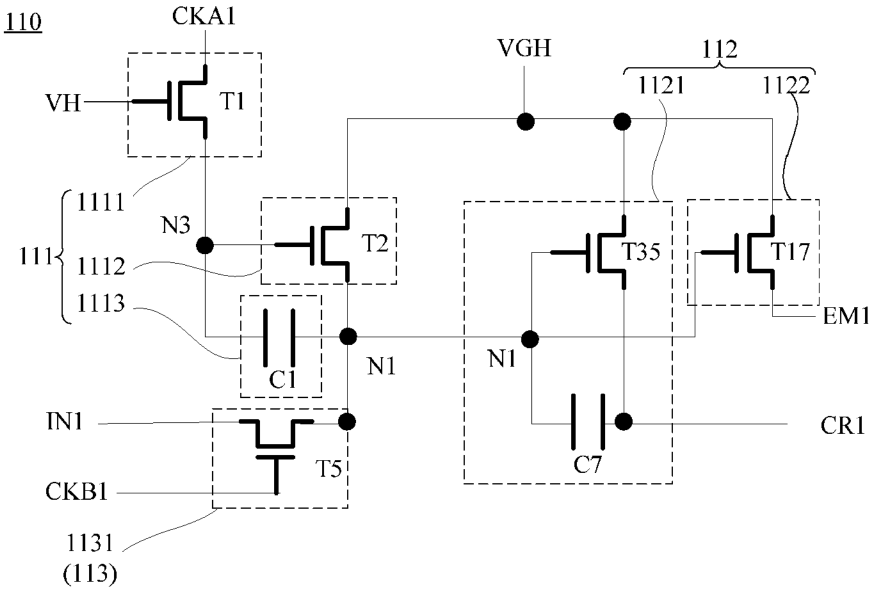
FIG. 14A is an equivalent circuit diagram of a first light-emitting control sub-circuit, in accordance with embodiments of the present disclosure.

For example, referring to FIG. 14A, the first cascade signal output sub-unit 1121 includes a thirty-fifth transistor T35 and a seventh capacitor C7. A control electrode of the thirty-fifth transistor T35 is electrically connected to the first node N1, a first electrode of the thirty-fifth transistor T35 is electrically connected to the first voltage signal terminal VGH, and a second electrode of the thirty-fifth transistor T35 is electrically connected to the first cascade output signal terminal CR1. A first electrode plate of the seventh capacitor C7 is electrically connected to the first node N1, and a second electrode plate of the seventh capacitor C7 is electrically connected to the first cascade output signal terminal CR1.

For example, in two first light-emitting control circuits 110 that are connected in cascade, a first cascade output signal terminal CR1 of a current-stage first light-emitting control circuit 110 is electrically connected to a first input signal terminal IN1 of a next-stage first light-emitting control circuit 110.

The first light-emitting control signal output sub-unit 1122 is electrically connected to the first node N1, the first voltage signal terminal VGH and the first output signal terminal EM1, and is configured to transmit the first voltage signal from the first voltage signal terminal VGH to the first output signal terminal EM1 under control of the voltage of the first node N1, so as to output a light-emitting control signal to a first light-emitting control scan line EM1 of an odd-numbered row of sub-pixels P1 to turn on or off light-emitting control transistors T104(1) of the odd-numbered row of sub-pixels P1.

Referring to FIG. 14A, the first light-emitting control signal output sub-unit 1122 of the first light-emitting output unit 112 includes a seventeenth transistor T17, a control electrode of the seventeenth transistor T17 is electrically connected to the first node N1, a first electrode of the seventeenth transistor T17 is electrically connected to the first voltage signal terminal VGH, and a second electrode of the seventeenth transistor T17 is electrically connected to the first output signal terminal EM1.

Referring to FIG. 13, the second light-emitting output unit 122 may include a second cascade signal output sub-unit 1221 and a second light-emitting control signal output sub-unit 1222.

The second cascade signal output sub-unit 1221 is electrically connected to the second node N2, the first voltage signal terminal VGH and the second cascade output signal terminal CR2, and is configured to transmit the first voltage signal from the first voltage signal terminal VGH to the second cascade output signal terminal CR2 under control of the voltage of the second node N2, so as to output a second cascade signal to a second light-emitting control sub-circuit 120 of a next light-emitting control circuit 100.

Figure 14B:
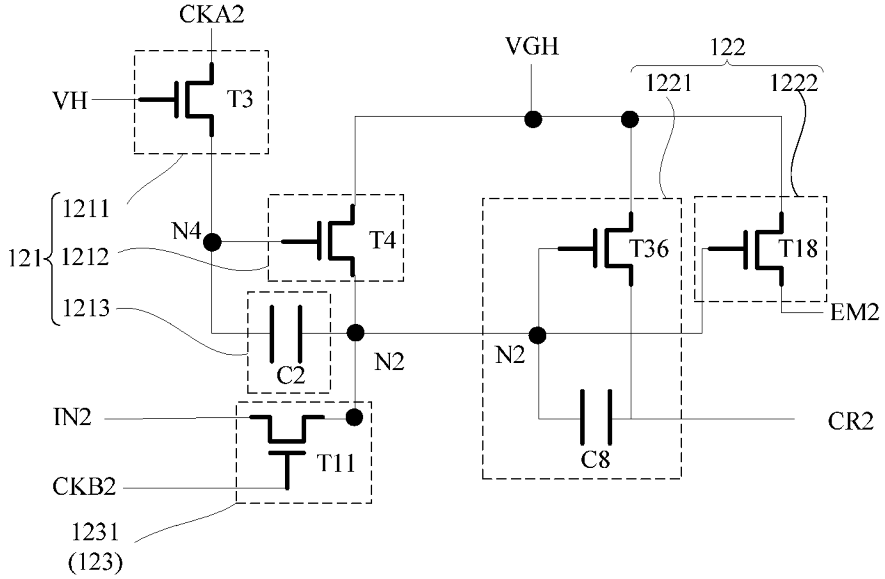
FIG. 14B is an equivalent circuit diagram of a second light-emitting control sub-circuit, in accordance with embodiments of the present disclosure.

For example, referring to FIG. 14B, the second cascade signal output sub-unit 1221 includes a thirty-sixth transistor T36 and an eighth capacitor C8. A control electrode of the thirty-sixth transistor T36 is electrically connected to the second node N2, a first electrode of the thirty-sixth transistor T36 is electrically connected to the first voltage signal terminal VGH, and a second electrode of the thirty-sixth transistor T36 is electrically connected to the second cascade output signal terminal CR2. A first electrode plate of the eighth capacitor C8 is electrically connected to the second node N2, and a second electrode plate of the eighth capacitor C8 is electrically connected to the second cascade output signal terminal CR2.

For example, in two second light-emitting control circuits 120 that are connected in cascade, a second cascade output signal terminal CR2 of a current-stage second light-emitting control circuit 120 is electrically connected to a second input signal terminal IN2 of a next-stage second light-emitting control circuit 120.

Referring to FIG. 13, the second light-emitting control signal output sub-unit 1222 is electrically connected to the second node N2, the first voltage signal terminal VGH and the second output signal terminal EM2, and is configured to transmit the first voltage signal from the first voltage signal terminal VGH to the second output signal terminal EM2 under control of the voltage of the second node N2, so as to output an light-emitting control signal to a second light-emitting control scan line EM2 of an even-numbered row of sub-pixels P2 to turn on or off light-emitting control transistors T104 of the even-numbered row of sub-pixels.

For example, referring to FIG. 14B, the second light-emitting control signal output sub-unit 1222 of the second light-emitting output unit 122 includes an eighteenth transistor T18, a control electrode of the eighteenth transistor T18 is electrically connected to the second node N2, a first electrode of the eighteenth transistor T18 is electrically connected to the first voltage signal terminal VGH, and a second electrode of the eighteenth transistor T18 is electrically connected to the second output signal terminal EM2.

Figure 15:
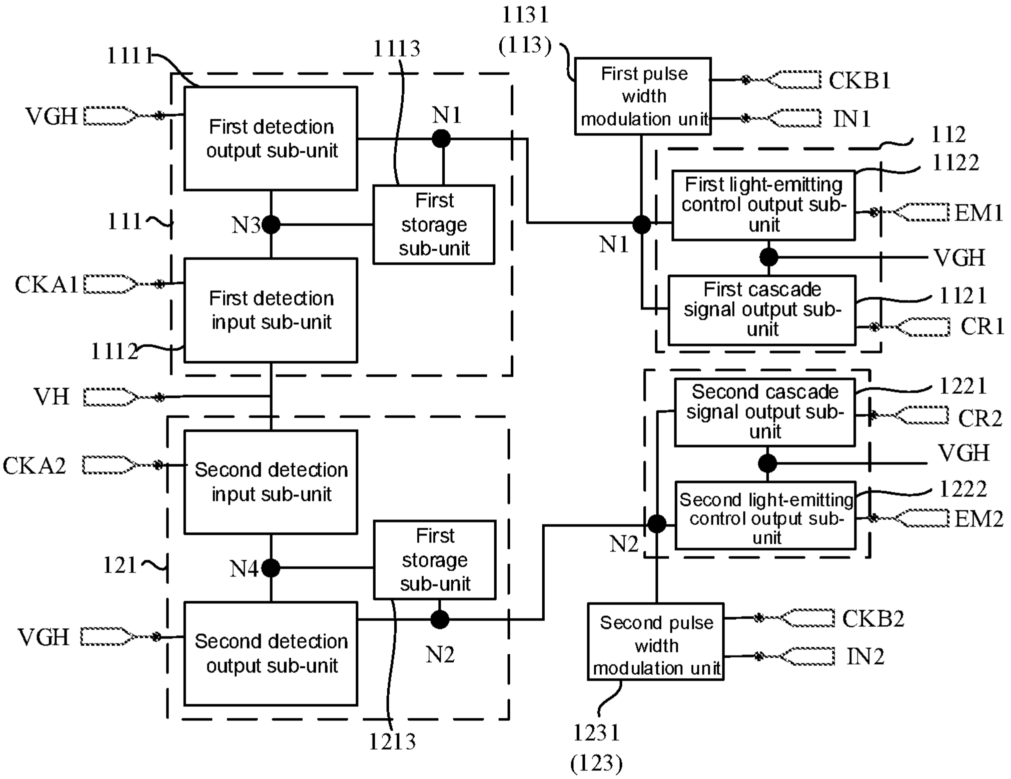
FIG. 15 is a structure diagram of yet another light-emitting control circuit, in accordance with embodiments of the present disclosure.

In some embodiments, referring to FIG. 15, the first light-emitting control sub-circuit 110 of the light-emitting control circuit 100 further includes a first pulse width modulation unit 113, and the second light-emitting control sub-circuit 120 further includes a second pulse width modulation unit 123.

The first pulse width modulation unit 113 may include a first input sub-unit 1131. The first input sub-unit 1131 of the first pulse width modulation unit 113 is electrically connected to the first input signal terminal IN1, a third clock signal terminal CKB1 and the first node N1, and is configured to transmit a first input signal from the first input signal terminal IN1 to the first node N1 under control of a third clock signal from the third clock signal terminal CKB1.

For example, referring to FIG. 14A, the first input sub-unit 1131 may include a fifth transistor T5, a control electrode of the fifth transistor T5 is electrically connected to the third clock signal terminal CKB1, a first electrode of the fifth transistor T5 is electrically connected to the first input signal terminal IN1, and a second electrode of the fifth transistor T5 is electrically connected to the first node N1.

The first input signal terminal IN1 may be electrically connected to a first cascade output signal terminal CR1 of a previous-stage light-emitting control circuit 100, and the first input signal is a first cascade signal output by the previous-stage light-emitting control circuit 100. A first input signal terminal IN1 of a first-stage light-emitting control circuit 100 may be electrically connected to a first start signal terminal STU1 (as shown in FIG. 7).

Figure 16A:
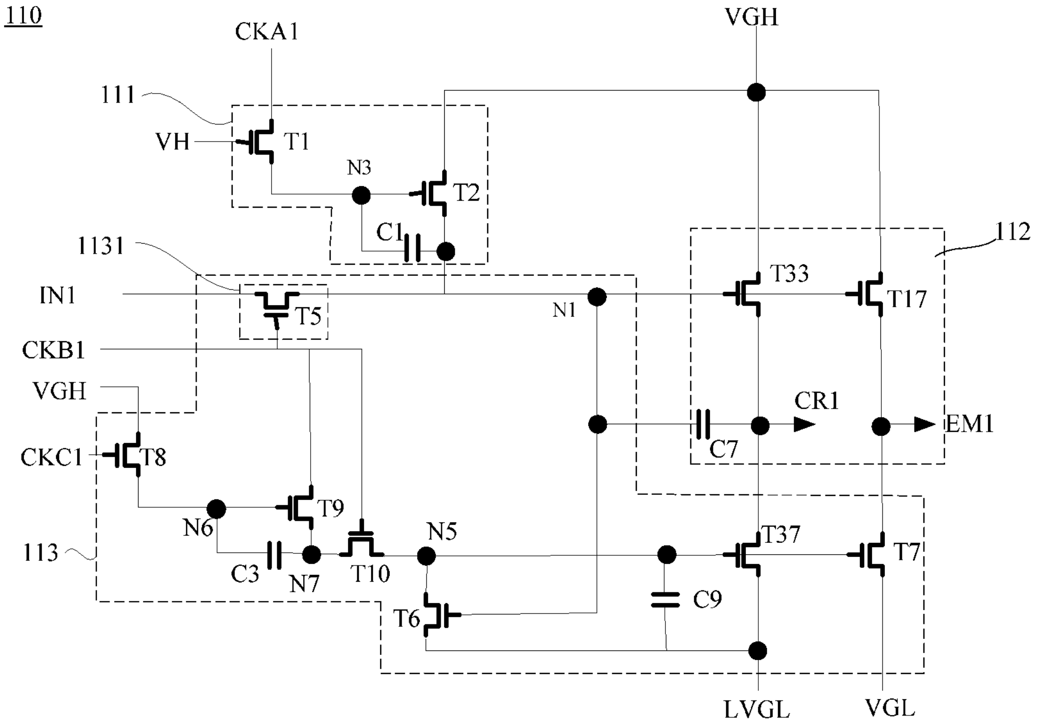
FIG. 16A is an equivalent circuit diagram of another first light-emitting control sub-circuit, in accordance with embodiments of the present disclosure.

In some embodiments, referring to FIG. 16A, FIG. 16A is an equivalent circuit diagram of the first light-emitting control sub-circuit 110, and the first pulse width modulation unit 113 may further include a sixth transistor T6, a seventh transistor T7, an eighth transistor T8, a ninth transistor T9, a tenth transistor T10, a thirty-seventh transistor T37, and a third capacitor C3.

A control electrode of the sixth transistor T6 is electrically connected to the first node N1, a first electrode of the sixth transistor T6 is electrically connected to a second voltage signal terminal LVGL, and a second electrode of the sixth transistor T6 is electrically connected to a fifth node N5. The sixth transistor T6 is configured to transmit a second voltage signal from the second voltage signal terminal LVGL to the fifth node N5 under control of the voltage of the first node N1.

For example, the second voltage signal terminal LVGL may continuously output a turn-off voltage signal.

A control electrode of the seventh transistor T7 is electrically connected to the fifth node N5, a first electrode of the seventh transistor T7 is electrically connected to a third voltage signal terminal VGL, and a second electrode of the seventh transistor T7 is electrically connected to the first output signal terminal EM1. The seventh transistor T7 is configured to transmit a third voltage signal from the third voltage signal terminal VGL to the first output signal terminal EM1 under control of a voltage of the fifth node N5.

For example, the third voltage signal terminal VGL may continuously output a turn-off voltage signal.

It is understood that the second voltage signal terminal LVGL and the third voltage signal terminal VGL may each continuously output a turn-off voltage signal. A voltage level output by the third voltage signal terminal VGL and a voltage level output by the second voltage signal terminal LVGL may be the same; or a voltage of the voltage signal output by the third voltage signal terminal VGL is higher than a voltage of the voltage signal output by the second voltage signal terminal LVGL. For example, the voltage of the voltage signal output by the third voltage signal terminal VGL is higher than the voltage of the voltage signal output by the second voltage signal terminal LVGL.

A control electrode of the eighth transistor T8 is electrically connected to a fifth clock signal terminal CKC1, a first electrode of the eighth transistor T8 is electrically connected to the first voltage signal terminal VGH, and a second electrode of the eighth transistor T8 is electrically connected to a sixth node N6.

A control electrode of the ninth transistor T9 is electrically connected to the sixth node N6, a first electrode of the ninth transistor T9 is electrically connected to the third clock signal terminal CKB1, and a second electrode of the ninth transistor T9 is electrically connected to a seventh node N7.

A control electrode of the tenth transistor T10 is electrically connected to the first input signal terminal IN1, a first electrode the tenth transistor T10 is electrically connected to the seventh node N7, and a second electrode the tenth transistor T10 is electrically connected to the fifth node N5.

A first electrode plate of the third capacitor C3 is coupled to the sixth node N6, and a second electrode plate of the third capacitor C3 is coupled to the seventh node N7.

The eighth transistor T8, the ninth transistor T9, the tenth transistor T10, and the third capacitor C3 are configured to transmit the first voltage signal to the fifth node N5 under control of a fifth clock signal from the fifth clock signal terminal CKC1, the third clock signal from the third clock signal terminal CKB1, and the first voltage signal of the first voltage signal terminal VGH.

A control electrode of the thirty-seventh transistor T37 is electrically connected to the fifth node N5, a first electrode of the thirty-seventh transistor T37 is electrically connected to the second voltage signal terminal LVGL, and a second electrode of the thirty-seventh transistor T37 is electrically connected to the first cascade output signal terminal CR1. The thirty-seventh transistor T37 is configured to transmit the second voltage signal from the second voltage signal terminal LVGL to the first cascade output signal terminal CR1 under control of the voltage of the fifth node N5.

The functions that can be realized by the transistors and the third capacitor C3 of the first pulse width modulation unit 113 are not described in details here.

Figure 17A:
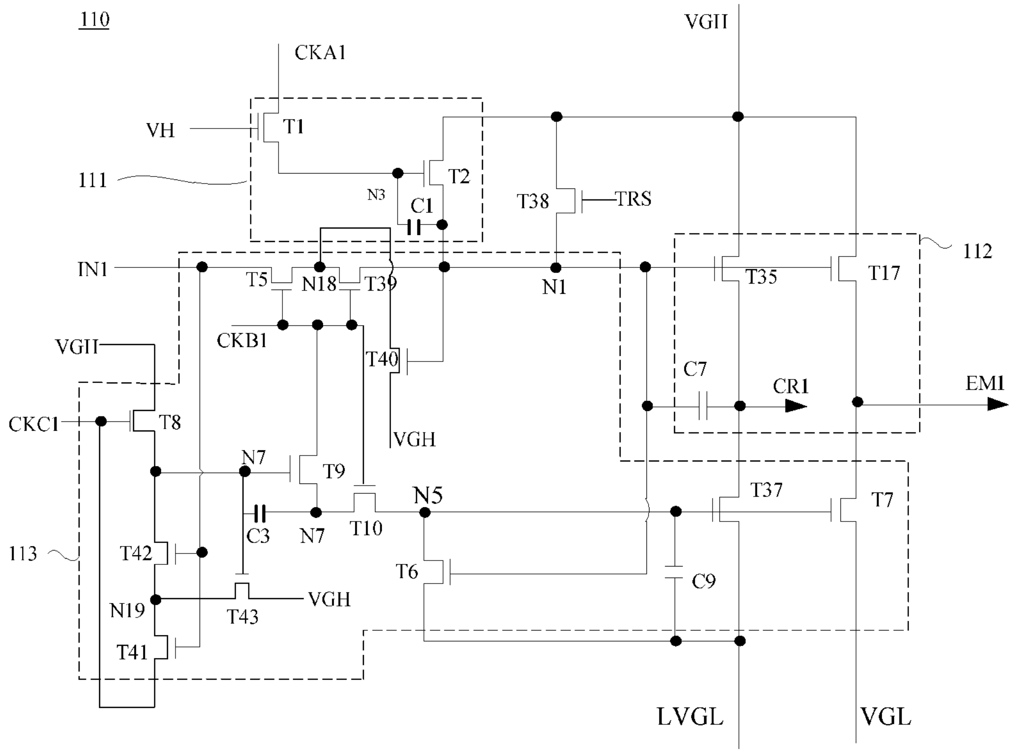
FIG. 17A is an equivalent circuit diagram of yet another first light-emitting control sub-circuit, in accordance with embodiments of the present disclosure.

In some embodiments, referring to FIG. 17A, the first pulse width modulation unit 113 may further include a thirty-eighth transistor T38, a thirty-ninth transistor T39, a fortieth transistor T40, a forty-first transistor T41, a forty-second transistor T42, a forty-third transistor T43, and a ninth capacitor C9.

A control electrode of the thirty-eighth transistor T38 is electrically connected to a start reset control terminal TRS, a first electrode of the thirty-eighth transistor T38 is electrically connected to the first voltage signal terminal VGH, and a second electrode of the thirty-eighth transistor T38 is electrically connected to the first node N1. The thirty-eighth transistor T38 is configured to transmit the first voltage signal from the first voltage signal terminal VGH to the first node N1 under control of a reset signal from the start reset control terminal TRS.

It will be understood that the start reset control terminal TRS is normally used for initialization of a circuit in time of a few frames after being powered on and before a first frame arrives, and the start reset control terminal TRS remains constant low during the display.

A control electrode of the thirty-ninth transistor T39 is electrically connected to the third clock signal terminal CKB1, a first electrode of the thirty-ninth transistor T39 is electrically connected to an eighteenth node N18, and a second electrode of the thirty-ninth transistor T39 is electrically connected to the first node N1. A control electrode of the fortieth transistor T40 is electrically connected to the first node N1, a first electrode of the fortieth transistor T40 is electrically connected to the first voltage signal terminal VGH, and a second electrode of the fortieth transistor T40 is electrically connected to the eighteenth node N18.

It will be understood that, in a case where the first pulse width modulation unit 113 includes the thirty-ninth transistor T39 and the fortieth transistor T40, referring to FIG. 17A, the second electrode of the fifth transistor T5 is electrically connected to the eighteenth node N18, and the second electrode of the fifth transistor T5 is electrically connected to the first node N1 through the thirty-ninth transistor T39. The thirty-ninth transistor T39 and the fortieth transistor T40 constitute an anti-leakage circuit of the fifth transistor T5, and the anti-leakage circuit is configured to reduce a leakage current of the fifth transistor T5 in an off state.

A control electrode of the forty-first transistor T41 is electrically connected to the first input signal terminal IN1, a first electrode of the forty-first transistor T41 is electrically connected to the fifth clock signal terminal CKC1, and a second electrode of the forty-first transistor T41 is electrically connected to a nineteenth node N19. The forty-first transistor T41 is configured to transmit the fifth clock signal from the fifth clock signal terminal CKC1 to the nineteenth node N19 under control of the first input signal from the first input signal terminal IN1.

A control electrode of the forty-second transistor T42 is electrically connected to the first input signal terminal IN1, a first electrode of the forty-second transistor T42 is electrically connected to the nineteenth node N19, and a second electrode of the forty-second transistor T42 is electrically connected to the seventh node N7. The forty-second transistor T42 is configured to transmit a voltage of the nineteenth node N19 to the seventh node N7 under control of the first input signal from the first input signal terminal IN1.

A control electrode of the forty-third transistor T43 is electrically connected to the seventh node N7, a first electrode of the forty-third transistor T43 is electrically connected to the first voltage signal terminal VGH, and a second electrode of the forty-third transistor T43 is electrically connected to the nineteenth node N19. The forty-third transistor T43 is configured to transmit the first voltage signal from the first voltage signal terminal VGH to the nineteenth node N19 under control of a voltage of the seventh node N7.

A first electrode plate of the ninth capacitor C9 is electrically connected to the second voltage signal terminal LVGL, and a second electrode plate of the ninth capacitor C9 is electrically connected to the fifth node N5.

It will be understood that the first pulse width modulation unit 113 may include only some of the thirty-eighth transistor T38, the thirty-ninth transistor T39, the fortieth transistor T40, the forty-first transistor T41, the forty-second transistor T42, and the forty-third transistor T43 as described above. For example, the first pulse width modulation unit 113 may include the thirty-seventh transistor T37, the thirty-eighth transistor T38, and the forty-first transistor T41. Alternatively, the first pulse width modulation unit 113 further includes the thirty-ninth transistor T39 and the fortieth transistor T40. Functions that can be realized by the thirty-eighth transistor T38, the thirty-ninth transistor T39, the fortieth transistor T40, the forty-first transistor T41, the forty-second transistor T42, and the forty-third transistor T43 are not repeated in the embodiments of the present disclosure.

In some embodiments, referring to FIG. 15, the second pulse width modulation unit 123 may include a second input sub-unit 1231. The second input sub-unit 1231 of the second pulse width modulation unit 123 is electrically connected to a second input signal terminal IN2, a fourth clock signal terminal CKB2, and the second node N2, and is configured to transmit a second input signal from the second input signal terminal IN2 to the second node N2 under control of a fourth clock signal from the fourth clock signal terminal CKB2.

For example, referring to FIG. 14B, the second input sub-unit 1231 may include an eleventh transistor T11, a control electrode of the eleventh transistor T11 is electrically connected to the fourth clock signal terminal CKB2, a first electrode of the eleventh transistor T11 is electrically connected to the second input signal terminal IN2, and a second electrode of the eleventh transistor T11 is electrically connected to the second node N2.

The second input signal terminal IN2 may be electrically connected to a second cascade output signal terminal CR2 of a previous-stage light-emitting control circuit 100, and the second input signal is a second cascade signal output by the previous-stage light-emitting control circuit 100. The second input signal terminal IN2 of the first-stage light-emitting control circuit 100 may be electrically connected to a second start signal terminal STU2 (as shown in FIG. 7).

Figure 16B:
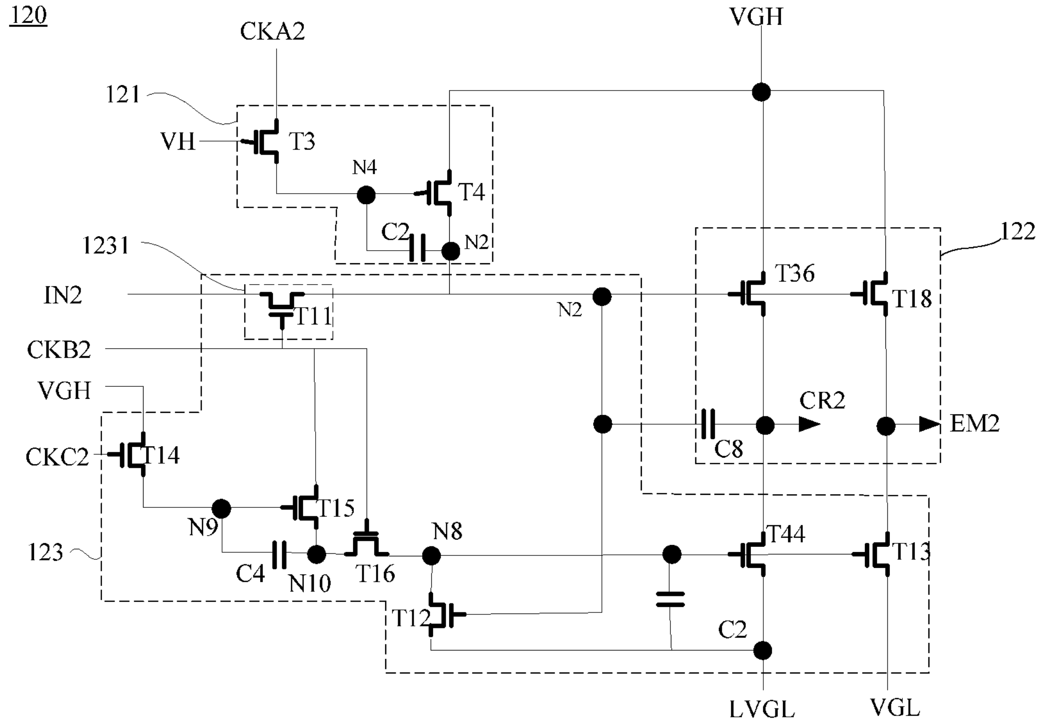
FIG. 16B is an equivalent circuit diagram of another second light-emitting control sub-circuit, in accordance with embodiments of the present disclosure.

In some embodiments, referring to FIG. 16B, FIG. 16B is an equivalent circuit diagram of the second light-emitting control sub-circuit 120. The second pulse width modulation unit 123 may further include a twelfth transistor T12, a thirteenth transistor T13, a fourteenth transistor T14, a fifteenth transistor T15, a sixteenth transistor T16, a forty-fourth transistor T44, and a fourth capacitor C4.

A control electrode of the twelfth transistor T12 is electrically connected to the second node N2, a first electrode of the twelfth transistor T12 is electrically connected to the second voltage signal terminal LVGL, and a second electrode of the twelfth transistor T12 is electrically connected to the eighth node N8. The twelfth transistor T12 is configured to transmit the second voltage signal from the second voltage signal terminal LVGL to the eighth node N8 under control of the voltage of the second node N2.

A control electrode of the thirteenth transistor T13 is electrically connected to the eighth node N8, a first electrode of the thirteenth transistor T13 is electrically connected to the third voltage signal terminal VGL, and a second electrode of the thirteenth transistor T13 is electrically connected to the second output signal terminal EM2. The thirteenth transistor T13 is configured to transmit the third voltage signal from the third voltage signal terminal VGL to the second output signal terminal EM2 under control of a voltage of the eighth node N8.

A control electrode of the forty-fourth transistor T44 is electrically connected to the eighth node N8, a first electrode of the forty-fourth transistor T44 is electrically connected to the second voltage signal terminal LVGL, and a second electrode of the forty-fourth transistor T44 is electrically connected to the second cascade output signal terminal CR2. The forty-fourth transistor T44 is configured to transmit the second voltage signal from the second voltage signal terminal LVGL to the second cascade output signal terminal CR2 under control of the voltage of the eighth node N8.

A control electrode of the fourteenth transistor T14 is electrically connected to a sixth clock signal terminal CKC2, a first electrode of the fourteenth transistor T14 is electrically connected to the first voltage signal terminal VGH, and a second electrode of the fourteenth transistor T14 is electrically connected to the ninth node N9.

A control electrode of the fifteenth transistor T15 is electrically connected to the ninth node N9, a first electrode of the fifteenth transistor T15 is electrically connected to the fourth clock signal terminal CKB2, and a second electrode of the fifteenth transistor T15 is electrically connected to a tenth node N10.

A control electrode of the sixteenth transistor T16 is electrically connected to the second input signal terminal IN2, a first electrode of the sixteenth transistor T16 is electrically connected to the tenth node N10, and a second electrode of the sixteenth transistor T16 is electrically connected to the eighth node N8.

A first electrode plate of the fourth capacitor C4 is coupled to the ninth node N9, and a second electrode plate of the fourth capacitor C4 is coupled to the tenth node N10.

The fourteenth transistor T14, the fifteenth transistor T15, the sixteenth transistor T16, and the fourth capacitor C4 are configured to transmit the first voltage signal to the eighth node N8 under control of a sixth clock signal from the sixth clock signal terminal CKC2, a fourth clock signal from the fourth clock signal terminal CKB2, and the first voltage signal from the first voltage signal terminal VGH.

Figure 17B:
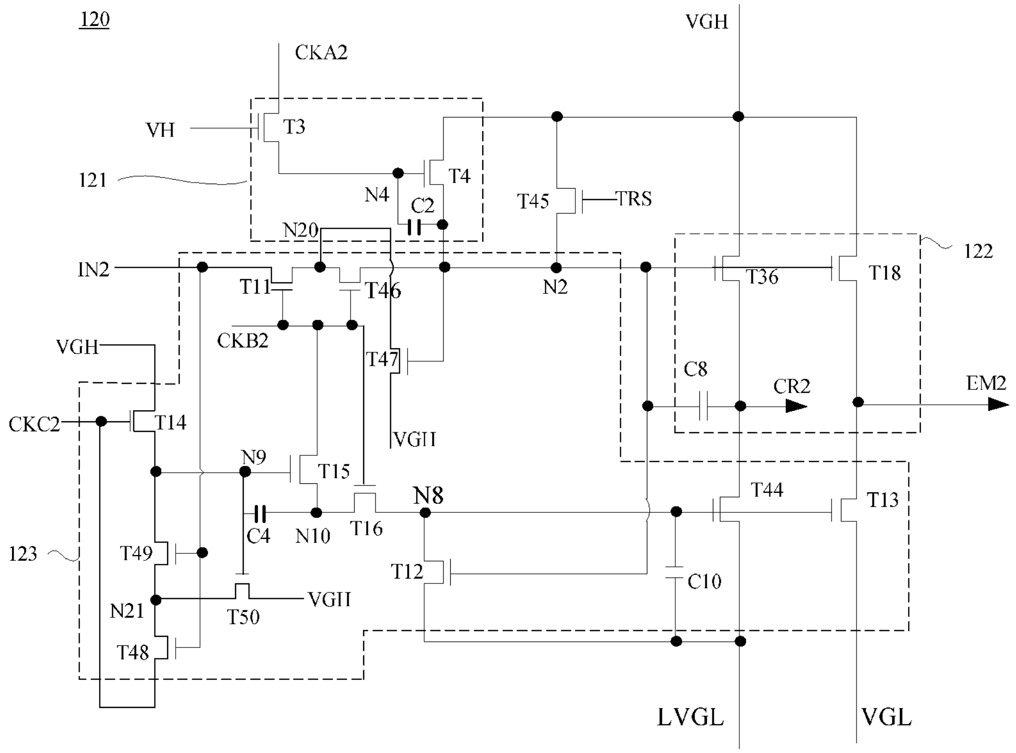
FIG. 17B is an equivalent circuit diagram of yet another second light-emitting control sub-circuit, in accordance with embodiments of the present disclosure.

In some embodiments, referring to FIG. 17B, the second pulse width modulation unit 123 may further include a forty-fifth transistor T45, a forty-sixth transistor T46, a forty-seventh transistor T47, a forty-eighth transistor T48, a forty-ninth transistor T49, a fiftieth transistor T50, and a tenth capacitor C10.

A control electrode of the forty-fifth transistor T45 is electrically connected to the start reset control terminal TRS, a first electrode of the forty-fifth transistor T45 is electrically connected to the first voltage signal terminal VGH, and a second electrode of the forty-fifth transistor T45 is electrically connected to the second node N2. The forty-fifth transistor T45 is configured to transmit the first voltage signal from the first voltage signal terminal VGH to the second node N2 under control of the reset signal from the start reset control terminal TRS.

A control electrode of the forty-sixth transistor T46 is electrically connected to the fourth clock signal terminal CKB2, a first electrode of the forty-sixth transistor T46 is electrically connected to a twentieth node N20, and a second electrode of the forty-sixth transistor T46 is electrically connected to the second node N2. A control electrode of the forty-seventh transistor T47 is electrically connected to the second node N2, a first electrode of the forty-seventh transistor T47 is electrically connected to the twentieth node N20, and a second electrode of the forty-seventh transistor T47 is electrically connected to the first voltage signal terminal VGH.

The forty-sixth transistor T46 and the forty-seventh transistor T47 constitute an anti-leakage circuit of the eleventh transistor T11, and the anti-leakage circuit is configured to reduce a leakage current of the eleventh transistor T11 in an off state.

A control electrode of the forty-eighth transistor T48 is electrically connected to the second input signal terminal IN2, a first electrode of the forty-eighth transistor T48 is electrically connected to the sixth clock signal terminal CKC2, and a second electrode of the forty-eighth transistor T48 is electrically connected to a twenty-first node N21. The forty-eighth transistor T48 is configured to transmit the sixth clock signal from the sixth clock signal terminal CKC2 to the twenty-first node N21 under control of the second input signal from the second input signal terminal IN2.

A control electrode of the forty-ninth transistor T49 is electrically connected to the second input signal terminal IN2, a first electrode of the forty-ninth transistor T49 is electrically connected to the twenty-first node N21, and a second electrode of the forty-ninth transistor T49 is electrically connected to the ninth node N9. The forty-ninth transistor T49 is configured to transmit a voltage of the twenty-first node N21 to the ninth node N9 under control of the second input signal from the second input signal terminal IN2.

A control electrode of the fiftieth transistor T50 is electrically connected to the ninth node N9, a first electrode of the fiftieth transistor T50 is electrically connected to the first voltage signal terminal VGH, and a second electrode of the fiftieth transistor T50 is electrically connected to the twenty-first node N21. The fiftieth transistor T50 is configured to transmit the first voltage signal from the first voltage signal terminal VGH to the twenty-first node N21 under control of a voltage of the ninth node N9.

A first electrode plate of the tenth capacitor C10 is electrically connected to the second voltage signal terminal LVGL, and a second electrode plate of the tenth capacitor C10 is electrically connected to the eighth node N8.

In a case where the light-emitting control circuit 100 includes the first pulse width modulation unit 113 and the second pulse width modulation unit 123 as described in any of the above embodiments, and one of an odd-numbered row of sub-pixels P1 and an even-numbered row of sub-pixels P2 that are adjacent in a group is selected for compensation of light-emitting devices EL, in the same frame cycle F, one of a first light-emitting control sub-circuit 110 and a second light-emitting control sub-circuit 120, which are electrically connected to the odd-numbered row of sub-pixels P1 and the even-numbered row of sub-pixels P2 in the group, outputs a pulse width modulation signal to modulate light-emitting time of the odd-numbered row of sub-pixels P1 and the even-numbered row of sub-pixels P2; and in the blank phase B, the other one of the first light-emitting control sub-circuit 110 and the second light-emitting control sub-circuit 120 outputs a pulse signal, so that operating currents respectively flow through light-emitting devices EL of the odd-numbered row of sub-pixels P1 or the even-numbered row of sub-pixels P2 (i.e., the selected row of sub-pixels P).

Based on the above situations, the control method of the light-emitting control circuit 100 further includes the followings.

In the display phase D, the first pulse width modulation unit 113 transmits the first input signal from the first input signal terminal IN1 to the first node N1 under control of the third clock signal CKB1. The first light-emitting output unit 112 transmits the first voltage signal to the first output signal terminal EM1 under control of the voltage of the first node N1 to modulate the light-emitting time of the odd-numbered row of sub-pixels P1 and the even-numbered row of sub-pixels P2.

In a case where one of an odd-numbered row of sub-pixels P1 and an even-numbered row of sub-pixels P2 that are adjacent in a group is selected for compensation of light-emitting devices, in the blank phase B, the second detection control unit 123 transmits the first voltage signal to the second node N2, and the second light-emitting output unit 122 transmits the first voltage signal to the second output signal terminal EM2 under control of the voltage of the second node N2, so that operating currents respectively flow through light-emitting devices EL of the odd-numbered row of sub-pixels P1 or the even-numbered row of sub-pixels P2. The description that the operating currents respectively flow through the light-emitting devices EL of the odd-numbered row of sub-pixels P1 or the even-numbered row of sub-pixels P2 means that the anodes of the light-emitting devices EL of the selected row of sub-pixels P for compensation are charged.

For example, referring to FIGS. 17A and 18, FIG. 18 is a timing control diagram of the light-emitting control circuit 100. In display phases D of the first two frame cycles F, the first start signal terminal Stu1 outputs a pulse signal, and the first input signal terminal IN1 of the first light-emitting control sub-circuit 110 receives the pulse signal.

In the first pulse width modulation unit 113 of the first light-emitting control sub-circuit 110, under control of the third clock signal CKB1, the fifth transistor T5 and the thirty-ninth transistor T39 are turned on and transmit the first input signal from the first input signal terminal IN1 to the first node N1.

The first light-emitting output unit 112 (the seventeenth transistor T17) transmits the first voltage signal to the first output signal terminal EM1 under control of the voltage of the first node N1, so as to modulate the light-emitting time of the odd-numbered row of sub-pixels P1 and the even-numbered row of sub-pixels P2.

The thirty-fifth transistor T35 transmits the first voltage signal to the first cascade signal output signal terminal CR1 under control of the voltage of the first node N1, so as to output the first cascade signal to the first input signal terminal IN1 of the first light-emitting control sub-circuit 110 of the next light-emitting control circuit 100.

In blank phases B, referring to FIGS. 17A, 17B and 18, in blank phases B of the first two frame cycles F, one of an odd-numbered row of sub-pixels P1 and an even-numbered row of sub-pixels P2 that are adjacent in a group is selected for compensation of light-emitting devices EL.

The detection control terminal VH causes the first transistor T1 and the third transistor T3 to be turned on. The first clock signal terminal CKA1 continuously outputs a turn-off voltage signal (i.e., outputs no pulse signal), and there is no signal input to the third node N3, so that the voltage of the third node N3 remains unchanged (which is kept at a turn-off voltage). The second clock signal terminal CKA2 outputs a pulse signal, and the pulse signal is written into the fourth node N4 through the third transistor T3, and a potential of the fourth node N4 rises to the operating voltage.

The fourth transistor T4 is turned on under control of the voltage of the fourth node N4, and the first voltage signal of the first voltage signal terminal VGH is transmitted to the second node N2. That is, the second detection control unit 121 transmits the first voltage signal to the second node N2.

The eighteenth transistor T18 (the second light-emitting output unit 122) is turned on under control of the second node N2, and the first voltage signal of the first voltage signal terminal VGH is transmitted to the second output signal terminal EM2 through the eighteenth transistor T18.

Alternatively, the control method of the light-emitting control circuit 100 further includes the followings.

In the display phase D, the second pulse width modulation unit 123 transmits the second input signal to the second node N2 under control of the fourth clock signal CKB2. The second light-emitting output unit 122 transmits the first voltage signal to the second output signal terminal EM2 under control of the voltage of the second node N2, so as to modulate the light-emitting time of the odd-numbered row of sub-pixels P1 and the even-numbered row of sub-pixels P2.

In a case where one of the odd-numbered row of sub-pixels P1 and the even-numbered row of sub-pixels P2 that are adjacent in the group is selected for compensation of light-emitting devices EL, in the blank phase B, the first detection control unit 111 transmits the first voltage signal to the first node N1, and the first light-emitting output unit 112 transmits the first voltage signal to the second output signal terminal EM2 under control of the voltage of the first node N1, so that the operating currents respectively flow through the light-emitting devices EL of the odd-numbered row of sub-pixels P1 or the even-numbered row of sub-pixels P2.

For example, referring to FIGS. 17B and 18, in the last two frame cycles F, in display phases D, the second start signal terminal Stu2 outputs a pulse signal, and the second input signal terminal IN2 of the second light-emitting control sub-circuit 110 receives the pulse signal.

In the second pulse width modulation unit 123 of the second light-emitting control sub-circuit 120, under control of the fourth clock signal CKB2, the eleventh transistor T11 and the forty-sixth transistor T46 are turned on and transmits the second input signal from the second input signal terminal IN2 to the second node N2.

The second light-emitting output unit 122 (the eighteenth transistor T18) transmits the first voltage signal to the second output signal terminal EM2 under control of the voltage of the second node N2, so as to modulate the light-emitting time of the odd-numbered row of sub-pixels P1 and the even-numbered row of sub-pixels P2.

The thirty-sixth transistor T36 transmits the first voltage signal to the second cascade signal output signal terminal CR2 under control of the voltage of the second node N2, so as to output the second cascade signal to the second input signal terminal IN2 of the second light-emitting control sub-circuit 120 of the next light-emitting control circuit 100.

In blank phases B, referring to FIGS. 17A, 17B and 18, in the blank phases B of the last two frame cycles F, one of an odd-numbered row of sub-pixels P1 and an even-numbered row of sub-pixels P2 that are adjacent in a group is selected for compensation of light-emitting devices EL.

The detection control terminal VH causes the first transistor T1 and the third transistor T3 to be turned on. The first clock signal terminal CKA1 outputs a pulse signal, and the pulse signal is written into the third node N3, so that a potential of the third node N3 rises to the operating voltage. The second clock signal terminal CKA2 continuously outputs a turn-off voltage, and the potential of the fourth node N3 is kept at the turn-off voltage.

The second transistor T2 is turned on under control of the voltage of the third node N3, and the first voltage signal of the first voltage signal terminal VGH is transmitted to the first node N1. That is, the first detection control unit 111 transmits the first voltage signal to the first node N1.

The seventeenth transistor T17 (the first light-emitting output unit 112) is turned on under control of the first node N1, and the first voltage signal of the first voltage signal terminal VGH is transmitted to the first output signal terminal EM1 through the seventeenth transistor T17.

In some embodiments, the control method of the light-emitting control circuit 100 further includes the followings.

In the same frame cycle F, the first clock signal terminal CKA1, the second input signal terminal IN2 and the fourth clock signal terminal CKB2 output pulse signals; and the second clock signal terminal CKA2, the first input signal terminal CR1 and the third clock signal terminal CKB1 output no voltage signal; for example, the last two frame cycles F shown in FIG. 18 meet the above cases.

Alternatively, the control method of the light-emitting control circuit 100 further includes the followings.

In the same frame cycle F, the second clock signal terminal CKA2, the first input signal terminal CR1 and the third clock signal terminal CKB1 output pulse signals; and the first clock signal terminal CKA1, the second input signal terminal IN2 and the fourth clock signal terminal CKB2 output no voltage signal; for example, the first two frame cycles F shown in FIG. 18 meet the above cases.

Figure 19A:
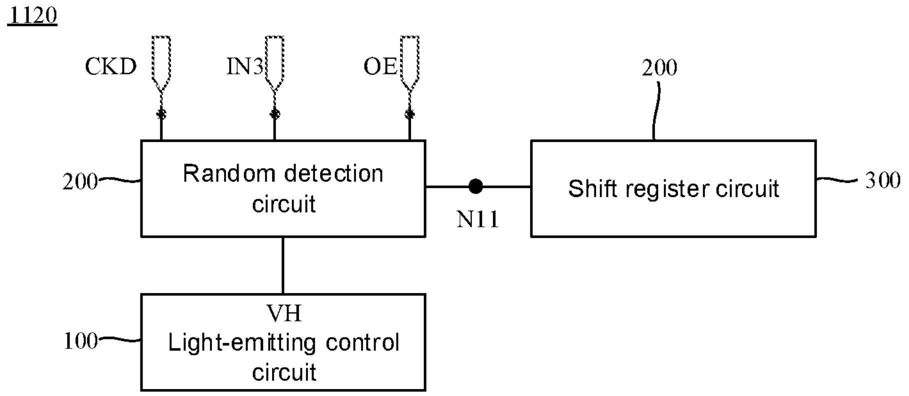
FIG. 19A is a structure diagram of a gate driving circuit, in accordance with embodiments of the present disclosure.
Figure 19B:
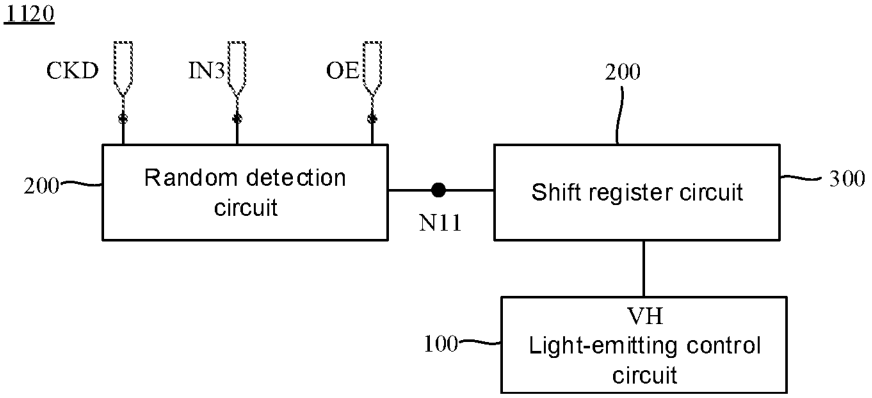
FIG. 19B is a structural diagram of another gate driving circuit, in accordance with embodiments of the present disclosure.

In some embodiments, referring to FIGS. 19A and 19B, the random detection circuit (the random sense unit) 200 is electrically connected to a random detection signal terminal OE, a third input signal terminal IN3, a seventh clock signal terminal CKD, and the eleventh node N11. The random detection circuit 200 is configured to transmit a seventh clock signal from the seventh clock signal terminal CKD to the eleventh node N11 under control of a random detection signal from the random detection signal terminal OE and a third input signal from the third input signal terminal IN3, so as to select a row of sub-pixels for compensation of light-emitting devices EL.

The random detection circuit 200 can generate a random detection signal, so as to select different rows of sub-pixels in each frame to compensate light-emitting devices of the different rows of sub-pixels P. Thus, the purpose of random compensation is realized.

The shift register circuit 300 is electrically connected to the eleventh node N11, and is configured to output a scan signal to a corresponding row of sub-pixels P under control of a voltage of the eleventh node N11, so as to turn on the corresponding row of sub-pixels P.

The detection control terminal VH of the light-emitting control circuit 100 in any of the above embodiments is electrically connected to a circuit node of the random detection circuit 200 or a circuit node of the shift register circuit 300. In this way, there is no need to provide an additional signal control terminal for providing a signal to the detection control terminal VH. Thus, the gate driving circuit 1120 is simplified.

Figure 20:
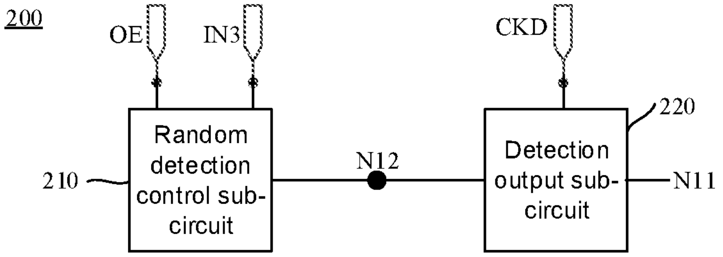
FIG. 20 is a structure diagram of a random detection circuit, in accordance with embodiments of the present disclosure.

In some embodiments, referring to FIG. 20, the random detection circuit 200 includes a random detection control sub-circuit 210 and a detection output sub-circuit 220.

The random detection control sub-circuit 210 is electrically connected to the random detection signal terminal OE, the third input signal terminal IN3, and a twelfth node N12. The random detection control sub-circuit 210 is configured to transmit the third input signal from the third input signal terminal IN3 to the twelfth node N12 under control of a random detection signal from the random detection signal terminal OE.

The third input signal terminal IN3 may be a cascade input signal terminal, and the third input signal terminal IN3 is electrically connected to a third cascade output signal terminal or a fourth cascade output signal terminal of a shift register circuit 300 in a previous-stage gate driving circuit 1120.

Referring to FIG. 20, the detection output sub-circuit 220 is electrically connected to the twelfth node N12, the seventh clock signal terminal CKD, and the eleventh node N11; and the detection output sub-circuit 220 is configured to transmit the seventh clock signal to the eleventh node N11 under control of a voltage of the twelfth node N12. The detection control terminal VH of the light-emitting control circuit 100 is electrically connected to the twelfth node N12.

Figure 21:
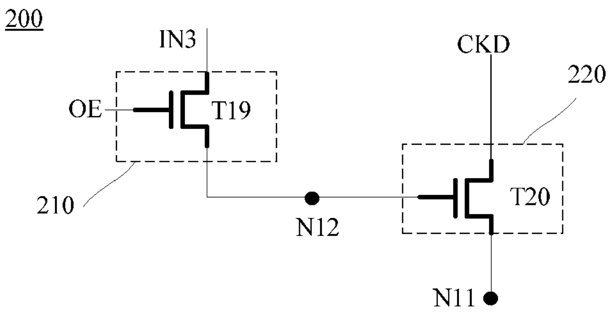
FIG. 21 is an equivalent circuit diagram of a random detection circuit, in accordance with embodiments of the present disclosure.

For example, referring to FIG. 21, the random detection control sub-circuit 210 includes a nineteenth transistor T19, a control electrode of the nineteenth transistor T19 is electrically connected to the random detection signal terminal OE, a first electrode of the nineteenth transistor T19 is electrically connected to the third input signal terminal IN3, and a second electrode of the nineteenth transistor T19 is electrically connected to the twelfth node N12.

The detection output sub-circuit 220 includes a twentieth transistor T20, a control electrode of the twentieth transistor T20 is electrically connected to the twelfth node N12, a first electrode of the twentieth transistor T20 is electrically connected to the seventh clock signal terminal CKD, and a second electrode of the twentieth transistor T20 is electrically connected to the eleventh node N11.

Figure 22:
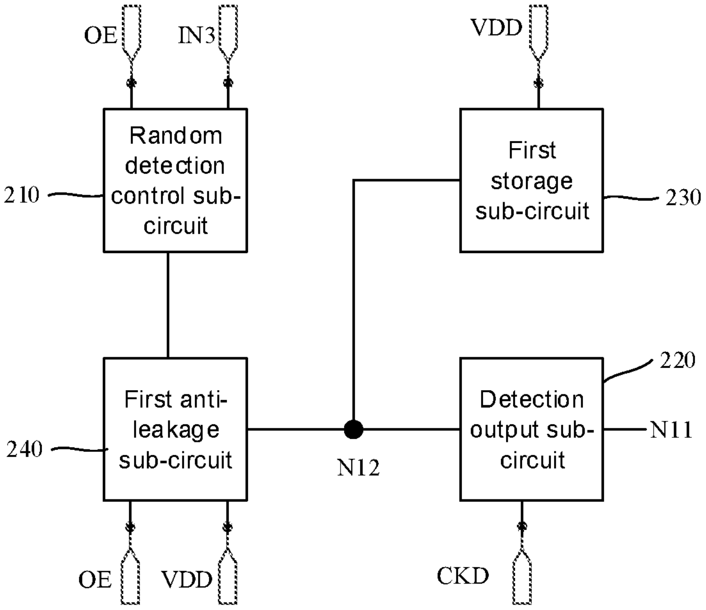
FIG. 22 is a structure diagram of another random detection circuit, in accordance with embodiments of the present disclosure.

In some embodiments, referring to FIG. 22, the random detection circuit 200 further includes a first storage sub-circuit 230 and a first anti-leakage sub-circuit 240.

The first storage sub-circuit 230 is electrically connected to a fourth voltage signal terminal VDD and the twelfth node N12, and is configured to maintain the voltage of the twelfth node N12.

The fourth voltage signal terminal VDD and the power supply voltage signal terminal VDD of the pixel driving circuit 1110 may be the same, thus using the same sign "VDD". In this way, the number of voltage signal terminals may be reduced, so that the circuit structure of the display panel 1000 is simplified.

The first anti-leakage sub-circuit 240 is electrically connected to the random detection control sub-circuit 210, the random detection signal terminal OE, the twelfth node N12, and the fourth voltage signal terminal VDD. The first anti-leakage sub-circuit 240 is configured to transmit a fourth voltage signal from the fourth voltage signal terminal VDD to the eleventh node N11 under control of the random detection signal from the random detection signal terminal OE and the voltage of the twelfth node.

Figure 23:
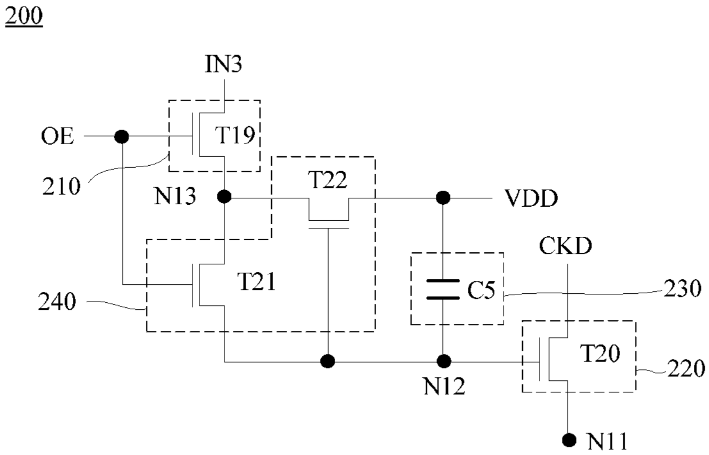
FIG. 23 is an equivalent circuit diagram of another random detection circuit, in accordance with embodiments of the present disclosure.

For example, referring to FIG. 23, the first storage sub-circuit 230 includes a fifth capacitor C5, a first electrode plate of the fifth capacitor C5 is electrically connected to the fourth voltage signal terminal VDD, and a second electrode plate of the fifth capacitor C5 is electrically connected to the twelfth node N12.

For example, referring to FIG. 23, the first anti-leakage sub-circuit 240 includes a twenty-first transistor T21 and a twenty-second transistor T22. A control electrode of the twenty-first transistor T21 is electrically connected to the random detection signal terminal OE, a first electrode of the twenty-first transistor T21 is electrically connected to a thirteenth node N13, and a second electrode of the twenty-first transistor T21 is electrically connected to the twelfth node N12. A control electrode of the twenty-second transistor T22 is electrically connected to the twelfth node N12, a first electrode of the twenty-second transistor T22 is electrically connected to the fourth voltage signal terminal VDD, and a second electrode of the twenty-second transistor T22 is electrically connected to the thirteenth node N13.

Referring to FIG. 23, the random detection control sub-circuit 210 is electrically connected to the twelfth node N12 through the first anti-leakage sub-circuit 240. That is, the second electrode of the nineteenth transistor T19 is electrically connected to the twelfth node N12 through the twenty-first transistor T21.

Referring to FIG. 23, the second electrode of the nineteenth transistor T19 is electrically connected to the first electrode of the twenty-first transistor T21, and the control electrode of the nineteenth transistor T19 and the control electrode of the twenty-first transistor T21 are both electrically connected to the random detection signal terminal OE. In this way, in a case where the random detection signal terminal OE outputs an operating level, the nineteenth transistor T19 and the twenty-first transistor T21 are simultaneously turned on, and the third input signal from the third input signal terminal IN3 can be transmitted to the twelfth node N12 through the nineteenth transistor T19 and the twenty-first transistor T21.

Some embodiments of the present disclosure further provide a control method of the gate driving circuit 1120. The control method includes the followings.

One of an odd-numbered row of sub-pixels P1 and an even-numbered row of sub-pixels P2 that are adjacent in a group is selected for compensation of light-emitting devices EL.

In the display phase D, the random detection circuit 200 of the gate driving circuit 1120 transmits the third input signal from the third input signal terminal IN3 to a circuit node NX (the twelfth node N12) of the random detection circuit 200 under control of the random detection signal (from the random detection signal terminal OE), and maintains a voltage of the corresponding circuit node NX until the blank phase B.

In the blank phase B, the random detection circuit 200 transmits the seventh clock signal from the seventh clock signal terminal CKD to the shift register circuit 300 of the gate driving circuit 1120 under control of the voltage of the circuit node NX.

The shift register circuit outputs a scan signal to a corresponding row of sub-pixels P (the selected row of sub-pixels P for compensation of light-emitting devices EL), so as to turn on the corresponding row of sub-pixels P (turn on data writing transistors T102 of the corresponding row of sub-pixels P).

The light-emitting control circuit 1000 of the gate driving circuit 1120 transmits the first voltage signal to the first output signal terminal EM1 or the second output signal terminal EM2 under control of the voltage of the circuit node NX of the random detection circuit 200 or the voltage of the circuit node NY (a fourteenth node N14 or a fifteenth node N15) of the shift register circuit 300, so that operating currents respectively flow through the light-emitting devices of the odd-numbered row of sub-pixels P1 or the even-numbered row of sub-pixels P2.

For example, in the blank phase B, the circuit node NX of the random detection circuit 200 and the circuit node NY of the shift register circuit 300 may each output the operating voltage to the detection control terminal VH of the light-emitting control circuit 100. The light-emitting control circuit 100 transmits the first voltage signal to the first output signal terminal EM1 or the second output signal terminal EM2 under control of the detection control signal from the detection control terminal VH. As for details, reference is made to the above control method of the light-emitting control circuit 100, which will not be repeated here.

Figure 24A:
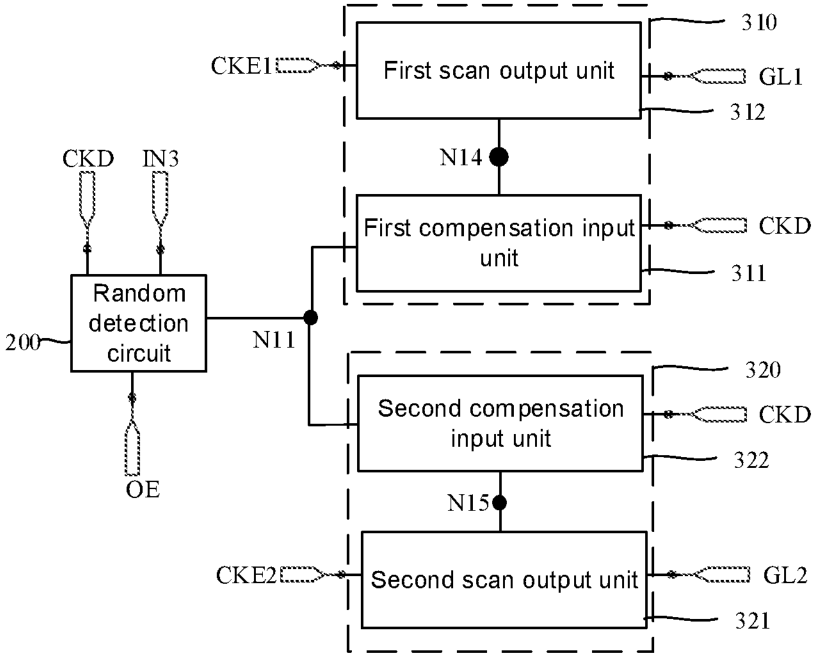
FIG. 24A is a structure diagram of a shift register circuit, in accordance with embodiments of the present disclosure.

In some embodiments, referring to FIG. 24A, the shift register circuit 300 includes a first shift register sub-circuit 310 and a second shift register sub-circuit 320. The first shift register sub-circuit 310 includes a first compensation input unit 311 and a first scan output unit 312. The second shift register sub-circuit 302 includes a second compensation input unit 321 and a second scan output unit 322.

The first compensation input unit 311 is electrically connected to the eleventh node N11, the seventh clock signal terminal CKD, and the fourteenth node N14; and the first compensation input unit 311 is configured to transmit the voltage of the eleventh node N11 to the fourteenth node N14 under control of the seventh clock signal from the seventh clock signal terminal CKD.

The first scan output unit 312 is electrically connected to the fourteenth node N14, an eighth clock signal terminal CKE1, and a third output signal terminal GL1. The third output signal terminal GL1 is configured to be electrically connected to the odd-numbered row of sub-pixels P1 (electrically connected to control electrodes of the data writing transistors T102(1) of the odd-numbered row of sub-pixels P1). The first scan output unit 312 is configured to transmit an eighth clock signal from the eighth clock signal terminal CKE1 to the third output signal terminal GL1 under control of a voltage of the fourteenth node N14, so as to turn on the corresponding odd-numbered row of sub-pixels P1 (turn on the data writing transistors T102(1)).

It will be understood that, in the embodiments of the present disclosure, the third output signal terminal GL1 is electrically connected to the first gate line GL1, and in order to simplify the description, the third output signal terminal and the first gate line adopt the same sign "GL1". The fourth output signal terminal GL2 is electrically connected to the second gate line GL2, and in order to simplify the description, the fourth output signal terminal GL2 and the second gate line GL2 adopt the same sign "GL2".

The second compensation input unit 321 is electrically connected to the eleventh node N11, the seventh clock signal terminal CKD, and the fifteenth node N15; and the second compensation input unit 321 is configured to transmit the voltage of the eleventh node N11 to the fifteenth node N15 under control of the seventh clock signal CKD.

The second scan output unit 322 is electrically connected to the fifteenth node N15, a ninth clock signal terminal CKE2, and the fourth output signal terminal GL2. The fourth output signal terminal GL2 is configured to be electrically connected to the even-numbered row of sub-pixels P2 (electrically connected to control electrodes of the data writing transistors T102(2) of the even-numbered row of sub-pixels P2). The second scan output unit 322 is configured to transmit a ninth clock signal from the ninth clock signal terminal CKE2 to the fourth output signal terminal GL2 under control of a voltage of the fifteenth node N15, so as to turn on the corresponding even-numbered row of sub-pixels P2 (turn on the data writing transistors T102(2)).

Figure 24B:
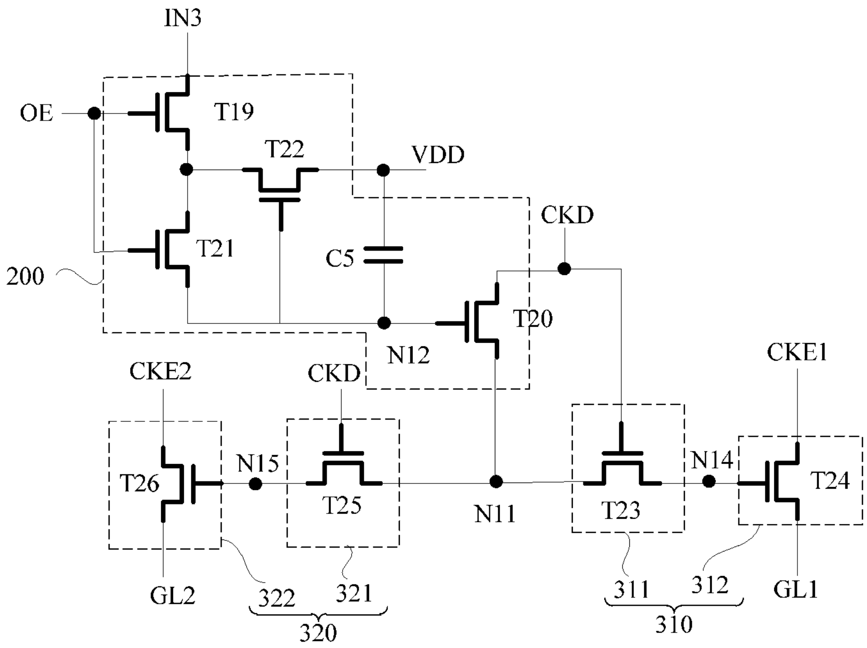
FIG. 24B is an equivalent circuit diagram of a shift register circuit, in accordance with embodiments of the present disclosure.

For example, referring to FIG. 24B, the first compensation input unit 311 includes a twenty-third transistor T23, a control electrode of the twenty-third transistor T23 is electrically connected to the seventh clock signal terminal CKD, a first electrode of the twenty-third transistor T23 is electrically connected to the eleventh node, and a second electrode of the twenty-third transistor T23 is electrically connected to the fourteenth node N14.

The first scan output unit 312 includes a twenty-fourth transistor T24, a control electrode of the twenty-fourth transistor T24 is electrically connected to the fourteenth node N14, a first electrode of the twenty-fourth transistor T24 is electrically connected to the eighth clock signal terminal CKE1, and a second electrode of the twenty-fourth transistor T24 is electrically connected to the third output signal terminal GL1.

The second compensation input unit 321 includes a twenty-fifth transistor T25, a control electrode of the twenty-fifth transistor T25 is electrically connected to the seventh clock signal terminal CKD, a first electrode of the twenty-fifth transistor T25 is electrically connected to the eleventh node N11, and a second electrode of the twenty-fifth transistor T25 is electrically connected to the fifteenth node N15.

The second scan output unit 322 includes a twenty-sixth transistor T26, a control electrode of the twenty-sixth transistor T26 is electrically connected to the fifteenth node N15, a first electrode of the twenty-sixth transistor T26 is electrically connected to the ninth clock signal terminal CKE2, and a second electrode of the twenty-sixth transistor T26 is electrically connected to the fourth output signal terminal GL2.

In some embodiments, the detection control terminal VH of the light-emitting control circuit 100 in any of the above embodiments is electrically connected to the fourteenth node N14 or the fifteenth node N15.

Figure 25A:
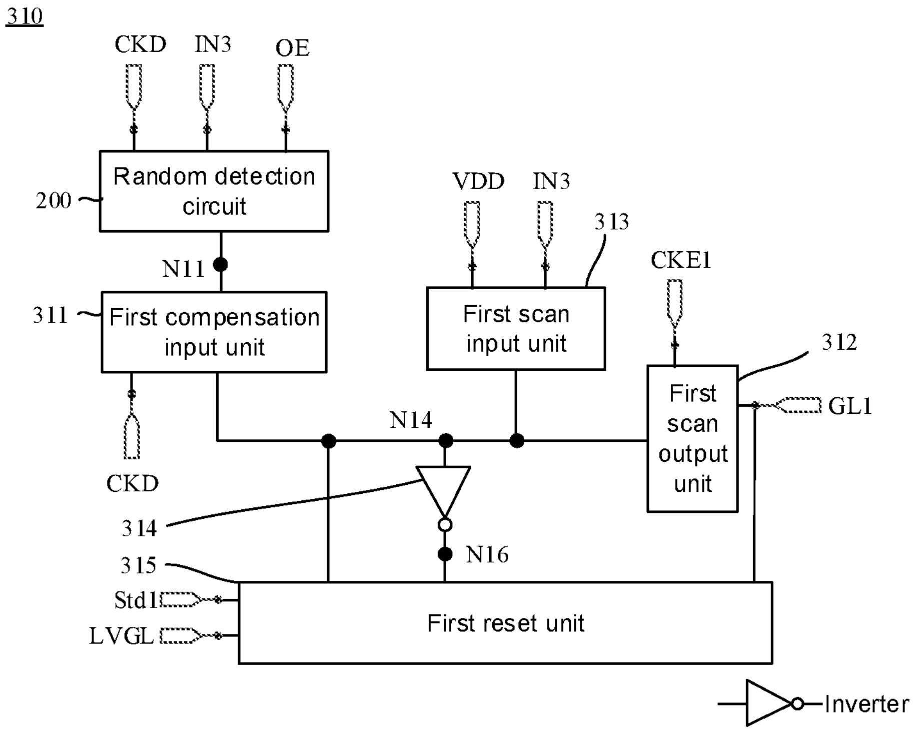
FIG. 25A is a structure diagram of a first shift register sub-circuit, in accordance with embodiments of the present disclosure.

In some embodiments, referring to FIG. 25A, the first shift register sub-circuit 310 further includes a first scan input unit 313, a first inverter 314, and a first reset unit 315.

The first scan input unit 313 is electrically connected to the third input signal terminal IN3, the fourth voltage signal terminal VDD, and the fourteenth node N14; and the first scan input unit 313 is configured to transmit the fourth voltage signal from the fourth voltage signal terminal VDD to the fourteenth node N14 under control of the third input signal from the third input signal terminal IN3.

A terminal of the first inverter 314 is electrically connected to the fourteenth node N14, and another terminal of the first inverter 314 is electrically connected to a sixteenth node N16.

It will be understood that structures of the first inverter 314 and a second inverter 324 and functions that can be realized by the first inverter 314 and the second inverter 324 are conventional in the art, and details are not described herein.

The first reset unit is electrically connected to a first reset signal terminal Std1, the sixteenth node N16, a fifth voltage signal terminal LVGL, the fourteenth node N14, and the third output signal terminal GL1; and the first reset unit is configured to transmit a fifth voltage signal of the fifth voltage signal terminal LVGL to the fourteenth node N14 and the third output signal terminal GL1 under control of a first reset signal from the first reset signal terminal Std1 and a voltage of the sixteenth node N16.

It will be understood that the fifth voltage signal LVGL and the second voltage signal terminal LVGL may each continuously output a low-level voltage signal. The fifth voltage signal LVGL and the second voltage signal terminal LVGL may be the same or different. The embodiments of the present disclosure are described by taking an example in which the fifth voltage signal terminal LVGL and the second voltage signal terminal LVGL are the same.

Figure 26A:
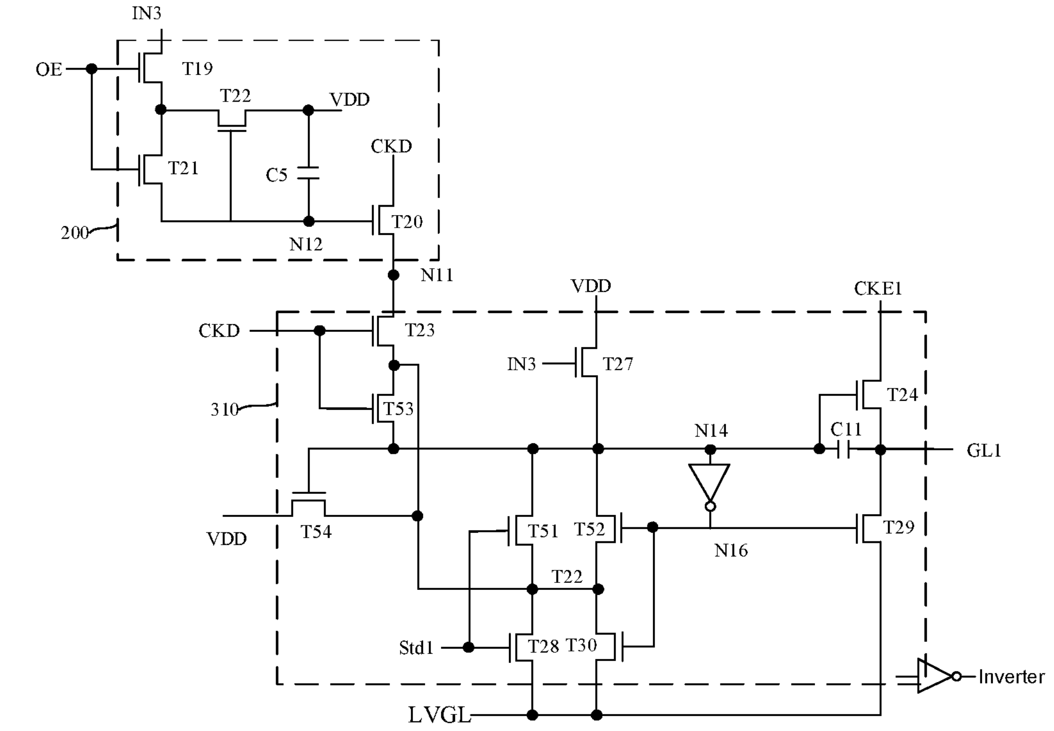
FIG. 26A is an equivalent circuit diagram of a first shift register sub-circuit, in accordance with embodiments of the present disclosure.

For example, referring to FIG. 26A, the first scan input unit 313 includes a twenty-seventh transistor T27, a control electrode of the twenty-seventh transistor T27 is electrically connected to the third input signal terminal IN3, a first electrode of the twenty-seventh transistor T27 is electrically connected to the fourth voltage signal terminal VDD, and a second electrode of the twenty-seventh transistor T27 is electrically connected to the fourteenth node N14.

The first reset unit 315 may include a twenty-eighth transistor T28, a twenty-ninth transistor T29 and a thirtieth transistor T30.

A control electrode of the twenty-eighth transistor T28 is electrically connected to the first reset signal terminal Std1, a first electrode of the twenty-eighth transistor T28 is electrically connected to the fifth voltage signal terminal LVGL, and a second electrode of the twenty-eighth transistor T28 is electrically connected to the fourteenth node N14.

A control electrode of the twenty-ninth transistor T29 is electrically connected to the sixteenth node N16, a first electrode of the twenty-ninth transistor T29 is electrically connected to the fifth voltage signal terminal LVGL, and a second electrode of the twenty-ninth transistor T29 is electrically connected to the third output signal terminal GL1.

A control electrode of the thirtieth transistor T30 is electrically connected to the sixteenth node N16, a first electrode of the thirtieth transistor T30 is electrically connected to the fifth voltage signal terminal LVGL, and a second electrode of the thirtieth transistor T30 is electrically connected to the fourteenth node N14.

In some embodiments, referring to FIG. 26A, the first shift register sub-circuit may further include a fifty-first transistor T51, a fifty-second transistor T52, a fifty-third transistor T53, a fifty-fourth transistor T54, and an eleventh capacitor C11.

A control electrode of the fifty-first transistor T51 is electrically connected to the first reset signal terminal Std1, a first electrode of the fifty-first transistor T51 is electrically connected to a twenty-second node N22 (the second electrode of the twenty-eighth transistor T28), and a second electrode of the fifty-first transistor T51 is electrically connected to the fourteenth node. The second electrode of the twenty-eighth transistor T28 is electrically connected to the fourteenth node N14 through the fifty-first transistor T51.

A control electrode of the fifty-second transistor T52 is electrically connected to the sixteenth node N16, a first electrode of the fifty-second transistor T52 is electrically connected to the twenty-second node N22 (the second electrode of the thirtieth transistor T30), and a second electrode of the fifty-second transistor T52 is electrically connected to the fourteenth node N14. The second electrode of the thirtieth transistor T30 is electrically connected to the fourteenth node N14 through the fifty-second transistor T52.

A control electrode of the fifty-third transistor T53 is electrically connected to the seventh clock signal terminal CKD, a first electrode of the fifty-third transistor T53 is electrically connected to the twenty-second node N22, and a second electrode of the fifty-third transistor T53 is electrically connected to the fourteenth node N14. The second electrode of the twenty-third transistor T23 is electrically connected to the fourteenth node N14 through the fifty-third transistor T53.

A control electrode of the fifty-fourth transistor T54 is electrically connected to the fourteenth node N14, a first electrode of the fifty-fourth transistor T54 is electrically connected to the fourth voltage signal terminal VDD, and a second electrode of the fifty-fourth transistor T54 is electrically connected to the twenty-second node N22.

Figure 25B:
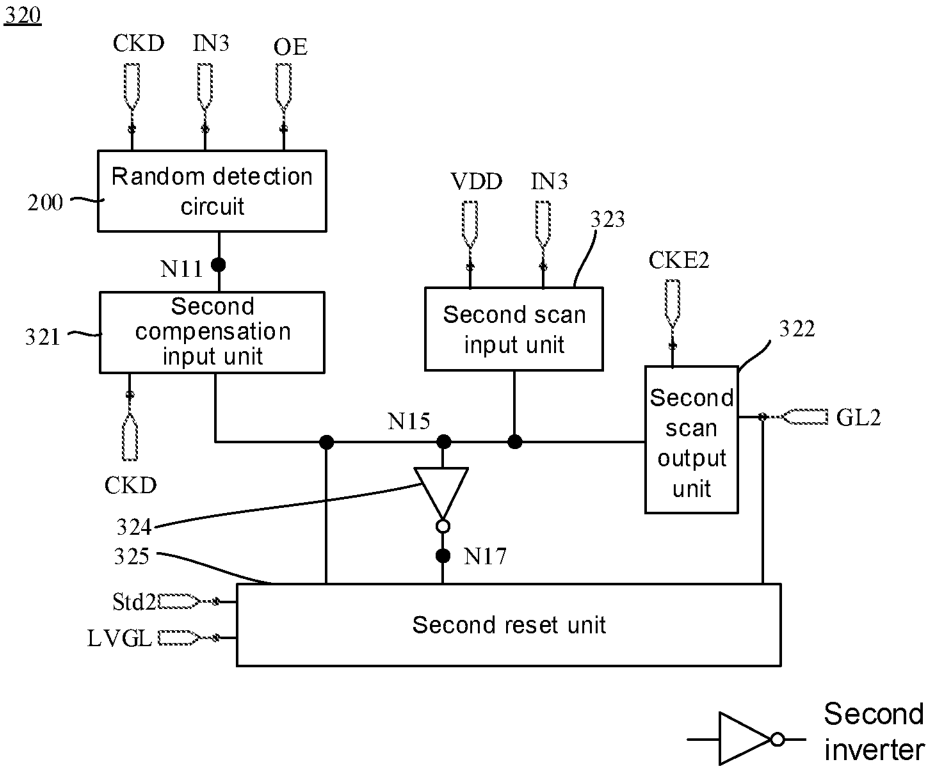
FIG. 25B is a structure diagram of a second shift register sub-circuit, in accordance with embodiments of the present disclosure.

In some embodiments, referring to FIG. 25B, the second shift register sub-circuit 320 further includes a second scan input unit 323, the second inverter 324, and a second reset unit 325.

The second scan input unit 323 is electrically connected to the third input signal terminal IN3, the fourth voltage signal terminal VDD, and the fifteenth node N15; and the second scan input unit 323 is configured to transmit the fourth voltage signal to the fifteenth node N15 under control of the third input signal.

A terminal of the second inverter 324 is electrically connected to the fifteenth node N15, and another terminal of the second inverter 324 is electrically connected to the seventeenth node N17.

The second reset unit 325 is electrically connected to a second reset signal terminal Std2, the fifth voltage signal terminal LVGL, the fifteenth node N15, the seventeenth node N17 and the fourth output signal terminal GL2; and the second reset unit 325 is configured to transmit the fifth voltage signal from the fifth voltage signal terminal LVGL to the fifteenth node N15 and the fourth output signal terminal GL2 under control of a second reset signal from the second reset signal terminal Std2 and a voltage of the seventeenth node N17.

Figure 26B:
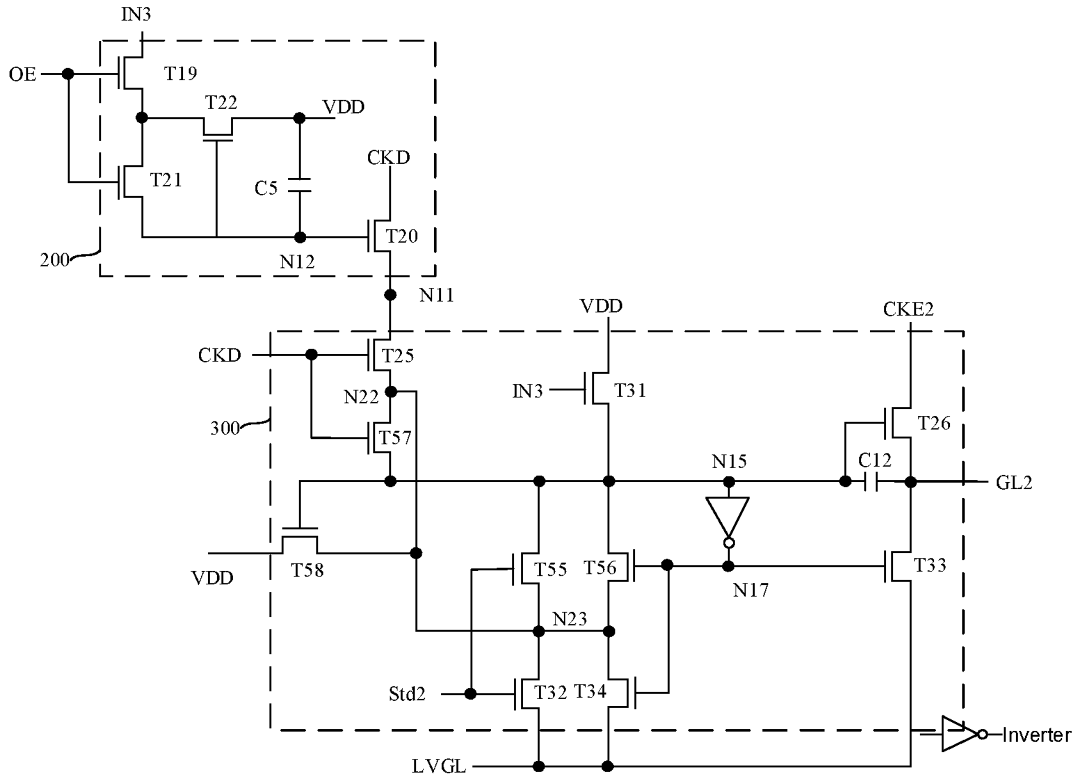
FIG. 26B is an equivalent circuit diagram of a second shift register sub-circuit, in accordance with embodiments of the present disclosure.

For example, referring to FIG. 26B, the second scan input unit 323 includes a thirty-first transistor T31, a control electrode of the thirty-first transistor T31 is electrically connected to the third input signal terminal IN3, a first electrode of the thirty-first transistor T31 is electrically connected to the fourth voltage signal terminal VDD, and a second electrode of the thirty-first transistor T31 is electrically connected to the fifteenth node N15.

The second reset unit 325 includes a thirty-second transistor T32, a thirty-third transistor T33 and a thirty-fourth transistor T34.

A control electrode of the thirty-second transistor T32 is electrically connected to the second reset signal terminal Std2, a first electrode of the thirty-second transistor T32 is electrically connected to the fifth voltage signal terminal LVGL, and a second electrode of the thirty-second transistor T32 is electrically connected to the fifteenth node N15.

A control electrode of the thirty-third transistor T33 is electrically connected to the seventeenth node N17, a first electrode of the thirty-third transistor T33 is electrically connected to the fifth voltage signal terminal VLGL, and a second electrode of the thirty-third transistor T33 is electrically connected to the fourth output signal terminal GL2.

A control electrode of the thirty-fourth transistor T34 is electrically connected to the seventeenth node N17, a first electrode of the thirty-fourth transistor T34 is electrically connected to the fourth voltage signal terminal LVGL, and a second electrode of the thirty-fourth transistor T34 is electrically connected to the fifteenth node N15.

In some embodiments, the second shift register sub-circuit 320 further includes a fifty-fifth transistor T55, a fifty-sixth transistor T56, a fifty-seventh transistor T57 and a fifty-eighth transistor T58.

A control electrode of the fifty-fifth transistor T55 is electrically connected to the second reset signal terminal Std2, a first electrode of the fifty-fifth transistor T55 is electrically connected to a twenty-third node N23 (the second electrode of the thirty-second transistor T32), and a second electrode of the fifty-fifth transistor T55 is electrically connected to the fifteenth node N15. The second electrode of the thirty-second transistor T32 is electrically connected to the fifteenth node N15 through the fifty-fifth transistor T55.

A control electrode of the fifty-sixth transistor T56 is electrically connected to the seventeenth node N17, a first electrode of the fifty-sixth transistor T56 is electrically connected to the twenty-third node N23 (the second electrode of the thirty-fourth transistor T34), and a second electrode of the fifty-sixth transistor T56 is electrically connected to the fifteenth node N15. The second electrode of the thirty-fourth transistor T34 is electrically connected to the fifteenth node N15 through the fifty-sixth transistor T56.

A control electrode of the fifty-seventh transistor T57 is electrically connected to the seventh clock signal terminal CKD, a first electrode of the fifty-seventh transistor T57 is electrically connected to the twenty-third N23 node (the second electrode of the twenty-fifth transistor T25), and a second electrode of the fifty-seventh transistor T57 is electrically connected to the fifteenth node N15. The second electrode of the twenty-fifth transistor T25 is electrically connected to the fifteenth node N15 through the fifty-seventh transistor T57.

A control electrode of the fifty-eighth transistor T58 is electrically connected to the fifteenth node, a first electrode of the fifty-eighth transistor T58 is electrically connected to the fourth voltage signal terminal VDD, and a second electrode of the fifty-eighth transistor T58 is electrically connected to the twenty-third node N23.

Some embodiments of the present disclosure further provide a control method of a gate driving circuit, which is used for driving the gate driving circuit 1120 in any of the above embodiments. In a case where one of an odd-numbered row of sub-pixels P1 and an even-numbered row of sub-pixels P1 that are adjacent in a group is selected for compensation of light-emitting devices EL, the control method includes the followings.

In the display phase D, the random detection circuit 200 of the gate driving circuit transmits the third input signal from the third input signal terminal IN3 to the circuit node NX (the twelfth node N12) of the random detection circuit 200 under control of the random detection signal (from the random detection signal terminal OE), and maintains the voltage of the corresponding circuit node NX until the blank phase B.

Figure 27:
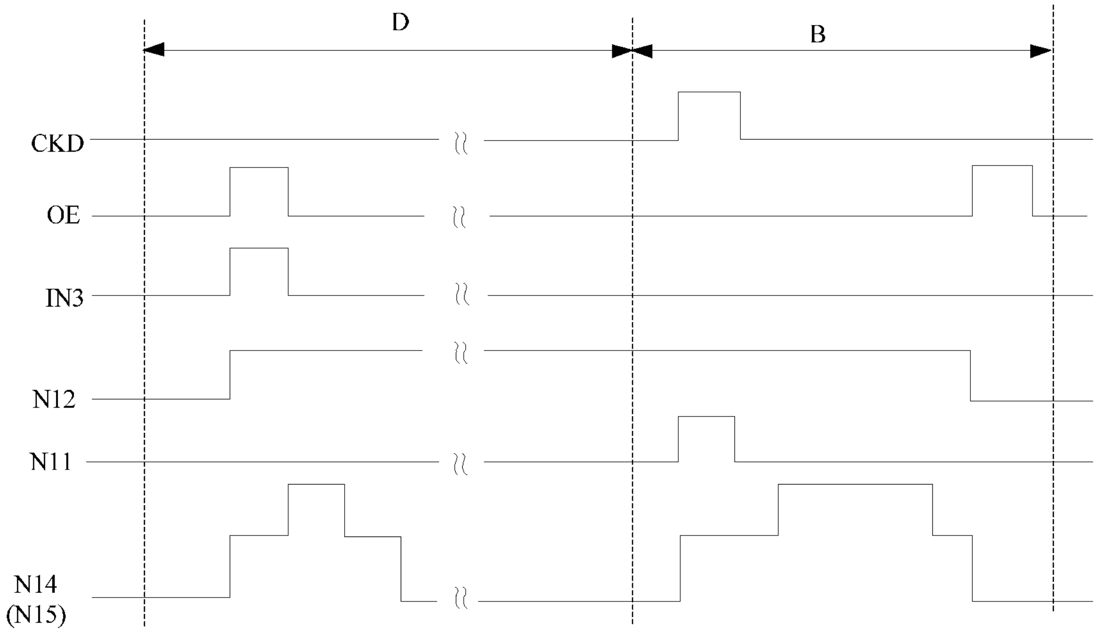
FIG. 27 is a timing control diagram of a gate driving circuit, in accordance with embodiments of the present disclosure.

For example, referring to FIGS. 26A and 27, during a certain period of the display phase D, the random detection signal terminal OE and the third input signal terminal IN3 output high-level signals; and under control of the random detection signal from the random detection signal terminal OE, the nineteenth transistor T19 and the twenty-first transistor T21 are turned on and transmit the third input signal (a high-level signal) from the third input signal terminal IN3 to the twelfth node N12 of the random detection circuit 200. The twentieth transistor T20 is turned on.

Then, the random detection signal terminal OE and the third input signal terminal IN3 output low-level signals, the twenty-first transistor T21 is turned off, and the voltage of the twelfth node N12 is constant due to the action of the fifth capacitor C5.

In the blank phase B, the random detection circuit 200 transmits the seventh clock signal from the seventh clock signal terminal CKD to the shift register circuit 300 of the gate driving circuit 1120 under control of the voltage of the circuit node NX (the twelfth node).

For example, referring to FIGS. 26A and 27, the voltage of the twelfth node N12 is constant voltage due to the action of the fifth capacitor C5, and the twentieth transistor T20 maintains an on state. During a certain period of the blank phase B, the seventh clock signal terminal CKD outputs the seventh clock signal at a high level, and the seventh clock signal is transmitted to the eleventh node N11 through the twentieth transistor T20.

The shift register circuit outputs a scan signal to a corresponding row of sub-pixels P (the selected row of sub-pixels P for compensation of light-emitting devices EL), so as to turn on the corresponding row of sub-pixels P (turn on the data writing transistors T102 of the corresponding row of sub-pixels P).

For example, referring to FIG. 26A, the twenty-third transistor T23 and the fifty-third transistor T53 are simultaneously turned on due to the seventh clock signal from the seventh clock signal terminal CKD, and the seventh clock signal at the eleventh node N11 is transmitted to the fourteenth node N14. The twenty-fourth transistor T24 is turned on under control of the voltage of the fourteenth node N14 (the seventh clock signal).

Similarly, referring to FIG. 26B, the seventh clock signal at the eleventh node N11 may also be transmitted to the fifteenth node N15. The voltage of the fifteenth node N15 controls the twenty-sixth transistor T26 to be turned on.

One of the seventh clock signal terminal CKE1 and the eighth clock signal terminal CKE2 outputs a high-level voltage signal, and the high-level voltage signal is transmitted to the third output signal terminal GL1 or the fourth output signal terminal GL2.

For example, in a case where the odd-numbered row of sub-pixels P1 is selected for compensation of light-emitting devices EL, the seventh clock signal terminal CKE1 outputs a high-level voltage signal, the high-level voltage signal output by the seventh clock signal terminal CKE1 is transmitted to the third output signal terminal GL1 through the twenty-four transistor T24, so that a scan signal is output to the odd-numbered row of sub-pixels P1, and the data writing transistors T102(1) of the odd-numbered row of sub-pixels P1 are turned on.

For example, in a case where the even-numbered row of sub-pixels P2 is selected for compensation of light-emitting devices EL, the eighth clock signal terminal CKE2 outputs a high-level voltage signal, the high-level voltage signal output by the eighth clock signal terminal CKE2 is transmitted to the fourth output signal terminal GL2 through the twenty-sixth transistor T26, so that a scan signal is output to the even-numbered row of sub-pixels P2, and the data writing transistors T102(2) of the even-numbered row of sub-pixels P2 are turned on.

The light-emitting control circuit 1000 of the gate driving circuit 1120 transmits the first voltage signal to the first output signal terminal EM1 or the second output signal terminal EM2 under control of the voltage of the circuit node NX of the random detection circuit 200 or the voltage of the circuit node NY (the fourteenth node N14 or the fifteenth node N15) of the shift register circuit 300, so that operating currents respectively flow through the light-emitting devices EL of the odd-numbered row of sub-pixels P1 or the even-numbered row of sub-pixels P2.

It will be understood that the operation currents flowing through the light-emitting devices EL of the odd-numbered row of sub-pixels P1 or the even-numbered row of sub-pixels P2 means that the anodes of the light-emitting devices EL of the selected row sub-pixels P are charged.

In the blank phase B, the circuit node NX of the random detection circuit 200 and the circuit node NY of the shift register circuit 300 may each output an operating voltage signal to the detection control terminal VH of the light-emitting control circuit 100. The light-emitting control circuit 100 transmits the first voltage signal to the first output signal terminal EM1 or the second output signal terminal EM2 under control of the detection control signal from the detection control terminal VH.

For example, the detection control terminal VH of the light-emitting control circuit 100 is electrically connected to the twelfth node of the random detection circuit 200. Referring to FIG. 27, in the blank phase B, the twelfth node N12 outputs a high-level voltage signal, and the light-emitting control circuit 100 may be controlled to transmit the first voltage signal to the first output signal terminal EM1 or the second output signal terminal EM2 to turn on the odd-numbered row of sub-pixels P1 (the light-emitting control transistors T104(1)) or the even-numbered row of sub-pixels P2 (the light-emitting control transistors T104(2)). As for the operating process of the light-emitting control circuit 100, reference is made to the above description, and details will not be repeated here.

For example, the detection control terminal VH of the light-emitting control circuit 100 is electrically connected to the fourteenth node N14 or the fifteenth node N15 of the shift register circuit 300. Referring to FIG. 27, in the blank phase B, the fourteenth node N14 and the fifteenth node N15 may each output a high-level voltage signal, and the light-emitting control circuit 100 transmits the first voltage signal to the first output signal terminal EM1 or the second output signal terminal EM2. The operating process of the light-emitting control circuit 100 is not repeated here.

The first output signal terminal EM1 of the light-emitting control circuit 110 of the gate driving circuit 1120 is electrically connected to the odd-numbered row of sub-pixels P1, and the second output signal terminal EM2 of the light-emitting control circuit 100 is electrically connected to the even-numbered row of sub-pixels P2.

In some embodiments, referring to FIGS. 15 and 25A, the shift register circuit 300 includes the first shift register sub-circuit 310 and the second shift register sub-circuit 320; the first shift register sub-circuit 310 includes the first scan input unit 313 and the first scan output unit 312; the second shift register sub-circuit 320 includes the second scan input unit 323 and the second scan output unit 322; the first light-emitting control sub-circuit 110 of the light-emitting control circuit 100 includes the first pulse width modulation unit 113; and the second light-emitting control sub-circuit 120 includes the second pulse width modulation unit 123.

In the display phase D, the first scan input unit 313 inputs the fourth voltage signal to the fourteenth node N14 under control of the third input signal IN3; and the first scan output unit 312 transmits the eighth clock signal to the third output signal terminal GL1 under control of the voltage of the fourteenth node N14, so as to turn on the corresponding odd-numbered row of sub-pixels.

For example, referring to FIGS. 26A and 27, in the display phase D, in a case where the third input signal terminal IN3 outputs a high-level voltage signal, the twenty-seventh transistor T27 is turned on, and the fourth voltage signal of the fourth voltage signal terminal VDD is transmitted to the fourteenth node N14. The fourth voltage signal may be a high-level voltage signal, and the twenty-fourth transistor T24 is turned on under control of the fourth voltage signal of the fourteenth node N14, and the eighth clock signal from the eighth clock signal terminal CKE1 is transmitted to the third output signal terminal GL1.

The second scan input unit 323 inputs the fourth voltage signal to the fifteenth node N15 under control of the third input signal IN3; and the second scan output unit 322 transmits the ninth clock signal to the fourth output signal terminal GL2 under control of the voltage of the fifteenth node N15, so as to turn on the corresponding even-numbered row of sub-pixels.

For example, referring to FIGS. 26B and 27, in the display phase D, in a case where the third input signal terminal IN3 outputs a high-level voltage signal, the thirty-first transistor T31 is turned on, and the fourth voltage signal of the fourth voltage signal terminal VDD is transmitted to the fifteenth node N15. The twenty-sixth transistor T26 is turned on under control of the fourth voltage signal of the fourteenth node N14, and the ninth clock signal from the ninth clock signal terminal CKE2 is transmitted to the third output signal terminal GL1.

For example, the eighth clock signal terminal CKE1 and the ninth clock signal terminal CKE2 may output high-level voltage signals at different times, so that the third output signal terminal GL1 and the fourth output signal terminal GL2 may output scan signals at different times. Thus, data writing transistors T102 of different rows of sub-pixels P are turned on at different times.

The first pulse width modulation unit 113 transmits the first input signal to the first node under control of the third clock signal CKB1, or the second pulse width modulation unit 123 transmits the second input signal to the second node N2 under control of the fourth clock signal CKB2, so as to modulate the light-emitting time of the odd-numbered row of sub-pixels and the even-numbered row of sub-pixels. That is, in the same frame cycle, one of the first pulse width modulation unit 113 and the second pulse width modulation unit 123 outputs a pulse width modulation signal; and in different frame cycles, the first pulse width modulation unit 113 and the second pulse width modulation unit 123 alternately output pulse width modulation signals. As for the control process of the first pulse width modulation unit 113 and the second pulse width modulation unit 123, reference may be made to the above description, and details will not be repeated here.

Some embodiments of the present disclosure further provide a control method of a display panel, which is used for controlling the display panel 1000 in the above embodiments. The display panel 1000 includes the gate driving circuits 1120, the data driving circuit 1200, and the pixel driving circuits 1110.

Figure 28:
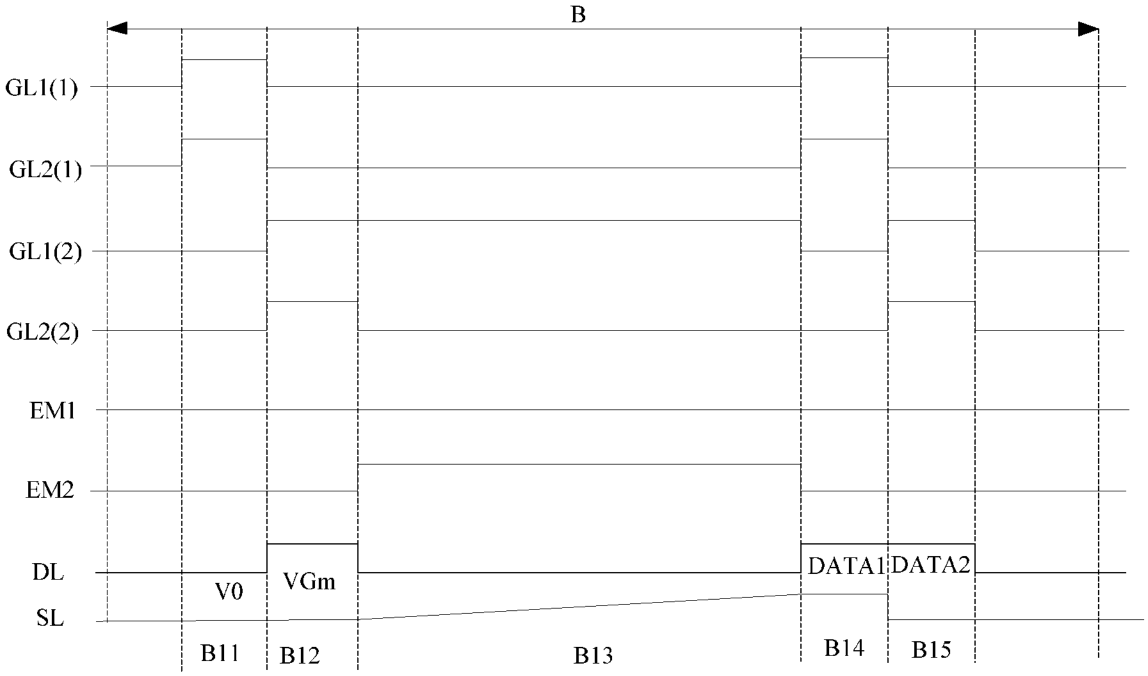
FIG. 28 is a timing control diagram of a display panel, in accordance with embodiments of the present disclosure.

In some embodiments, referring to FIG. 28, the blank phase B includes a first data writing phase B11, a second data writing phase B12, and a sensing phase B13.

In a case where one of an odd-numbered row of sub-pixels P1 and an even-numbered row of sub-pixels P2 that are adjacent in a group is selected for compensation of light-emitting devices, FIG. 28 shows an example in which the even-numbered row of sub-pixels P2 is selected for compensation of light-emitting devices EL. The control method of the display panel includes the followings.

In the first data writing phase B11, the data driving circuit 1200 writes zero grayscale data V0 into one of the odd-numbered row of sub-pixels P1 and the even-numbered row of sub-pixels P2 that is not selected for external compensation. In this way, driving transistors T101 of a row of sub-pixels P that is not selected for external compensation are not turned on; and when light-emitting control transistors T104 of one row of sub-pixels are turned on, the anodes of the light-emitting devices EL of the sub-pixels P of the row of sub-pixels P that is not selected are not charged, thereby ensuring that only one row of sub-pixels P is selected for compensation of light-emitting devices EL in each frame.

For example, referring to FIG. 28, in a case where the even-numbered row if sub-pixels P2 is selected for compensation of light-emitting devices EL, in the first data writing phase B11, the first gate line GL1(1) and the second gate line GL2(1) that are electrically connected to the odd-numbered row of sub-pixels P1 output operating voltage signals, and the data lines DL output the zero grayscale data V0. In this way, the control electrodes of the driving transistors T101(1) of the odd-numbered row of sub-pixels P1 receive turn-off voltage signals, and the driving transistors T101(1) of the odd-numbered row of sub-pixels P1 are in an off state in the subsequent compensation process.

In the second data writing phase B12, the data driving circuit 1200 writes the sensing grayscale data VGm into the selected one of the odd-numbered row of sub-pixels P1 and the even-numbered row of sub-pixels P2 for compensation of light-emitting devices.

For example, referring to FIG. 28, in the second data writing phase B12, the first gate line GL1(2) and the second gate line GL2(2) electrically connected to the even-numbered row of sub-pixels P2 output operating voltage signals, and the data lines DL output the sensing grayscale data VGm. In this way, the control electrodes of the driving transistors T101(2) of the even-numbered row of sub-pixels P2 receive operating voltages, and the driving transistors T101(2) of the even-numbered row of sub-pixels P2 are in an on state in the subsequent compensation process.

In the sensing phase B13, the first light-emitting control sub-circuit 110 or the second light-emitting control sub-circuit 120 outputs the first voltage signal (the operating voltage), so that operating currents flow through the light-emitting devices EL of the odd-numbered row of sub-pixels or the even-numbered row of sub-pixels; in the odd-numbered row of sub-pixels or the even-numbered row of sub-pixels, the pixel driving circuits detect voltages of the light-emitting devices.

For example, the first light-emitting control sub-circuit 110 outputs the first voltage signal to the first light-emitting control signal line EM1. Operating currents may flow through the driving control transistors T101 of the selected row of sub-pixels P (the row of sub-pixels P selected for compensation of light-emitting devices EL), so that the operating currents may flow through the light-emitting devices EL of the selected row of sub-pixels P to charge the anodes of the corresponding light-emitting devices EL. The sensing signal lines SL of the pixel driving circuits 1110 senses the voltages of the anodes of the corresponding light-emitting devices EL.

In some embodiments, referring to FIG. 28, the blank phase B further includes a first data write-back phase B14 and a second data write-back phase B15 after the sensing phase B13.

In the first data write-back phase B14, first initial grayscale data DATA1 is written into one row of sub-pixels, which is not selected for compensation of light-emitting devices EL, of an odd-numbered row of sub-pixels P1 and an even-numbered row of sub-pixels P2 that are adjacent in a group, and the first initial grayscale data DATA1 is grayscale data written into a corresponding row of sub-pixels P before the first data writing phase B11. In this way, the row of sub-pixels P that is not selected may display a gray scale required to be displayed in a next display phase D.

For example, referring to FIG. 28, in the first data write-back phase B14, the first gate line GL1(1) and the second gate line GL2(1) that are electrically connected to the odd-numbered row of sub-pixels P1 output operating voltage signals, and the data lines DL output the first initial grayscale data DATA1.

In the second data write-back phase B15, second initial grayscale data DATA2 is written into one of the odd-numbered row of sub-pixels P1 and the even-numbered row of sub-pixels P2 that is selected for compensation of light-emitting devices EL, and the second initial grayscale data DATA2 is grayscale data written into a corresponding row of sub-pixels before the second data writing phase B12. In this way, the selected row of sub-pixels P may display the gray scale required to be displayed in the next display phase D.

For example, referring to FIG. 28, in the second data write-back phase B15, the first gate line GL1(2) and the second gate line GL2(2) that are electrically connected to the even-numbered row of sub-pixels P2 output operating voltage signals, and the data lines DL output the second initial grayscale data DATA2.

The foregoing descriptions are merely specific implementation manners of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A light-emitting control circuit, comprising:
- a first light-emitting control sub-circuit including a first detection control unit and a first light-emitting output unit, wherein
  - the first detection control unit is electrically connected to a detection control terminal, a first clock signal terminal, a first voltage signal terminal, and a first node; and the first detection control unit is configured to transmit a first voltage signal from the first voltage signal terminal to the first node under control of a detection control signal from the detection control terminal and a first clock signal from the first clock signal terminal;
  - the first light-emitting output unit is electrically connected to the first node, the first voltage signal terminal, and a first output signal terminal; and the first light-emitting output unit is configured to transmit the first voltage signal to the first output signal terminal under control of a voltage of the first node; and
- a second light-emitting control sub-circuit including a second detection control unit and a second light-emitting output unit, wherein
  - the second detection control unit is electrically connected to the detection control terminal, a second clock signal terminal, the first voltage signal terminal, and a second node; and the second detection control unit is configured to transmit the first voltage signal to the second node under control of the detection control signal and a second clock signal from the second clock signal terminal;
  - the second light-emitting output unit is electrically connected to the second node, the first voltage signal terminal, and a second output signal terminal; and the second light-emitting output unit is configured to transmit the first voltage signal to the second output signal terminal under control of a voltage of the second node.

2. The light-emitting control circuit according to claim 1, wherein the first detection control unit includes:
- a first detection input sub-unit electrically connected to the detection control terminal, the first clock signal terminal and a third node, and being configured to transmit the first clock signal to the third node under control of the detection control signal; and
- a first detection output sub-unit electrically connected to the third node, the first voltage signal terminal and the first node, and being configured to transmit the first voltage signal to the first node under control of a voltage of the third node;
- the second detection control unit includes:
- a second detection input sub-unit electrically connected to the detection control terminal, the second clock signal terminal and a fourth node, and being configured to transmit the second clock signal to the fourth node under control of the detection control signal; and
- a second detection output sub-unit electrically connected to the fourth node, the first voltage signal terminal and the second node, and being configured to transmit the first voltage signal to the second node under control of a voltage of the fourth node.

3. The light-emitting control circuit according to claim 2, wherein the first detection control unit further includes a first storage sub-unit; the first storage sub-unit is electrically connected to the first node and the third node, and is configured to maintain the voltage of the third node;

the second detection control unit further includes a second storage sub-unit; the second storage sub-unit is electrically connected to the second node and the fourth node, and is configured to maintain the voltage of the fourth node.

4. The light-emitting control circuit according to claim 3, wherein the first detection input sub-unit includes a first transistor, a control electrode of the first transistor is electrically connected to the detection control terminal, a first electrode of the first transistor is electrically connected to the second clock signal terminal, and a second electrode of the first transistor is electrically connected to the third node;

the first detection output sub-unit includes a second transistor, a control electrode of the second transistor is electrically connected to the third node, a first electrode of the second transistor is electrically connected to the first voltage signal terminal, and a second electrode of the second transistor is electrically connected to the first node;

the first storage sub-unit includes a first capacitor, a first electrode plate of the first capacitor is electrically connected to the third node, and a second electrode plate of the first capacitor is electrically connected to the first node;

the second detection input sub-unit includes a third transistor, a control electrode of the third transistor is electrically connected to the detection control terminal, a first electrode of the third transistor is electrically connected to a fourth clock signal terminal, and a second electrode of the third transistor is electrically connected to the fourth node;

the second detection output sub-unit includes a fourth transistor, a control electrode of the fourth transistor is electrically connected to the fourth node, a first electrode of the fourth transistor is electrically connected to the first voltage signal terminal, and a second electrode of the fourth transistor is electrically connected to the second node;

the second storage sub-unit includes a second capacitor, a first electrode plate of the second capacitor is electrically connected to the fourth node, and a second electrode plate of the second capacitor is electrically connected to the second node.

5. The light-emitting control circuit according to claim 1, wherein the first light-emitting control sub-circuit further includes:

a first pulse width modulation unit electrically connected to a first input signal terminal, a third clock signal terminal and the first node, and being configured to transmit a first input signal from the first input signal terminal to the first node under control of a third clock signal from the third clock signal terminal;

the second light-emitting control sub-circuit further includes:

a second pulse width modulation unit electrically connected to a second input signal terminal, a fourth clock signal terminal and the second node, and being configured to transmit a second input signal from the second input signal terminal to the second node under control of a fourth clock signal from the fourth clock signal terminal.

6. The light-emitting control circuit according to claim 5, wherein the first pulse width modulation unit includes:

a fifth transistor, wherein a control electrode of the fifth transistor is electrically connected to the third clock signal terminal, a first electrode of the fifth transistor is electrically connected to the first input signal terminal, and a second electrode of the fifth transistor is electrically connected to the first node;

a sixth transistor, wherein a control electrode of the sixth transistor is electrically connected to the first node, a first electrode of the sixth transistor is electrically connected to a second voltage signal terminal, and a second electrode of the sixth transistor is electrically connected to a fifth node;

a seventh transistor, wherein a control electrode of the seventh transistor is electrically connected to the fifth node, a first electrode of the seventh transistor is electrically connected to a third voltage signal terminal, and a second electrode of the seventh transistor is electrically connected to the first output signal terminal;

an eighth transistor, wherein a control electrode of the eighth transistor is electrically connected to a fifth clock signal terminal, a first electrode of the eighth transistor is electrically connected to the first voltage signal terminal, and a second electrode of the eighth transistor is electrically connected to a sixth node;

a ninth transistor, wherein a control electrode of the ninth transistor is electrically connected to the sixth node, a first electrode of the ninth transistor is electrically connected to the third clock signal terminal, and a second electrode of the ninth transistor is electrically connected to a seventh node;

a tenth transistor, wherein a control electrode of the tenth transistor is electrically connected to the first input signal terminal, a first electrode of the tenth transistor is electrically connected to the seventh node, and a second electrode of the tenth transistor is electrically connected to the fifth node; and a third capacitor, wherein a first electrode plate of the third capacitor is electrically connected to the sixth node, and a second electrode plate of the third capacitor is electrically connected to the seventh node;

the second pulse width modulation unit includes:

an eleventh transistor, wherein a control electrode of the eleventh transistor is electrically connected to the fourth clock signal terminal, a first electrode of the eleventh transistor is electrically connected to the second input signal terminal, and a second electrode of the eleventh transistor is electrically connected to the second node;

a twelfth transistor, wherein a control electrode of the twelfth transistor is electrically connected to the second node, a first electrode of the twelfth transistor is electrically connected to the second voltage signal terminal, and a second electrode of the twelfth transistor is electrically connected to an eighth node;

a thirteenth transistor, wherein a control electrode of the thirteenth transistor is electrically connected to the eighth node, a first electrode of the thirteenth transistor is electrically connected to the third voltage signal terminal, and a second electrode of the thirteenth transistor is electrically connected to the second output signal terminal;

a fourteenth transistor, wherein a control electrode of the fourteenth transistor is electrically connected to a sixth clock signal terminal, a first electrode of the fourteenth transistor is electrically connected to the first voltage signal terminal, and a second electrode of the fourteenth transistor is electrically connected to a ninth node;

a fifteenth transistor, wherein a control electrode of the fifteenth transistor is electrically connected to the ninth node, a first electrode of the fifteenth transistor is electrically connected to the fourth clock signal terminal, and a second electrode of the fifteenth transistor is electrically connected to a tenth node;

a sixteenth transistor, wherein a control electrode of the sixteenth transistor is electrically connected to the second input signal terminal, a first electrode of the sixteenth transistor is electrically connected to the tenth node, and a second electrode of the sixteenth transistor is electrically connected to the eighth node; and a fourth capacitor, wherein a first electrode plate of the fourth capacitor is electrically connected to the ninth node, and a second electrode plate of the fourth capacitor is electrically connected to the tenth node;

the first light-emitting output unit includes:

a seventeenth transistor, wherein a control electrode of the seventeenth transistor is electrically connected to the first node, a first electrode of the seventeenth transistor is electrically connected to the first voltage signal terminal, and a second electrode of the seventeenth transistor is electrically connected to the first output signal terminal;

the second light-emitting output unit includes:

an eighteenth transistor, wherein a control electrode of the eighteenth transistor is electrically connected to the second node, a first electrode of the eighteenth transistor is electrically connected to the first voltage signal terminal, and a second electrode of the eighteenth transistor is electrically connected to the second output signal terminal.

7. A gate driving circuit, comprising:

a random detection circuit electrically connected to a random detection signal terminal, a third input signal terminal, a seventh clock signal terminal and an eleventh node, and being configured to transmit a seventh clock signal from the seventh clock signal terminal to the eleventh node under control of a random detection signal from the random detection signal terminal and a third input signal from the third input signal terminal, so as to select a row of sub-pixels for compensation of light-emitting devices;

shift register circuits electrically connected to the eleventh node, wherein each shift register circuit is configured to output a scan signal to a corresponding row of sub-pixels, so as to turn on the corresponding row of sub-pixels under control of a voltage of the eleventh node; and the light-emitting control circuit according to claim 1, wherein the detection control terminal of the light-emitting control circuit is electrically connected to a circuit node of the random detection circuit or a circuit node of the shift register circuit.

8. The gate driving circuit according to claim 7, wherein the random detection circuit includes:

a random detection control sub-circuit electrically connected to the random detection signal terminal, the third input signal terminal and a twelfth node, and being configured to transmit the third input signal to the twelfth node under control of the random detection signal; and a detection output sub-circuit electrically connected to the twelfth node, the seventh clock signal terminal and the eleventh node, and being configured to transmit the seventh clock signal to the eleventh node under control of a voltage of the twelfth node;

wherein the detection control terminal is electrically connected to the twelfth node.

9. The gate driving circuit according to claim 8, wherein the random detection circuit further includes:

a first storage sub-circuit electrically connected to a fourth voltage signal terminal and the twelfth node, and being configured to maintain the voltage of the twelfth node; and a first anti-leakage sub-circuit electrically connected to the random detection control sub-circuit, the random detection signal terminal, the twelfth node and the fourth voltage signal terminal, and being configured to transmit a fourth voltage signal to the eleventh node under control of the random detection signal and the voltage of the twelfth node;

wherein the random detection control sub-circuit is electrically connected to the twelfth node through the first anti-leakage sub-circuit.

10. The gate driving circuit according to claim 9, wherein the random detection control sub-circuit includes a nineteenth transistor, a control electrode of the nineteenth transistor is electrically connected to the random detection signal terminal, a first electrode of the nineteenth transistor is electrically connected to the third input signal terminal, and a second electrode of the nineteenth transistor is electrically connected to a thirteenth node;

the detection output sub-circuit includes a twentieth transistor, a control electrode of the twentieth transistor is electrically connected to the twelfth node, a first electrode of the twentieth transistor is electrically connected to the seventh clock signal terminal, and a second electrode of the twentieth transistor is electrically connected to the eleventh node;

the first storage sub-circuit includes a fifth capacitor, a first electrode plate of the fifth capacitor is electrically connected to the fourth voltage signal terminal, and a second electrode plate of the fifth capacitor is electrically connected to the twelfth node;

the first anti-leakage sub-circuit includes a twenty-first transistor and a twenty-second transistor; a control electrode of the twenty-first transistor is electrically connected to the random detection signal terminal, a first electrode of the twenty-first transistor is electrically connected to the thirteenth node, and a second electrode of the twenty-first transistor is electrically connected to the twelfth node; and a control electrode of the twenty-second transistor is electrically connected to the twelfth node, a first electrode of the twenty-second transistor is electrically connected to the fourth voltage signal terminal, and a second electrode of the twenty-second transistor is electrically connected to the thirteenth node.

11. The gate driving circuit according to claim 7, wherein the shift register circuit includes:

a first shift register sub-circuit including a first compensation input unit and a first scan output unit, wherein the first compensation input unit is electrically connected to the eleventh node, the seventh clock signal terminal and a fourteenth node, and the first compensation input unit is configured to transmit a voltage of the eleventh node to the fourteenth node under control of the seventh clock signal;

the first scan output unit is electrically connected to the fourteenth node, an eighth clock signal terminal and a third output signal terminal; the third output signal terminal is configured to be electrically connected to an odd-numbered row of sub-pixels; and the first scan output unit is configured to transmit an eighth clock signal from the eighth clock signal terminal to the third output signal terminal under control of a voltage of the fourteenth node, so as to turn on the corresponding odd-numbered row of sub-pixels; and a second shift register sub-circuit including a second compensation input unit and a second scan output unit, wherein the second compensation input unit is electrically connected to the eleventh node, the seventh clock signal terminal and a fifteenth node, and the second compensation input unit is configured to transmit the voltage of the eleventh node to the fifteenth node under control of the seventh clock signal;

the second scan output unit is electrically connected to the fifteenth node, a ninth clock signal terminal and a fourth output signal terminal; the fourth output signal terminal is configured to be electrically connected to an even-numbered row of sub-pixels; and the second scan output unit is configured to transmit a ninth clock signal from the ninth clock signal terminal to the fourth output signal terminal under control of a voltage of the fifteenth node, so as to turn on the corresponding even-numbered row of sub-pixels;

wherein the detection control terminal is electrically connected to the fourteenth node or the fifteenth node.

12. The gate driving circuit according to claim 11, wherein the first compensation input unit includes a twenty-third transistor, a control electrode of the twenty-third transistor is electrically connected to the seventh clock signal terminal, a first electrode of the twenty-third transistor is electrically connected to the eleventh node, and a second electrode of the twenty-third transistor is electrically connected to the fourteenth node;

the first scan output unit includes a twenty-fourth transistor, a control electrode of the twenty-fourth transistor is electrically connected to the fourteenth node, a first electrode of the twenty-fourth transistor is electrically connected to the eighth clock signal terminal, and a second electrode of the twenty-fourth transistor is electrically connected to the third output signal terminal;

the second compensation input unit includes a twenty-fifth transistor, a control electrode of the twenty-fifth transistor is electrically connected to the seventh clock signal terminal, a first electrode of the twenty-fifth transistor is electrically connected to the eleventh node, and a second electrode of the twenty-fifth transistor is electrically connected to the fifteenth node;

the second scan output unit includes a twenty-sixth transistor, a control electrode of the twenty-sixth transistor is electrically connected to the fifteenth node, a first electrode of the twenty-sixth transistor is electrically connected to the ninth clock signal terminal, and a second electrode of the twenty-sixth transistor is electrically connected to the fourth output signal terminal.

13. The gate driving circuit according to claim 11, wherein the first shift register sub-circuit further includes a first scan input unit, a first inverter and a first reset unit, wherein the first scan input unit is electrically connected to the third input signal terminal, a fourth voltage signal terminal and the fourteenth node, and the first scan input unit is configured to transmit a fourth voltage signal from the fourth voltage signal terminal to the fourteenth node under control of the third input signal;

a terminal of the first inverter is electrically connected to the fourteenth node, and another terminal of the first inverter is electrically connected to a sixteenth node;

the first reset unit is electrically connected to a first reset signal terminal, the sixteenth node, a fifth voltage signal terminal, the fourteenth node and the third output signal terminal, and the first reset unit is configured to transmit a fifth voltage signal of the fifth voltage signal terminal to the fourteenth node and the third output signal terminal under control of a first reset signal from the first reset signal terminal and a voltage of the sixteenth node;

the second shift register sub-circuit further includes a second scan input unit, a second inverter and a second reset unit, wherein the second scan input unit is electrically connected to the third input signal terminal, the fourth voltage signal terminal and the fifteenth node, and the second scan input unit is configured to transmit the third voltage signal to the fifteenth node under control of the third input signal;

a terminal of the second inverter is electrically connected to the fifteenth node, and another terminal of the second inverter is electrically connected to a seventeenth node;

the second reset unit is electrically connected to a second reset signal terminal, the fifth voltage signal terminal, the fifteenth node, the seventeenth node, and the fourth output signal terminal, and the second reset unit is configured to transmit the fifth voltage signal to the fifteenth node and the fourth output signal terminal under control of a second reset signal from the second reset signal terminal and a voltage of the seventeenth node.

14. A control method of a light-emitting control circuit, used for driving the light-emitting control circuit according to claim 1, wherein the first output signal terminal of the light-emitting control circuit is electrically connected to an odd-numbered row of sub-pixels, and the second output signal terminal of the light-emitting control circuit is electrically connected to an even-numbered row of sub-pixels;

a frame cycle includes a display phase and a blank phase;

the control method comprises:

in a case where one of the odd-numbered row of sub-pixels and the even-numbered row of sub-pixels that are adjacent in a group is selected for compensation of light-emitting devices, in the blank phase, the first detection control unit of the first light-emitting control sub-circuit of the light-emitting control circuit transmitting the first voltage signal to the first node, and the first light-emitting output unit of the first light-emitting control sub-circuit transmitting the first voltage signal to the first output signal terminal under control of the voltage of the first node, so that operating currents respectively flow through light-emitting devices of the odd-numbered row of sub-pixels or the even-numbered row of sub-pixels; or the second detection control unit of the second light-emitting control sub-circuit of the light-emitting control circuit transmitting the first voltage signal to the second node, and the second light-emitting output unit of the second light-emitting control sub-circuit transmitting the first voltage signal to the second output signal terminal under control of the voltage of the second node, so that the operating currents respectively flow through the light-emitting devices of the odd-numbered row of sub-pixels or the even-numbered row of sub-pixels.

15. The control method according to claim 14, wherein the first light-emitting control sub-circuit includes a first pulse width modulation unit, and the second light-emitting control sub-circuit includes a second pulse width modulation unit; the control method comprises:

in the display phase, the first pulse width modulation unit transmits a first input signal to the first node under control of a third clock signal; the first light-emitting output unit transmits the first voltage signal to the first output signal terminal under control of the voltage of the first node, so as to modulate light-emitting time of the odd-numbered row of sub-pixels and the even-numbered row of sub-pixels;

in a case where one of the odd-numbered row of sub-pixels and the even-numbered row of sub-pixels that are adjacent in the group is selected for compensation of light-emitting devices, in the blank phase, the second detection control unit transmits the first voltage signal to the second node, and the second light-emitting output unit transmits the first voltage signal to the second output signal terminal under control of the voltage of the second node, so that the operating currents respectively flow through the light-emitting devices of the odd-numbered row of sub-pixels or the even-numbered row of sub-pixels;

or in the display phase, the second pulse width modulation unit transmits a second input signal to the second node under control of a fourth clock signal; the second light-emitting output unit transmits the first voltage signal to the second output signal terminal under control of the voltage of the second node, so as to modulate the light-emitting time of the odd-numbered row of sub-pixels and the even-numbered row of sub-pixels;

in a case where one of the odd-numbered row of sub-pixels and the even-numbered row of sub-pixels that are adjacent in the group is selected for compensation of light-emitting devices, in the blank phase, the first detection control unit transmits the first voltage signal to the first node, and the first light-emitting output unit transmits the first voltage signal to the second output signal terminal under control of the voltage of the first node, so that the operating currents respectively flow through the light-emitting devices of the odd-numbered row of sub-pixels or the even-numbered row of sub-pixels.

16. A control method of a gate driving circuit, configured to drive the gate driving circuit according to claim 7, wherein the first output signal terminal of the light-emitting control circuit of the gate driving circuit is electrically connected to an odd-numbered row of sub-pixels, and the second output signal terminal of the light-emitting control circuit is electrically connected to an even-numbered row of sub-pixels;

a frame cycle includes a display phase and a blank phase; the control method comprises:

in a case where one of the odd-numbered row of sub-pixels and the even-numbered row of sub-pixels that are adjacent in a group is selected for compensation of light-emitting devices, in the display phase, the random detection circuit of the gate driving circuit transmitting the third input signal to the circuit node of the random detection circuit under control of the random detection signal, and maintaining a voltage of a corresponding circuit node until the blank phase; and in the blank phase, the random detection circuit transmitting the seventh clock signal to the shift register circuit of the gate driving circuit under control of the voltage of the corresponding circuit node; the shift register circuit outputting a scan signal to the corresponding row of sub-pixels, so as to turn on the corresponding row of sub-pixels; the light-emitting control circuit of the gate driving circuit transmitting the first voltage signal to the first output signal terminal or the second output signal terminal under control of a voltage of the circuit node of the random detection circuit or a voltage of the circuit node of the shift register circuit, so that operating currents respectively flow through light-emitting devices of the odd-numbered row of sub-pixels or the even-numbered row of sub-pixels.

17. The control method according to claim 16, wherein the shift register circuit includes a first shift register sub-circuit and a second shift register sub-circuit, the first shift register sub-circuit includes a first scan input unit and a first scan output unit, the second shift register sub-circuit includes a second scan input unit and a second scan output unit, the first light-emitting control sub-circuit of the light-emitting control circuit includes a first pulse width modulation unit, and the second light-emitting control sub-circuit includes a second pulse width modulation unit;

the control method comprises:

in the display phase, the first scan input unit inputting a fourth voltage signal to a fourteenth node under control of the third input signal; the first scan output unit transmitting an eighth clock signal to a third output signal terminal under control of a voltage of the fourteenth node, so as to turn on the corresponding odd-numbered row of sub-pixels;

the second scan input unit inputting the fourth voltage signal to a fifteenth node under control of the third input signal; the second scan output unit transmitting a ninth clock signal to a fourth output signal terminal under control of a voltage of the fifteenth node, so as to turn on the corresponding even-numbered row of sub-pixels;

the first pulse width modulation unit transmitting a first input signal to the first node under control of a third clock signal, or the second pulse width modulation unit transmitting a second input signal to the second node under control of a fourth clock signal, so as to modulate light-emitting time of the odd-numbered row of sub-pixels and the even-numbered row of sub-pixels.

18. A control method of a display panel, wherein the display panel includes gate driving circuits according to claim 7, a data driving circuit, odd-numbered rows of sub-pixels, and even-numbered rows of sub-pixels; the first light-emitting control sub-circuit of the gate driving circuit is electrically connected to an odd-numbered row of sub-pixels, and the second light-emitting control sub-circuit of the gate driving circuit is electrically connected to an even-numbered row of sub-pixels;

a frame cycle includes a display phase and a blank phase, and the blank phase includes a first data writing phase, a second data writing phase and a sensing phase;

the control method comprises:

in a case where one of the odd-numbered row of sub-pixels and the even-numbered row of sub-pixels that are adjacent in a group is selected for compensation of light-emitting devices, in the first data writing phase, the data driving circuit writing zero grayscale data into one of the odd-numbered row of sub-pixels and the even-numbered row of sub-pixels that is not selected for external compensation;

in the second data writing phase, the data driving circuit writing sensing grayscale data into one of the odd-numbered row of sub-pixels and the even-numbered row of sub-pixels that is selected for compensation of light-emitting devices;

in the sensing phase, the first light-emitting control sub-circuit or the second light-emitting control sub-circuit outputting the first voltage signal, so that operating currents respectively flow through light-emitting devices of the odd-numbered row of sub-pixels or the even-numbered row of sub-pixels; and pixel driving circuits of the odd-numbered row of sub-pixels or the even-numbered row of sub-pixels detecting voltages of light-emitting devices electrically connected thereto.

19. The control method according to claim 18, wherein the blank phase further includes a first data write-back phase and a second data write-back phase; the control method further comprises:

in the first data write-back phase, writing first initial grayscale data into one of the odd-numbered row of sub-pixels and the even-numbered row of sub-pixels that is not selected for compensation of light-emitting devices, wherein the first initial grayscale data is grayscale data written into a corresponding row of sub-pixels before the first data writing phase; and in the second data write-back phase, writing second initial grayscale data into one of the odd-numbered row of sub-pixels and the even-numbered row of sub-pixels that is selected for compensation of light-emitting devices, wherein the second initial grayscale data is grayscale data written into a corresponding row of sub-pixels before the second data writing phase.

20. A display device, comprising the gate driving circuit according to claim 7.

* * * * *